United States Patent
Kawai et al.

(10) Patent No.: US 10,497,980 B2
(45) Date of Patent: Dec. 3, 2019

(54) ELECTROLYTIC SOLUTION

(71) Applicants: THE UNIVERSITY OF TOKYO, Bunkyo-ku, Tokyo (JP); KABUSHIKI KAISHA TOYOTA JIDOSHOKKI, Kariya-shi, Aichi (JP)

(72) Inventors: Tomoyuki Kawai, Kariya (JP); Yoshihiro Nakagaki, Kariya (JP); Hiroyuki Sasaki, Kariya (JP); Yuki Hasegawa, Kariya (JP); Kohei Mase, Kariya (JP); Hitoshi Aikiyo, Kariya (JP); Toshiya Arakawa, Kariya (JP); Atsuo Yamada, Tokyo (JP); Yuki Yamada, Tokyo (JP)

(73) Assignees: UNIVERSITY OF TOKYO, Bunkyo-ku, Tokyo (JP); KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/521,085

(22) PCT Filed: Oct. 5, 2015

(86) PCT No.: PCT/JP2015/005051
§ 371 (c)(1),
(2) Date: Apr. 21, 2017

(87) PCT Pub. No.: WO2016/063468
PCT Pub. Date: Apr. 28, 2016

(65) Prior Publication Data
US 2017/0352920 A1    Dec. 7, 2017

(30) Foreign Application Priority Data

Oct. 23, 2014 (JP) ................... 2014-216729
Mar. 10, 2015 (JP) ................... 2015-047057

(51) Int. Cl.
*H01M 10/0569* (2010.01)
*H01M 4/587* (2010.01)
(Continued)

(52) U.S. Cl.
CPC ....... *H01M 10/0569* (2013.01); *H01M 4/587* (2013.01); *H01M 4/661* (2013.01);
(Continued)

(58) Field of Classification Search
None
See application file for complete search history.

(56) References Cited

U.S. PATENT DOCUMENTS 9,590,273 B2    3/2017   Lim et al.
2007/0037063 A1  2/2007   Choi et al.
(Continued)

FOREIGN PATENT DOCUMENTS

CN   105580184 A    5/2016
CN   105580190 A    5/2016
(Continued)

OTHER PUBLICATIONS

Dimethyl Ether data sheet, Accessed Feb. 7, 2019. <<http://www.stenutz.eu/chem.solv6.php?name=dimethyl%20ether>> (Year: 2019).*
(Continued)

*Primary Examiner* — Alix E Eggerding
(74) *Attorney, Agent, or Firm* — Sughrue Mion, PLLC

(57) ABSTRACT

An electrolytic solution containing
a heteroelement-containing organic solvent at a mole ratio of 3-5 relative to a metal salt,
the heteroelement-containing organic solvent containing a specific organic solvent having a relative permittivity of not greater than 10 and/or a dipole moment of not greater than 5D, (Continued)

the metal salt being a metal salt whose cation is an alkali metal, an alkaline earth metal, or aluminum and whose anion has a chemical structure represented by general formula (1) below:

$$(R^1X^1)(R^2SO_2)N \quad \text{general formula (1)}.$$

20 Claims, 10 Drawing Sheets

(51) Int. Cl.
  *H01M 4/66* (2006.01)
  *H01M 10/0525* (2010.01)
  *H01M 10/0568* (2010.01)
  *H01M 10/0567* (2010.01)
  *H01M 4/02* (2006.01)

(52) U.S. Cl.
  CPC ... *H01M 10/0525* (2013.01); *H01M 10/0567* (2013.01); *H01M 10/0568* (2013.01); *H01M 2004/027* (2013.01); *H01M 2300/0028* (2013.01); *Y02T 10/7011* (2013.01)

(56) References Cited

U.S. PATENT DOCUMENTS

| | | | |
|---|---|---|---|
| 2013/0183580 A1 | 7/2013 | Kako et al. | |
| 2014/0272605 A1 | 9/2014 | Lim et al. | |
| 2014/0335417 A1* | 11/2014 | Nagai | H01M 4/131 429/231.1 |
| 2015/0050563 A1 | 2/2015 | Yamada et al. | |
| 2015/0280283 A1* | 10/2015 | Oyama | H01M 10/052 429/188 |
| 2015/0380768 A1* | 12/2015 | Mizuno | H01M 10/0568 429/338 |
| 2016/0218390 A1 | 7/2016 | Yamada et al. | |
| 2016/0218394 A1 | 7/2016 | Yamada et al. | |
| 2016/0226100 A1 | 8/2016 | Yamada et al. | |
| 2016/0233548 A1 | 8/2016 | Yamada et al. | |
| 2016/0240858 A1 | 8/2016 | Yamada et al. | |
| 2016/0261000 A1* | 9/2016 | Zhang | H01M 4/40 |
| 2018/0277852 A1 | 9/2018 | Yamada et al. | |

FOREIGN PATENT DOCUMENTS

| | | |
|---|---|---|
| CN | 105580191 A | 5/2016 |
| CN | 105580192 A | 5/2016 |
| JP | 2007-19027 A | 1/2007 |
| JP | 2013-65493 A | 4/2013 |
| JP | 2013-134922 A | 7/2013 |
| JP | 2013-137873 A | 7/2013 |
| JP | 2013-145724 A | 7/2013 |
| JP | 2013-149477 A | 8/2013 |
| JP | 2015-185401 A | 10/2015 |
| JP | 2015-195165 A | 11/2015 |
| JP | 5817009 B1 | 11/2015 |
| KR | 10-2014-0104384 A | 8/2014 |
| WO | 2013/146714 A1 | 10/2013 |
| WO | 2014/126256 A1 | 8/2014 |

OTHER PUBLICATIONS

Communication dated Apr. 30, 2018 from the Korean Intellectual Property Office in counterpart Application No. 10-2017-7010685.
Yuki Yamada, et al., "Unusual Stability of Acetonitrile-Based Superconcentrated Electrolytes for Fast-Charging Lithium-Ion Batteries", Journal of the American Chemical Society, Mar. 23, 2014, pp. 5039-5046, vol. 1 (and see Table 1 therein).
International Search Report for PCT/JP2015/005051 dated Dec. 1, 2015 [PCT/ISA/210].
Communication dated Oct. 31, 2018, from the Chinese Patent Office in Application No. 201580057514.3; 8 pages total.
Communication dated Jun. 4, 2019, from the Chinese Patent Office in Application No. 201580057514.3; 6 pages total.

\* cited by examiner

Example A

ELECTROLYTIC SOLUTION

CROSS REFERENCE TO RELATED APPLICATIONS

This application is a National Stage of International Application No. PCT/JP2015/005051, filed on Oct. 5, 2015, which claims priority from Japanese Patent Application Nos. 2014-216729, filed on Oct. 23, 2014, and 2015-047057, filed on Mar. 10, 2015, the contents of all of which are incorporated herein by reference in their entirety.

TECHNICAL FIELD

The present invention relates to an electrolytic solution to be used in power storage devices such as secondary batteries.

BACKGROUND ART

Generally, a power storage device such as a secondary battery includes, as main components, a positive electrode, a negative electrode, and an electrolytic solution. In the electrolytic solution, an appropriate electrolyte is added at an appropriate concentration range. For example, in an electrolytic solution of a lithium ion secondary battery, a lithium salt such as $LiClO_4$, $LiAsF_6$, $LiPF_6$, $LiBF_4$, $CF_3SO_3Li$, and $(CF_3SO_2)_2NLi$ is commonly added as an electrolyte, and the concentration of the lithium salt in the electrolytic solution is generally set at about 1 mol/L.

In an organic solvent to be used in an electrolytic solution, an organic solvent having a high dipole moment and a high relative permittivity such as ethylene carbonate or propylene carbonate is generally mixed by not less than about 30 vol %, in order to suitably dissolve an electrolyte.

Actually, Patent Literature 1 discloses a lithium ion secondary battery using an electrolytic solution that uses a mixed organic solvent containing ethylene carbonate by 33 vol % and that contains $LiPF_6$ at a concentration of 1 mol/L. Furthermore, Patent Literature 2 discloses a lithium ion secondary battery using an electrolytic solution that uses a mixed organic solvent containing ethylene carbonate and propylene carbonate by 66 vol % and that contains $(CF_3SO_2)_2NLi$ at a concentration of 1 mol/L.

In addition, for the purpose of improving performance of secondary batteries, studies are actively conducted for various additives to be added to an electrolytic solution containing a lithium salt.

For example, Patent Literature 3 describes an electrolytic solution obtained by adding a small amount of a specific additive to an electrolytic solution that uses a mixed organic solvent containing ethylene carbonate by 30 vol % and that contains $LiPF_6$ at a concentration of 1 mol/L. Patent Literature 3 discloses a lithium ion secondary battery using this electrolytic solution. Furthermore, Patent Literature 4 describes an electrolytic solution obtained by adding a small amount of phenyl glycidyl ether to a solution that uses a mixed organic solvent containing ethylene carbonate by 30 vol % and that contains $LiPF_6$ at a concentration of 1 mol/L. Patent Literature 4 discloses a lithium ion secondary battery using this electrolytic solution.

CITATION LIST

Patent Literature

Patent Literature 1: JP2013149477(A)
Patent Literature 2: JP2013134922(A)
Patent Literature 3: JP2013145724(A)
Patent Literature 4: JP2013137873(A)

SUMMARY OF INVENTION

Technical Problem

As described in Patent Literature 1 to 4, conventionally, with respect to an electrolytic solution used in a lithium ion secondary battery, using a mixed organic solvent that contains, by not less than about 30 vol %, an organic solvent having a high relative permittivity and a high dipole moment such as ethylene carbonate or propylene carbonate and containing a lithium salt at a concentration of about 1 mol/L were technical common knowledge. In addition, as described in Patent Literature 3 to 4, studies for improving electrolytic solutions have been generally conducted with a focus on additives, which are separate from the lithium salt.

Unlike the focus of a person skilled in the art hitherto, the present invention relates to an electrolytic solution focused on: combining a metal salt which is a specific electrolyte and a heteroelement-containing organic solvent that contains an organic solvent having a low relative permittivity and/or dipole moment; and the mole ratio thereof. A purpose of the present invention is to newly provide a suitable electrolytic solution.

Solution to Problem

The present inventors have conducted thorough investigation with much trial and error, without being confined to conventional technical common knowledge. As a result, the present inventors have found that a metal salt which is a specific electrolyte is suitably dissolved in a specific organic solvent having a low relative permittivity and/or dipole moment. Furthermore, the present inventors have found that an electrolytic solution in which the mole ratio of an organic solvent having a low relative permittivity and/or dipole moment relative to a metal salt which is a specific electrolyte is in a certain range is suitably used in a power storage device such as a secondary battery. On the basis of these findings, the present inventors have completed the present invention.

An electrolytic solution of the present invention contains a heteroelement-containing organic solvent at a mole ratio of 3-5 relative to a metal salt, the heteroelement-containing organic solvent containing a specific organic solvent having a relative permittivity of not greater than 10 and/or a dipole moment of not greater than 5D, the metal salt being a metal salt whose cation is an alkali metal, an alkaline earth metal, or aluminum and whose anion has a chemical structure represented by general formula (1) below.

$(R^1X^1)(R^2SO_2)N$            general formula (1).

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.)

Advantageous Effects of Invention

The new electrolytic solution of the present invention is suitable as an electrolytic solution for power storage devices such as secondary batteries.

DESCRIPTION OF EMBODIMENTS

Figure 1:
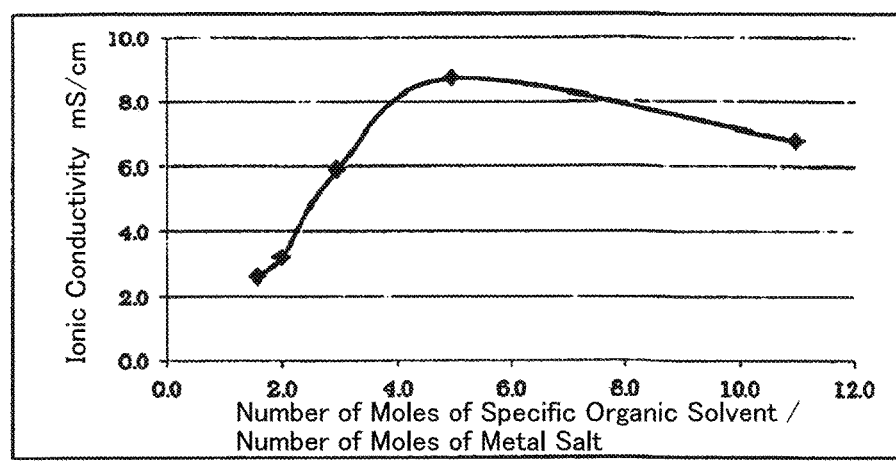
FIG. 1 is a graph showing the relationship between ionic conductivity and mole ratio of a specific organic solvent relative to a metal salt of an electrolytic solution having LiFSA as the metal salt and DMC as the specific organic solvent.

The following describes embodiments of the present invention. Unless mentioned otherwise in particular, a numerical value range of "a to b (or, a-b)" described in the present specification includes, in the range thereof, a lower limit "a" and an upper limit "b". A numerical value range is formed by arbitrarily combining such upper limit values, lower limit values, and numerical values described in Examples. In addition, numerical values arbitrarily selected within a numerical value range may be used as upper limit and lower limit numerical values.

An electrolytic solution of the present invention contains a heteroelement-containing organic solvent at a mole ratio of 3-5 relative to a metal salt, the heteroelement-containing organic solvent containing a specific organic solvent having a relative permittivity of not greater than 10 and/or a dipole moment of not greater than 5D, the metal salt being a metal salt whose cation is an alkali metal, an alkaline earth metal, or aluminum and whose anion has a chemical structure represented by general formula (1) below.

$(R^1X^1)(R^2SO_2)N$ general formula (1).

($R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN.

$R^1$ and $R^2$ optionally bind with each other to form a ring.

$X^1$ is selected from $SO_2$, C=O, C=S, $R^aP$=O, $R^bP$=S, S=O, or Si=O.

$R^a$ and $R^b$ are each independently selected from: hydrogen; halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^a$ and $R^b$ each optionally bind with $R^1$ or $R^2$ to form a ring.)

Examples of a cation of the metal salt include alkali metals such as lithium, sodium, and potassium, alkaline earth metals such as beryllium, magnesium, calcium, strontium, and barium, and aluminum. The cation of the metal salt is preferably a metal ion identical to a charge carrier of the battery in which the electrolytic solution is used. For example, when the electrolytic solution of the present invention is to be used as an electrolytic solution for lithium ion secondary batteries, the cation of the metal salt is preferably lithium.

The wording of "optionally substituted with a substituent group" in the chemical structures represented by the above described general formula (1) is to be described. For example, "an alkyl group optionally substituted with a substituent group" refers to an alkyl group in which one or more hydrogen atoms of the alkyl group is substituted with a substituent group, or an alkyl group not including any particular substituent groups.

Examples of the substituent group in the wording of "optionally substituted with a substituent group" include alkyl groups, alkenyl groups, alkynyl groups, cycloalkyl groups, unsaturated cycloalkyl groups, aromatic groups, heterocyclic groups, halogens, OH, SH, CN, SCN, OCN, nitro group, alkoxy groups, unsaturated alkoxy groups, amino group, alkylamino groups, dialkylamino groups, aryloxy groups, acyl groups, alkoxycarbonyl groups, acyloxy groups, aryloxycarbonyl groups, acylamino groups, alkoxycarbonylamino groups, aryloxycarbonylamino groups, sulfonylamino groups, sulfamoyl groups, carbamoyl group, alkylthio groups, arylthio groups, sulfonyl group, sulfinyl group, ureido groups, phosphoric acid amide groups, sulfo group, carboxyl group, hydroxamic acid groups, sulfino group, hydrazino group, imino group, and silyl group, etc. These substituent groups may be further substituted. In addition, when two or more substituent groups exist, the substituent groups may be identical or different from each other.

The chemical structure of the anion of the metal salt is preferably represented by general formula (1-1) below.

$(R^3X^2)(R^4SO_2)N$          general formula (1-1)

($R^3$ and $R^4$ are each independently $C_nH_aF_bCl_cBr_dI_e(CN)_f(SCN)_g(OCN)_h$.

"n", "a", "b", "c", "d", "e", "f", "g", and "h" are each independently an integer not smaller than 0, and satisfy 2n+1=a+b+c+d+e+f+g+h.

$R^3$ and $R^4$ optionally bind with each other to form a ring, and, in that case, satisfy 2n=a+b+c+d+e+f+g+h.

$X^2$ is selected from $SO_2$, C=O, C=S, $R^cP$=O, $R^dP$=S, S=O, or Si=O.

$R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN.

$R^c$ and $R^d$ each optionally bind with $R^3$ or $R^4$ to form a ring.)

In the chemical structure represented by the general formula (1-1), the meaning of the wording of "optionally substituted with a substituent group" is synonymous with that described for the general formula (1).

In the chemical structure represented by the general formula (1-1), "n" is preferably an integer from 0 to 6, more preferably an integer from 0 to 4, and particularly preferably an integer from 0 to 2. In the chemical structure represented by the general formula (1-1), when $R^3$ and $R^4$ each optionally bind with each other to form a ring, "n" is preferably an integer from 1 to 8, more preferably an integer from 1 to 7, and particularly preferably an integer from 1 to 3.

The chemical structure of the anion of the metal salt is further preferably represented by general formula (1-2) below.

$(R^5SO_2)(R^6SO_2)N$          general formula (1-2)

($R^5$ and $R^6$ are each independently $C_nH_aF_bCl_cBr_dI_e$. "n", "a", "b", "c", "d", and "e" are each independently an integer not smaller than 0, and satisfy 2n+1=a+b+c+d+e.

$R^5$ and $R^6$ optionally bind with each other to form a ring, and, in that case, satisfy 2n=a+b+c+d+e.)

In the chemical structure represented by the general formula (1-2), "n" is preferably an integer from 0 to 6, more preferably an integer from 0 to 4, and particularly preferably an integer from 0 to 2. In the chemical structure represented by the general formula (1-2), when $R^5$ and $R^6$ each optionally bind with each other to form a ring, "n" is preferably an integer from 1 to 8, more preferably an integer from 1 to 7, and particularly preferably an integer from 1 to 3.

In addition, in the chemical structure represented by the general formula (1-2), those in which "a," "c," "d," and "e" are 0 are preferable.

The metal salt is particularly preferably $(CF_3SO_2)_2NLi$ (hereinafter, sometimes referred to as "LiTFSA"), $(FSO_2)_2NLi$ (hereinafter, sometimes referred to as "LiFSA"), $(C_2F_5SO_2)_2NLi$, $FSO_2(CF_3SO_2)NLi$, $(SO_2CF_2CF_2SO_2)NLi$, $(SO_2CF_2CF_2CF_2SO_2)NLi$, $FSO_2(CH_3SO_2)NLi$, $FSO_2(C_2F_5SO_2)NLi$, or $FSO_2(C_2H_5SO_2)NLi$.

As the metal salt of the present invention, one that is obtained by combining appropriate numbers of a cation and an anion described above may be used. Regarding the metal salt in the electrolytic solution of the present invention, a single type may be used, or a combination of two or more types may be used.

The electrolytic solution of the present invention may include another electrolyte usable in an electrolytic solution for power storage devices, other than the metal salt described above. In the electrolytic solution of the present invention, the metal salt is contained by preferably not less than 50 mass %, more preferably not less than 70 mass %, and further preferably not less than 90 mass %, relative to the entire electrolyte contained in the electrolytic solution of the present invention.

The electrolytic solution of the present invention contains a heteroelement-containing organic solvent, and the heteroelement-containing organic solvent contains a specific organic solvent having a relative permittivity of not greater than and/or a dipole moment of not greater than 5D. As the heteroelement-containing organic solvent, any organic solvent containing a heteroelement among organic solvents usable in an electrolytic solution for power storage devices may be used. As the specific organic solvent, any heteroelement-containing organic solvent having a relative permittivity of not greater than 10 and/or a dipole moment of not greater than 5D may be used. The heteroelement-containing organic solvent contains the specific organic solvent by preferably not less than 80 vol or not less than 80 mole %, more preferably not less than 90 vol % or not less than 90 mole %, and further preferably not less than 95 vol % or not less than 95 mole %.

Since the heteroelement-containing organic solvent or the specific organic solvent has a heteroelement, and thus, allows the metal salt to be suitably dissolved therein at a certain degree of concentration. On the other hand, organic solvents formed from a hydrocarbon not having a heteroelement does not allow the metal salt to be suitably dissolved therein.

As the heteroelement-containing organic solvent or the specific organic solvent, an organic solvent whose heteroelement is at least one selected from nitrogen, oxygen, sulfur, and halogen is preferable and an organic solvent whose heteroelement is oxygen is more preferable. In addition, as the heteroelement-containing organic solvent or the specific organic solvent, an aprotic solvent not having a proton donor group such as NH group, $NH_2$ group, OH group, and SH group is preferable.

Specific examples of the heteroelement-containing organic solvent include nitriles such as acetonitrile, propionitrile, acrylonitrile, and malononitrile, ethers such as 1,2-dimethoxyethane, 1,2-diethoxyethane, tetrahydrofuran, 1,2-dioxane, 1,3-dioxane, 1,4-dioxane, 2,2-dimethyl-1,3-dioxolane, 2-methyltetrahydropyran, 2-methyltetrahydrofuran, and crown ethers, carbonates such as ethylene carbonate, propylene carbonate, dimethyl carbonate, diethyl carbonate, and ethyl methyl carbonate, amides such as formamide, N,N-dimethylformamide, N,N-dimethylacetamide, and N-methylpyrrolidone, isocyanates such as isopropyl isocyanate, n-propylisocyanate, and chloromethyl isocyanate, esters such as methyl acetate, ethyl acetate, propyl acetate, methyl propionate, methyl formate, ethyl formate, vinyl acetate, methyl acrylate, and methyl methacrylate, epoxies such as glycidyl methyl ether, epoxy butane, and 2-ethyloxirane, oxazoles such as oxazole, 2-ethyloxazole, oxazoline, and 2-methyl-2-oxazoline, ketones such as acetone, methyl ethyl ketone, and methyl isobutyl ketone, acid anhydrides such as acetic anhydride and propionic anhydride, sulfones such as dimethyl sulfone and sulfolane, sulfoxides such as dimethyl sulfoxide, nitros such as 1-nitropropane and 2-nitropropane, furans such as furan and furfural, cyclic esters such as γ-butyrolactone, γ-valerolactone, and δ-valerolactone, aromatic heterocycles such as thiophene and pyridine, heterocycles such as tetrahydro-4-pyrone, 1-methylpyrrolidine, and N-methylmorpholine, and phosphoric acid esters such as trimethyl phosphate and triethyl phosphate.

Compared to a heteroelement-containing organic solvent having a relative permittivity exceeding 10 and/or a dipole moment exceeding 5D (hereinafter sometimes referred to as "another hetero organic solvent") other than the specific organic solvent, the specific organic solvent has a low polarity. Therefore, the affinity between the specific organic solvent and metal ions is considered to be inferior compared to the affinity between another hetero organic solvent and metal ions. Then, when the electrolytic solution of the present invention is used as the electrolytic solution for a secondary battery, aluminum or a transition metal forming an electrode of the secondary battery is considered less likely to be dissolved as ions into the electrolytic solution of the present invention.

Here, with respect to a secondary battery using a general electrolytic solution, a possible case is known in which: aluminum or a transition metal forming the positive electrode enters a high oxidation state especially under a high-voltage charging environment, and dissolves (anode elution) in the form of metal ions, which are positive ions, into the electrolytic solution; and then, the metal ions eluted in the electrolytic solution are attracted to the electron-rich negative electrode due to electrostatic attraction, to bind with electrons on the negative electrode, thereby to be reduced and deposited in the form of metal. If such a reaction occurs, performance of the battery is known to be reduced due to possible occurrence of decrease in the capacity of the positive electrode, degradation of the electrolytic solution on the negative electrode, and the like. However, the electrolytic solution of the present invention has the features described in the former paragraphs, and thus, in a secondary battery using the electrolytic solution of the present invention, metal ion elution from the positive electrode and metal deposition on the negative electrode are suppressed.

The relative permittivity of the specific organic solvent is preferably not greater than 10, more preferably not greater than 7, and further preferably not greater than 5. The lower limit of the relative permittivity of the specific organic solvent is not limited in particular, but if such a lower limit is to be shown, examples thereof include not less than 1, not less than 2, and not less than 2.5.

The dipole moment of the specific organic solvent is preferably not greater than 5 D, more preferably not greater than 2.5 D, and further preferably not greater than 1 D. The lower limit of the dipole moment of the specific organic solvent is not limited in particular, but if such a lower limit is to be shown, examples thereof include not smaller than 0.05 D, not smaller than 0.1 D, and not smaller than 0.2 D.

As the specific organic solvent, a specific organic solvent that contains a carbonate in the chemical structure thereof is preferable. Examples of a more preferable specific organic solvent include linear carbonates represented by general formula (2) below.

$$R^{20}OCOOR^{21} \qquad \text{general formula (2)}$$

($R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof. "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j.)

In the linear carbonates represented by the general formula (2), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the general formula (2), those represented by the following general formula (2-1) are particularly preferable.

$$R^{22}OCOOR^{23} \qquad \text{general formula (2-1)}$$

($R^{22}$ and $R^{23}$ are each independently selected from $C_nH_aF_b$ that is a linear alkyl, or $C_mH_fF_g$ that includes a cyclic alkyl in the chemical structure thereof. "n" is an integer not smaller than 1, "m" is an integer not smaller than 3, and "a", "b", "f", and "g" are each independently an integer not smaller than 0, and satisfy 2n+1=a+b and 2m=f+g.)

In the linear carbonates represented by the general formula (2-1), "n" is preferably an integer from 1 to 6, more preferably an integer from 1 to 4, and particularly preferably an integer from 1 to 2. "m" is preferably an integer from 3 to 8, more preferably an integer from 4 to 7, and particularly preferably an integer from 5 to 6.

Among the linear carbonates represented by the general formula (2-1), dimethyl carbonate (hereinafter, sometimes referred to as "DMC"), diethyl carbonate (hereinafter, sometimes referred to as "DEC"), ethyl methyl carbonate (hereinafter, sometimes referred to as "EMC"), fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl difluoromethyl carbonate, 2,2,2-trifluoroethyl methyl carbonate, pentafluoroethyl methyl carbonate, ethyl trifluoromethyl carbonate, and bis(2,2,2-trifluoroethyl) carbonate are particularly preferable.

From the disclosure of the present specification, an electrolytic solution is understood that contains a heteroelement-containing organic solvent at a mole ratio of 3-5 relative to a metal salt, the heteroelement-containing organic solvent containing a linear carbonate represented by the general formula (2) above, the metal salt being a metal salt whose cation is an alkali metal, an alkaline earth metal, or aluminum and whose anion has a chemical structure represented by the general formula (1) above.

In an electrolytic solution of the present invention using a suitable specific organic solvent, the concentration of the metal salt indicating a suitable ionic conductivity is relatively high. Further, the electrolytic solution of the present invention using a linear carbonate represented by the general formula (2) as the specific organic solvent has an advantage that variation in the ionic conductivity is small when some variation occurs in the metal salt concentration, i.e., an advantage of excellent fastness. In addition, the linear carbonate represented by the general formula (2) is excellent in stability against oxidation and reduction. Furthermore, the linear carbonate represented by the general formula (2) has a flexible chemical structure in which many bindings capable of free rotation exists. Thus, even when the electrolytic solution of the present invention using the linear carbonate contains a high concentration of a metal salt, significant increase in the viscosity thereof is suppressed, and high ionic conductivity is obtained.

Regarding the specific organic solvents described above, a single type may be used by itself in the electrolytic solution, or a combination of a plurality of types may be used.

As reference, the relative permittivities and dipole moments of various organic solvents are listed in Table 1.

TABLE 1

| Organic solvent | Relative permittivity | Dipole moment (d) |
|---|---|---|
| dimethyl carbonate | 3.1 | 0.3 |
| diethyl carbonate | 2.8 | 0.57 |
| ethyl methyl carbonate | 3.0 | 0.52 |
| 1,2-dimethoxyethane | 7.2 | 1.42 |
| tetrahydrofuran | 7.5 | 1.70 |
| acetonitrile | 36 | 2.89 |
| methanol | 33 | 1.69 |
| acetone | 21 | 2.72 |
| ethylene carbonate | 90 | 5.07 |
| propylene carbonate | 65 | 5.26 |
| hexane | 1.9 | 0 |
| toluene | 2.4 | 0.36 |

In the present specification, the expression such as "the electrolytic solution of the present invention contains a heteroelement-containing organic solvent and the metal salt at a mole ratio of 3-5" is sometimes used. The mole ratio in the present specification means the value obtained by diving the former by the latter, i.e., the value of (the number of moles of the heteroelement-containing organic solvent contained in the electrolytic solution of the present invention/the number of moles of the metal salt contained in the electrolytic solution of the present invention). Secondary batteries using the electrolytic solution of the present invention have relatively small reaction resistances. This is because: the main component of the SEI coating formed at the electrode/electrolytic solution interface is not a component derived from a conventional organic solvent, but a component derived from a metal salt having a low resistance S=O structure; the Li ion concentration in the coating is high; and the like. The significance of the range of the mole ratio of 3-5 lies in that the range corresponds to a range in which the reaction resistance of a secondary battery is relatively small and in which the ionic conductivity of the electrolytic solution is suitable. In the electrolytic solution of the present invention, the mole ratio of the heteroelement-containing organic solvent relative to the metal salt is more preferably in the range of 3.2 to 4.8, and further preferably in the range of 3.5 to 4.5. In conventional electrolytic solutions, the mole ratio of a heteroelement-containing organic solvent relative to an electrolyte or a metal salt is about 10.

In the electrolytic solution of the present invention, the metal salt and the heteroelement-containing organic solvent are estimated to interact with each other. Microscopically, the electrolytic solution of the present invention is estimated to contain a stable cluster formed of the metal salt and the heteroelement-containing organic solvent, the cluster being formed as a result of the metal salt and the heteroelement of the heteroelement-containing organic solvent forming a coordinate bond.

In the electrolytic solution of the present invention, the existence proportion of the metal salt is considered to be high compared to that in conventional electrolytic solutions. Then, in the electrolytic solution of the present invention, the environment in which the metal salt and the organic solvent exist is considered to be different from that in conventional electrolytic solutions. Therefore, in a power storage device such as a secondary battery using the electrolytic solution of the present invention, improvement in metal ion transportation rate in the electrolytic solution, improvement in reaction rate at the interface between an electrode and the electrolytic solution, mitigation of uneven distribution of metal salt concentration of the electrolytic solution caused when the secondary battery undergoes high-rate charging and discharging, improvement in liquid retaining property of the electrolytic solution at an electrode interface, suppression of a so-called liquid run-out state of lacking the electrolytic solution at an electrode interface, increase in the capacity of an electrical double layer, and the like are expected. Furthermore, in the electrolytic solution of the present invention, the vapor pressure of the organic solvent contained in the electrolytic solution becomes low. As a result, volatilization of the organic solvent from the electrolytic solution of the present invention is reduced.

Now, a density d (g/cm$^3$) of the electrolytic solution of the present invention is described. In the present specification, "density" means the density at 20° C. The density d (g/cm$^3$) of the electrolytic solution of the present invention is preferably 1.0≤d, and more preferably 1.1≤d.

As reference, densities (g/cm$^3$) of representative hetero-element-containing organic solvents are listed in Table 2.

TABLE 2

| Organic solvent | Density (g/cm$^3$) |
| --- | --- |
| 1,2-dimethoxyethane | 0.869 |
| diethyl ether | 0.714 |
| diisopropyl ether | 0.724 |
| ethyl acetate | 0.901 |
| acetic anhydride | 1.083 |
| tetrahydrofuran | 0.889 |
| 1,4-dioxane | 1.034 |
| acetone | 0.790 |
| methyl ethyl ketone | 0.805 |
| carbon tetrachloride | 1.594 |
| chloroform | 1.489 |
| dichloromethane | 1.326 |
| 1,2-dichloroethane | 1.252 |
| acetonitrile | 0.782 |
| nitromethane | 1.138 |
| dimethylformamide | 0.949 |
| hexamethylphosphoric triamide | 1.027 |
| triethylamine | 0.728 |
| pyridine | 0.983 |
| dimethyl sulfoxide | 1.100 |
| carbon disulfide | 1.263 |
| ethylene carbonate | 1.321 |
| dimethyl carbonate | 1.07 |
| ethyl methyl carbonate | 1.015 |
| diethyl carbonate | 0.976 |
| sulfolane | 1.261 |

Regarding a viscosity η (mPa·s) of the electrolytic solution of the present invention, a range of 3<η<50 is preferable, a range of 4<η<40 is more preferable, and a range of 5<η<30 is further preferable.

Ions move in an electrolytic solution easier when an ionic conductivity σ (mS/cm) of the electrolytic solution is higher. Thus, such an electrolytic solution is an excellent electrolytic solution for batteries. The ionic conductivity σ (mS/cm) of the electrolytic solution of the present invention preferably satisfies 1≤σ. Regarding the ionic conductivity σ (mS/cm) of the electrolytic solution of the present invention, if a suitable range including an upper limit is to be shown, a range of 2<σ<100 is preferable, a range of 3≤σ<50 is more preferable, and a range of 4≤σ<30 is further preferable.

The electrolytic solution of the present invention contains a cation of the metal salt at a high concentration. Thus, the distance between adjacent cations is extremely small within the electrolytic solution of the present invention. When a cation such as a lithium ion moves between a positive electrode and a negative electrode during charging and discharging of the secondary battery, a cation located closest to an electrode that is a movement destination is firstly supplied to the electrode. Then, to the place where the supplied cation had been located, another cation adjacent to the cation moves. Thus, in the electrolytic solution of the present invention, a domino toppling-like phenomenon is predicted to be occurring in which adjacent cations sequentially change their positions one by one toward an electrode that is a supply target. Because of that, the distance for which a cation moves during charging and discharging is considered to be short, and movement speed of the cation is considered to be high, accordingly. Because of this reason, the secondary battery having the electrolytic solution of the present invention is considered to have a high reaction rate.

The electrolytic solution of the present invention may contain, other than the specific organic solvent, another hetero organic solvent described above or an organic solvent formed from a hydrocarbon not having a heteroelement. In the electrolytic solution of the present invention, the specific organic solvent is contained, relative to the entire solvent contained in the electrolytic solution of the present invention, by preferably not less than 80 vol %, more preferably not less than 90 vol %, and further preferably not less than 95 vol %. In addition, in the electrolytic solution of the present invention, the specific organic solvent is contained, relative to the entire solvent contained in the electrolytic solution of the present invention, by preferably not less than 80 mole %, more preferably not less than 90 mole %, and further preferably not less than 95 mole %.

An example of one mode of the electrolytic solution of the present invention is an electrolytic solution containing a specific organic solvent at a mole ratio of 3-5 relative to a metal salt, the specific organic solvent having a relative permittivity of not greater than 10 and/or a dipole moment of not greater than 5 D, the metal salt being a metal salt whose cation is an alkali metal, an alkaline earth metal, or aluminum and whose anion has a chemical structure represented by general formula (1) above.

In some cases, the electrolytic solution of the present invention containing another hetero organic solvent other than the specific organic solvent has an increased viscosity or a reduced ionic conductivity compared to the electrolytic solution of the present invention not containing another hetero organic solvent. Furthermore, in some cases, a secondary battery using the electrolytic solution of the present invention containing another hetero organic solvent other than the specific organic solvent has an increased reaction resistance.

The electrolytic solution of the present invention containing an organic solvent formed from the above hydrocarbon other than the specific organic solvent is expected to have an effect that the viscosity thereof is reduced.

Specific examples of the organic solvent formed from the above hydrocarbon include benzene, toluene, ethyl benzene, o-xylene, m-xylene, p-xylene, 1-methylnaphthalene, hexane, heptane, and cyclohexane.

In addition, to the electrolytic solution of the present invention, a fire-resistant solvent may be added. By adding the fire-resistant solvent to the electrolytic solution of the present invention, safety of the electrolytic solution of the present invention is further enhanced. Examples of the fire-resistant solvent include halogen based solvents such as carbon tetrachloride, tetrachloroethane, and hydrofluoroether, and phosphoric acid derivatives such as trimethyl phosphate and triethyl phosphate.

When the electrolytic solution of the present invention is mixed with a polymer or an inorganic filler to form a mixture, the mixture enables containment of the electrolytic solution to provide a pseudo solid electrolyte. By using the pseudo solid electrolyte as an electrolytic solution of a battery, leakage of the electrolytic solution in the battery is suppressed.

As the polymer, a polymer used in batteries such as lithium ion secondary batteries and a general chemically cross-linked polymer are used. In particular, a polymer capable of turning into a gel by absorbing an electrolytic solution, such as polyvinylidene fluoride and polyhexafluoropropylene, and one obtained by introducing an ion conductive group to a polymer such as polyethylene oxide are suitable.

Specific examples of the polymer include polymethyl acrylate, polymethyl methacrylate, polyethylene oxide, polypropylene oxide, polyacrylonitrile, polyvinylidene fluoride, polyethylene glycol dimethacrylate, polyethylene glycol acrylate, polyglycidol, polytetrafluoroethylene, polyhexafluoropropylene, polysiloxane, polyvinyl acetate, polyvinyl alcohol, polyacrylic acid, polymethacrylic acid, polyitaconic acid, polyfumaric acid, polycrotonic acid, polyangelic acid, polycarboxylic acid such as carboxymethyl cellulose, styrene-butadiene rubbers, nitrile-butadiene rubbers, polystyrene, polycarbonate, unsaturated polyester obtained through copolymerization of maleic anhydride and glycols, polyethylene oxide derivatives having a substituent group, and a copolymer of vinylidene fluoride and hexafluoropropylene. In addition, as the polymer, a copolymer obtained through copolymerization of two or more types of monomers forming the above described specific polymers may be selected.

Polysaccharides are also suitable as the polymer. Specific examples of the polysaccharides include glycogen, cellulose, chitin, agarose, carrageenan, heparin, hyaluronic acid, pectin, amylopectin, xyloglucan, and amylose. In addition, materials containing these polysaccharides may be used as the polymer, and examples of the materials include agar containing polysaccharides such as agarose.

As the inorganic filler, inorganic ceramics such as oxides and nitrides are preferable.

Inorganic ceramics have hydrophilic and hydrophobic functional groups on their surfaces. Thus, a conductive passage may form within the inorganic ceramics when the functional groups attract the electrolytic solution. Furthermore, the inorganic ceramics dispersed in the electrolytic solution form a network among the inorganic ceramics themselves due to the functional groups, and may serve as containment of the electrolytic solution. With such a function by the inorganic ceramics, leakage of the electrolytic solution in the battery is further suitably suppressed. In order to have the inorganic ceramics suitably exert the function described above, the inorganic ceramics having a particle shape are preferable, and those whose particle sizes are nano level are particularly preferable.

Examples of the types of the inorganic ceramics include common alumina, silica, titania, zirconia, and lithium phosphate. In addition, inorganic ceramics that have lithium conductivity themselves are preferable, and specific examples thereof include $Li_3N$, $LiI$, $LiI$—$Li_3N$—$LiOH$, $LiI$—$Li_2S$—$P_2O_5$, $LiI$—$Li_2S$—$P_2S_5$, $LiI$—$Li_2S$—$B_2S_3$, $Li_2O$—$B_2S_3$, $Li_2O$—$V_2O_3$—$SiO_2$, $Li_2O$—$B_2O_3$—$P_2O_5$, $Li_2O$—$B_2O_3$—$ZnO$, $Li_2O$—$Al_2O_3$—$TiO_2$—$SiO_2$—$P_2O_5$, $LiTi_2(PO_4)_3$, $Li$-$\beta Al_2O_3$, and $LiTaO_3$.

Glass ceramics may be used as the inorganic filler. Since glass ceramics enables containment of ionic liquids, the same effect is expected for the electrolytic solution of the present invention. Examples of the glass ceramics include compounds represented by $xLi_2S$-$(1-x)P_2S_5$ ($0<x<1$), and those in which one portion of S in the compound is substituted with another element and those in which one portion of P in the compound is substituted with germanium.

Without departing from the gist of the present invention, a known additive may be added to the electrolytic solution of the present invention. Examples of such a known additive include: cyclic carbonates including an unsaturated bond represented by vinylene carbonate (VC), vinylethylene carbonate (VEC), methyl vinylene carbonate (MVC), and ethyl vinylene carbonate (EVC); carbonate compounds represented by fluoro ethylene carbonate, trifluoro propylene carbonate, phenylethylene carbonate, and erythritane carbonate; carboxylic anhydrides represented by succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; lactones represented by γ-butyrolactone, γ-valerolactone, γ-caprolactone, δ-valerolactone, δ-caprolactone, and ε-caprolactone; cyclic ethers represented by 1,4-dioxane; sulfur-containing compounds represented by ethylene sulfite, 1,3-propanesultone, 1,4-butanesultone, methyl methanesulfonate, busulfan, sulfolane, sulfolene, dimethylsulfone, and tetramethylthiuram monosulfide; nitrogen-containing compounds represented by 1-methyl-2-pyrrolidinone, 1-methyl-2-piperidone, 3-methyl-2-oxazolidinone, 1,3-dimethyl-2-imidazolidinone, and N-methylsuccinimide; phosphates represented by monofluorophosphate and difluorophosphate; saturated hydrocarbon compounds represented by heptane, octane, and cycloheptane; and unsaturated hydrocarbon compounds represented by biphenyl, alkyl biphenyl, terphenyl, partially hydrogenated terphenyl, cyclohexylbenzene, t-butylbenzene, t-amyl benzene, diphenyl ether, and dibenzofuran.

Since the electrolytic solution of the present invention described above displays excellent ionic conductivity, the electrolytic solution is suitably used as an electrolytic solution of a power storage device such as a battery and a capacitor. The electrolytic solution of the present invention is preferably used particularly as electrolytic solutions of secondary batteries, and, among those, preferably used as electrolytic solutions of lithium ion secondary batteries. Hereinafter, a secondary battery provided with the electrolytic solution of the present invention is sometimes referred to as a secondary battery of the present invention, and a lithium ion secondary battery provided with the electrolytic solution of the present invention is sometimes referred to as a lithium ion secondary battery of the present invention.

Meanwhile, in general, a coating is known to form on the surfaces of the negative electrode and the positive electrode in a secondary battery. This coating is also known as SEI (solid electrolyte interphase), and is formed from reductive degradation products, etc. of an electrolytic solution. For example, JP200719027(A) describes such an SEI coating.

The SEI coating on the surfaces of the negative electrode and the positive electrode allows a charge carrier such as lithium ions to pass therethrough. In addition, the SEI coating on the surface of the negative electrode is considered to exist between the negative electrode surface and the electrolytic solution, and to suppress further reductive degradation of the electrolytic solution. The existence of the SEI coating is considered to be essential for a low potential negative electrode using a graphite- or Si-based negative electrode active material.

If continuous degradation of the electrolytic solution is suppressed due to the existence of the SEI coating, the discharge characteristics of the secondary battery after the charging and discharging cycle is considered to be improved. However, on the other hand, in a conventional secondary battery, the SEI coating on the surfaces of the negative electrode and the positive electrode has not necessarily been considered to contribute to improvement in battery characteristics.

In the electrolytic solution of the present invention, the chemical structure of the metal salt represented by the general formula (1) includes $SO_2$. When the electrolytic solution of the present invention is used as an electrolytic solution of a secondary battery, an S- and O-containing coating is estimated to be formed on the surface of the positive electrode and/or the negative electrode of the secondary battery as a result of partial degradation of the metal salt through charging and discharging of the secondary battery. The S- and O-containing coating is estimated to have the S=O structure. Since deterioration of the electrodes and the electrolytic solution is suppressed by the electrodes being coated with the coating, durability of the secondary battery is considered to be improved.

In the electrolytic solution of the present invention, a cation and an anion are considered to exist closer to each other when compared to a conventional electrolytic solution, and thus the anion is considered to be more likely to be reduced and degraded by being under strong electrostatic influence from the cation when compared to a conventional electrolytic solution. In a conventional secondary battery using a conventional electrolytic solution, the SEI coating is formed from a degradation product caused by reductive degradation of a cyclic carbonate such as ethylene carbonate contained in the electrolytic solution. However, as described above, in the electrolytic solution of the present invention in the secondary battery of the present invention, the anion is easy to be reduced and degraded, and in addition, the metal salt is contained at a higher concentration than in a conventional electrolytic solution, and thus, the anion concentration in the electrolytic solution is high. Thus, the SEI coating, i.e., the S- and O-containing coating, in the lithium ion secondary battery of the present invention is considered to contain much degradation product derived from the anion. In addition, in the lithium ion secondary battery of the present invention, the SEI coating is formed without using a cyclic carbonate such as ethylene carbonate.

In some cases, the state of the S- and O-containing coating in the secondary battery of the present invention changes associated with charging and discharging. For example, the thickness of the S- and O-containing coating and the proportion of elements in the coating reversibly change sometimes depending on the state of charging and discharging. Thus, a portion that is derived from the degradation product of the anion as described above and is fixed in the coating, and a portion that reversibly increases and decreases associated with charging and discharging are considered to exist in the S- and O-containing coating in the secondary battery of the present invention.

Since the S- and O-containing coating is considered to be derived from the degradation product of the electrolytic solution, a large portion or the entirety of the S- and O-containing coating is considered to be produced during and after the first charging and discharging of the secondary battery. That is, the secondary battery of the present invention has the S- and O-containing coating on the surface of the negative electrode and/or the surface of the positive electrode when being used. Components of the S- and O-containing coating are considered to be sometimes different depending on the composition of the electrode and the components contained in the electrolytic solution. In the S- and O-containing coating, the content proportion of S and O is not limited in particular. Further, components other than S and O and the amount thereof included in the S- and O-containing coating are not limited in particular. Since the S- and O-containing coating is considered to be derived from the anion of the metal salt contained in the electrolytic solution of the present invention, components derived from the anion of the metal salt are preferably contained in an amount greater than that of other components.

The S- and O-containing coating may be formed only on the negative electrode surface or may be formed only on the positive electrode surface. Preferably, the S- and O-containing coating is formed both on the negative electrode surface and the positive electrode surface.

The secondary battery of the present invention includes an S- and O-containing coating on the electrode, and the S- and O-containing coating is considered to have the S=O structure and contain a large amount of the cation. Furthermore, the cation contained in the S- and O-containing coating is considered to be preferentially supplied to the electrode. Thus, since the secondary battery of the present invention has an abundant source of cation near the electrode, transportation rate of the cation is considered to be also improved. As a result, the secondary battery of the present invention is considered to exhibit excellent battery characteristics because of cooperation between the electrolytic solution of the present invention and the S- and O-containing coating on the electrode.

As described above, by charging and discharging the secondary battery of the present invention, the S- and O-containing coating is estimated to be formed on the surface of the positive electrode and/or the negative electrode of the secondary battery of the present invention. The S- and O-containing coating of the secondary battery of the present invention may contain C, and may contain: a cation element such as Li; N; H; or a halogen such as F. C is estimated to be derived from an organic solvent contained in the electrolytic solution, such as a linear carbonate represented by the general formula (2).

When the bond energy of elements contained in the S- and O-containing coating is measured by using X-ray photoelectron spectroscopy, the S- and O-containing coating is preferably observed to have at least one of the following peaks.

S: Peak having the peak top at 169±2 eV (hereafter, sometimes abbreviated as "169 eV peak")

S: Peak having the peak top at 160±2 eV (hereinafter, sometimes abbreviated as "160 eV peak")

O: Peak having the peak top at 532±2 eV (hereinafter, sometimes abbreviated as "532 eV peak")

O: Peak having the peak top at 528±1.5 eV (hereinafter, sometimes abbreviated as "528 eV peak")

C: Peak having the peak top at 290±2 eV (hereinafter, sometimes abbreviated as "290 eV peak")

C: peak having the peak top at 285±1 eV (hereinafter, sometimes abbreviated as "285 eV peak")

C: Peak having the peak top at a value smaller by 1 to 4 eV than the peak having the peak top at 285±1 eV (hereinafter sometimes abbreviated as "283 eV peak")

In a case where the S- and O-containing coating is analyzed by use of X-ray photoelectron spectroscopy, if the intensity of the measured 285 eV peak is assumed to be 100, the intensity of the 283 eV peak is preferably in a range of 0 to 50, more preferably in a range of 3 to 40, and further preferably in a range of 5 to 30. The resistance of the secondary battery of the present invention is estimated to be sufficiently reduced when the intensity of the 283 eV peak is smaller.

The peak regarding the bond energy described above is estimated to be attributed to at least one of the following bonds.

S: 169 eV peak→S-Ox bond (x is an integer from 1 to 4), S=O bond

S: 160 eV peak→S—Li bond, Li—S—Li bond

O: 528 eV peak→O—Li bond, Li—O—Li bond

C: 290 eV peak→O—C—O bond

C: 285 eV peak→C—H bond, C—C bond, C=C bond

Attributions of the peaks are also supported through quantum chemistry calculation. Actually, with respect to the attribution of carbon, when the molecular structure was optimized by using density functional theory and the level of is orbital of carbon was calculated, validity of attributions of the peaks described above were supported. As the quantum chemistry calculation program, Gaussian09 (registered trademark, Gaussian, Inc.) was used, the density functional was B3LYP, and the basis function was 6-311++G(d,p) in which a polarization function and a dispersion function were added.

As the element percentages of a cation element such as Li; C; N; O; a halogen such as F; and S in the S- and O-containing coating, the following ranges are shown as examples. The percentages of the elements are values calculated from analysis results obtained through X-ray photoelectron spectroscopy.

Cation element: 10 to 30%, C: 20 to 50% (in which 0 to 10% or 0 to 5% is derived from the 283 eV peak), N: 0.5 to 5%, O: 20 to 50%, halogen: 0.5 to 5%, S: 0.5 to 5%

Examples of the suitable ranges of percentages of elements in the S- and O-containing coating are shown below.

Cation element: 15 to 25%, C: 30 to 45% (in which 0 to 10% or 0 to 5% is derived from the 283 eV peak), N: 1 to 4%, O: 30 to 45%, halogen: 1 to 4%, S: 2 to 4.5%

As a result of thorough investigation by the present inventors, the present inventors have found a plurality of effective methods for forming the S- and O-containing coating in the secondary battery of the present invention. These methods are understandable as suitable manufacturing methods for the secondary battery of the present invention, and are understandable as adjustment method or activation method for the secondary battery of the present invention. Hereinafter, these methods are sometimes comprehensively referred to as "the activation method for the secondary battery of the present invention".

An activation method of the secondary battery of the present invention is characterized by performing, on the secondary battery of the present invention, an activation process including step (a), step (b), and step (c) described below, or step (a) and step (d) described below. Without departing from the gist of the present invention, a current pause time or a voltage keeping time may be provided in each step or between steps.

(a) a step of performing charging to a second voltage $V_2$ in step (a-1) or step (a-2) below (a-1) a step of performing charging at a first rate $C_1$ to a first voltage $V_1$ and then performing charging at a second rate $C_2$ to the second voltage $V_2$ ($V_1<V_2$, $C_1<C_2$)

(a-2) a step of performing charging at a constant charging rate $C_{a-2}$ of 0.5 C or higher to the second voltage $V_2$ (b) a step of discharging the secondary battery having been subjected to step (a), at a third rate $C_3$ to a third voltage $V_3$ or lower (c) a step of performing charging and discharging at a fourth rate $C_4$ between the third voltage $V_3$ and the second voltage $V_2$ (d) a step of keeping the temperature of the secondary battery in a range of 40 to 120° C.

In step (a), either step (a-1) or step (a-2) is selected to charge the secondary battery to the second voltage $V_2$. Step (a) may be performed at an ordinary temperature (25° C.), or under a cooling condition or a heating condition. Step (a) is preferably performed under a constant temperature condition. The range of the second voltage $V_2$ is 3.5 to 6 V, preferably 3.6 to 5.5 V, more preferably 3.7 to 5 V, and further preferably 3.8 to 4.5 V, for example.

Step (a-1) is a step of performing charging at the first rate $C_1$ to the first voltage $V_1$, and then performing charging at the second rate $C_2$ to the second voltage $V_2$ ($V_1<V_2$, $C_1<C_2$). As the first voltage $V_1$, a voltage satisfying $0.5\times V_2<V_1<V_2$ is preferable, a voltage satisfying $0.6\times V_2<V_1<0.95\times V_2$ is more preferable, and a voltage satisfying $0.7\times V_2<V_1<0.9\times V_2$ is further preferable.

The relationship between the first rate $C_1$ and the second rate $C_2$ is $C_1<C_2$, and is preferably $C_1<0.7\times C_2$, more preferably $C_1<0.5\times C_2$, and further preferably $C_1<0.3\times C_2$. Specific examples of the first rate $C_1$ include 0.05 C, 0.1 C, and 0.2 C. Specific examples of the second rate $C_2$ include 0.5 C, 0.8 C, and 1 C. 1 C means a current value required for fully charging or discharging the secondary battery in 1 hour with a constant current. 2 C means a current value required for fully charging or discharging the secondary battery in 0.5 hours with a constant current.

Step (a-2) is a step of performing charging at a constant charging rate $C_{a-2}$ of 0.5 C or greater to a second voltage $V_2$. The charging rate $C_a$-2 is preferably 1 C or greater. Examples of the range of the charging rate $C_{a-2}$ include 0.5 C≤$C_{a-2}$≤15 C, 1 C≤$C_{a-2}$≤13 C, and 2 C≤$C_{a-2}$≤11 C.

In each of step (a-1) and step (a-2), after charging to the second voltage $V_2$ has been performed, charging for keeping the voltage is preferably performed. Examples of the second voltage $V_2$ keeping period include 0.5 to 5 hours and 1 to 3 hours.

In the activation method for the secondary battery of the present invention, a charging and discharging step including step (b) and step (c) described below, or a process including step (d) described below is performed on the secondary battery having been subjected to step (a) described above.

(b) a step of performing discharging the secondary battery having been subjected to step (a), at the third rate $C_3$ to the third voltage $V_3$ or lower (c) a step of performing charging and discharging at the fourth rate $C_4$ between the third voltage $V_3$ and the second voltage $V_2$ (d) a step of keeping the temperature of the secondary battery in a range of 40 to 120° C.

First, the charging and discharging step including step (b) and step (c) is described.

The discharge voltage in step (b) may be any voltage not greater than the third voltage $V_3$ in step (c), and examples of the range thereof include $0.8\times V_3$ to $V_3$.

Examples of the range of the third rate $C_3$ include 0.5 C≤$C_3$≤10 C, 0.5 C≤$C_3$≤6 C, 1 C≤$C_3$≤6 C, 0.5 C≤$C_3$≤3 C, and 1 C≤$C_3$≤3 C.

Step (b) may be performed at an ordinary temperature (25° C.), or under a cooling condition or a heating condition. Step (b) is preferably performed under a constant temperature condition. After discharging in step (b) has been ended, charging for keeping the voltage is preferably performed. Examples of the keeping period include 0.5 to 5 hours and 1 to 3 hours.

As the third voltage $V_3$ in step (c), a voltage satisfying $0.5 \times V_2 < V_3 < V_2$ is preferable, a voltage satisfying $0.6 \times V_2 < V_3 < 0.9 \times V_2$ is more preferable, and a voltage satisfying $0.7 \times V_2 < V < 0.90 \times V_2$ is further preferable.

Examples of the range of the fourth rate $C_4$ in step (c) include $0.5 \text{ C} \le C_4 \le 10 \text{ C}$, $1 \text{ C} \le C_4 \le 6 \text{ C}$, and $1 \text{ C} \le C_4 \le 3 \text{ C}$. $C_3 < C_4$ is preferable. When step (a) is step (a-1), the relationship among the first rate $C_1$, the second rate $C_2$, the third rate $C_3$, and the fourth rate $C_4$ preferably satisfies $C_1 < C_2 < C_3 < C_4$.

The temperature in step (c) is preferably in a range of 40 to 120° C., and more preferably in a range of 50 to 100° C. Step (c) is preferably performed under a constant temperature condition. In addition, step (c) is preferably repeated. Examples of the number of times of the repetition include 5 to 50 times, and 20 to 40 times. After each charging and discharging in step (c), charging for keeping the voltage may be performed. Examples of the keeping period include 0.1 to 2 hours, and 0.2 to 1 hours.

Next, step (d) is described. In step (d), the temperature of the secondary battery may be kept in a range of 40 to 120° C. while keeping constant the voltage of the charged secondary battery having been subjected to step (a). Alternatively, the temperature of the secondary battery may be kept in a range of 40 to 120° C. without keeping constant (naturally occurring voltage) the voltage of the charged secondary battery having been subjected to step (a). Further, in step (d), after the voltage of the secondary battery is once adjusted to a specific value, the temperature of the secondary battery may be kept in a range of 40 to 120° C. An example of a more preferable temperature range for step (d) is 50 to 120° C., and an example of a further preferable temperature range for step (d) is 50 to 100° C.

Examples of the temperature keeping period in step (d) include 0.5 to 48 hours, 12 to 36 hours, and 18 to 30 hours. Step (d) may be performed on the secondary battery having been subjected to step (c).

An activation process for a conventional common secondary battery is performed by: charging the secondary battery at 0.1 C to the second voltage $V_2$, and then, discharging the secondary battery at 0.1 C to the third voltage $V_3$; or charging the secondary battery at 0.1 mV/s to the second voltage $V_2$, and then discharging the secondary battery at 0.1 mV/s to the third voltage $V_3$. That is, the activation method for the secondary battery of the present invention is performed under a severer condition than that of the conventional activation process. In addition, due to the activation method for the secondary battery of the present invention, the secondary battery of the present invention exhibits an effect of suitably maintaining the capacity thereof.

Through the activation method for the secondary battery of the present invention, the following charging/discharging control device of the present invention is understood.

A charging/discharging control device of the present invention includes a control unit for performing, on the secondary battery of the present invention, the activation process including step (a), step (b), and step (c), or step (a) and step (d) in the activation method for the secondary battery of the present invention. The charging/discharging control device of the present invention may be installed in a production facility for the secondary battery, or may be installed in a charging system for charging the secondary battery before or after shipping of the secondary battery. The charging/discharging control device of the present invention, or the production facility or the charging system preferably includes a temperature control unit which controls the temperature of the secondary battery.

The lithium ion secondary battery of the present invention provided with the electrolytic solution of the present invention is described below.

The lithium ion secondary battery of the present invention includes: a negative electrode having a negative electrode active material capable of occluding and releasing lithium ions; a positive electrode having a positive electrode active material capable of occluding and releasing lithium ions; and the electrolytic solution of the present invention using a lithium salt as the metal salt.

As the negative electrode active material, a material capable of occluding and releasing lithium ions is used. Thus, the material is not limited in particular as long as the material is an elemental substance, an alloy, or a compound capable of occluding and releasing lithium ions. For example, an elemental substance from among Li, group 14 elements such as carbon, silicon, germanium, and tin, group 13 elements such as aluminum and indium, group 12 elements such as zinc and cadmium, group 15 elements such as antimony and bismuth, alkaline earth metals such as magnesium and calcium, and group 11 elements such as silver and gold may be used as the negative electrode active material. When silicon or the like is used as the negative electrode active material, a high capacity active material is obtained since a single silicon atom reacts with multiple lithium atoms. However, a risk of occurrence of a problem regarding a significant expansion and contraction of volume associated with occlusion and release of lithium exists. Thus, in order to mitigate the risk, an alloy or a compound obtained by combining an elemental substance of silicon or the like with another element such as a transition metal is suitably used as the negative electrode active material. Specific examples of the alloy or the compound include tin-based materials such as Ag—Sn alloys, Cu—Sn alloys, and Co—Sn alloys, carbon based materials such as various graphites, silicon based materials such as $SiO_x$ ($0.3 \le x \le 1.6$) that undergoes disproportionation into the elemental substance silicon and silicon dioxide, and a complex obtained by combining a carbon based material with elemental substance silicon or a silicon based material. In addition, as the negative electrode active material, an oxide such as $Nb_2O_5$, $TiO_2$, $Li_4Ti_5O_{12}$, $WO_2$, $MoO_2$, and $Fe_2O_3$, or a nitride represented by $Li_{3-x}M_xN$ (M=Co, Ni, Cu) may be used. With regard to the negative electrode active material, one or more types described above may be used.

A more specific example of the negative electrode active material is a graphite whose G/D ratio is not lower than 3.5. The G/D ratio is the ratio of G-band and D-band peaks in a Raman spectrum. In the Raman spectrum of graphite, G-band is observed near 1590 $cm^{-1}$ and D-band is observed near 1350 $cm^{-1}$, as peaks, respectively. G-band is derived from a graphite structure and D-band is derived from defects. Thus, having a higher G/D ratio, which is the ratio of G-band and D-band, means the graphite has higher crystallinity with fewer defects. Hereinafter, a graphite whose G/D ratio is not lower than 3.5 is sometimes referred to as a high-crystallinity graphite, and a graphite whose G/D ratio is lower than 3.5 is sometimes referred to as a low-crystallinity graphite.

As such a high-crystallinity graphite, both natural graphites and artificial graphites may be used. When a classification method based on shape is used, flake-like graphites, spheroidal graphites, block-like graphite, earthy graphites, and the like may be used. In addition, coated graphites obtained by coating the surface of a graphite with a carbon material or the like may also be used.

Examples of specific negative electrode active materials include carbon materials whose crystallite size is not larger than 20 nm, and preferably not larger than 5 nm. A larger crystallite size means that the carbon material has atoms arranged periodically and precisely in accordance with a certain rule. On the other hand, a carbon material whose crystallite size is not larger than 20 nm is considered to have atoms being in a state of poor periodicity and poor preciseness in arrangement. For example, when the carbon material is a graphite, the crystallite size becomes not larger than 20 nm when the size of a graphite crystal is not larger than 20 nm or when atoms forming the graphite are arranged irregularly due to distortion, defects, and impurities, etc.

Representative carbon materials whose crystallite size is not larger than 20 nm include hardly graphitizable carbon which is so-called hard carbon, and easily graphitizable carbon which is so-called soft carbon.

In order to measure the crystallite size of the carbon material, an X-ray diffraction method using CuK-alpha radiation as an X-ray source may be used. With the X-ray diffraction method, the crystallite size is calculated using the following Scherrer's equation on the basis of a half width of a diffraction peak detected at a diffraction angle of 2θ=20 degrees to 30 degrees and the diffraction angle.

$L=0.94\lambda/(\beta \cos \theta)$ where
L: crystallite size
λ: incident X-ray wavelength (1.54 angstrom)
δ: half width of peak (radian)
θ: diffraction angle.

Specific examples of the negative electrode active material include materials containing silicon. A more specific example is $SiO_x$ ($0.3 \leq x \leq 1.6$) disproportionated into two phases of Si phase and silicon oxide phase. The Si phase in $SiO_x$ is capable of occluding and releasing lithium ions, and changes in volume associated with charging and discharging of the secondary battery. The silicon oxide phase changes less in volume associated with charging and discharging when compared to the Si phase. Thus, $SiO_x$ as the negative electrode active material achieves higher capacity because of the Si phase, and when included in the silicon oxide phase, suppresses change in volume of the entirety of the negative electrode active material. When "x" becomes smaller than a lower limit value, cycle characteristics of the secondary battery deteriorate since the change in volume during charging and discharging becomes too large due to the ratio of Si becoming excessive. On the other hand, if "x" becomes larger than an upper limit value, energy density is decreased due to the Si ratio being too small. The range of "x" is more preferably $0.5 \leq x \leq 1.5$, and further preferably $0.75 \leq x \leq 1.2$.

In $SiO_x$ described above, an alloying reaction between lithium and silicon in the Si phase is considered to occur during charging and discharging of the lithium ion secondary battery. This alloying reaction is considered to contribute to charging and discharging of the lithium ion secondary battery. Also in the negative electrode active material including tin described later, charging and discharging are considered to occur by an alloying reaction between tin and lithium.

Specific examples of the negative electrode active material include materials containing tin. More specific examples include Sn elemental substance, tin alloys such as Cu—Sn and Co—Sn, amorphous tin oxides, and tin silicon oxides. Examples of the amorphous tin oxides include $SnB_{0.4}P_{0.6}O_{3.1}$, and examples of the tin silicon oxides include $SnSiO_3$.

The material containing silicon and the material containing tin described above are each preferably made into a composite with a carbon material to be used as the negative electrode active material. By using those materials as a composite, the structure particularly of silicon and/or tin is stabilized, and durability of the negative electrode is improved. Making a composite mentioned above may be performed by a known method. As the carbon material used in the composite, a graphite, a hard carbon, a soft carbon, etc. may be used. The graphite may be a natural graphite or an artificial graphite.

Specific examples of the negative electrode active material include lithium titanate having a spinel structure such as $Li_{4+x}Ti_{5+y}O_{12}$ ($-1 \leq x \leq 4$, $-1 \leq y \leq 1$) and lithium titanate having a ramsdellite structure such as $Li_2Ti_3O_7$.

Specific examples of the negative electrode active material include graphites having a value of long axis/short axis of 1 to 5, and preferably 1 to 3. Here, the long axis means the length of the longest portion of a graphite particle. The short axis means the longest length in directions perpendicular to the long axis. Spheroidal graphites and meso carbon micro beads correspond to the graphite. The spheroidal graphites mean carbon materials which are artificial graphite, natural graphite, easily graphitizable carbon, and hardly graphitizable carbon, for example, and which have spheroidal or substantially spheroidal shapes.

Spheroidal graphite is obtained by grinding graphite into flakes by means of an impact grinder having a relatively small crushing force and by compressing and spheroidizing the flakes. Examples of the impact grinder include a hammer mill and a pin mill. The above operation is preferably performed with the outer-circumference line speed of the hammer or the pin of the mill set at about 50 to 200 m/s. Supply and ejection of graphite with respect to such mills are preferably performed in association with a current of air or the like.

The graphite is preferably have a BET specific surface area in a range of 0.5 to 15 $m^2/g$, and more preferably in a range of 4 to 12 $m^2/g$. When the BET specific surface area is too large, side reaction between the graphite and the electrolytic solution is accelerated in some cases. When the BET specific surface area is too small, reaction resistance of the graphite becomes large in some cases.

The mean particle diameter of the graphite is preferably in a range of 2 to 30 μm, and more preferably in a range of 5 to 20 μm. The mean particle diameter means D50 measured by a general laser diffraction scattering type particle size distribution measuring device.

The negative electrode includes a current collector, and a negative electrode active material layer bound to the surface of the current collector.

The current collector refers to an electron conductor that is chemically inert for continuously sending a flow of current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, or molybdenum, and metal materials such as stainless steel. The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 µm to 100 µm.

The negative electrode active material layer includes a negative electrode active material, and, if necessary, a binding agent and/or a conductive additive.

The binding agent serves to adhere the active material, the conductive additive, or the like, to the surface of the current collector.

As the binding agent, a known binding agent may be used such as a fluorine-containing resin such as polyvinylidene fluoride, polytetrafluoroethylene, or fluororubber, a thermoplastic resin such as polypropylene or polyethylene, an imide based resin such as polyimide or polyamide-imide, an alkoxysilyl group-containing resin, or a styrene butadiene rubber.

In addition, a polymer having a hydrophilic group may be used as the binding agent. The secondary battery of the present invention provided with a polymer having a hydrophilic group as the binding agent more suitably maintains the capacity thereof. Examples of the hydrophilic group of the polymer having a hydrophilic group include carboxyl group, sulfo group, silanol group, amino group, hydroxyl group, and phosphoric acid based group such as phosphoric acid group. Among those described above, a polymer containing a carboxyl group in the molecule thereof, such as polyacrylic acid, carboxymethyl cellulose, and polymethacrylic acid, or a polymer containing a sulfo group such as poly(p-styrenesulfonic acid) is preferable.

A polymer containing a large number of carboxyl groups and/or sulfo groups, such as polyacrylic acid or a copolymer of acrylic acid and vinylsulfonic acid, is water soluble. The polymer containing the hydrophilic group is preferably a water soluble polymer, and is preferably a polymer containing multiple carboxyl groups and/or sulfo groups in a single molecule thereof in terms of the chemical structure.

A polymer containing a carboxyl group in the molecule thereof is produced through, for example, a method of polymerizing an acid monomer or a method of imparting a carboxyl group to a polymer. Examples of the acid monomer include acid monomers having one carboxyl group in respective molecules such as acrylic acid, methacrylic acid, vinylbenzoic acid, crotonic acid, pentenoic acid, angelic acid, and tiglic acid, and acid monomers having two or more carboxyl groups in respective molecules such as itaconic acid, mesaconic acid, citraconic acid, fumaric acid, maleic acid, 2-pentenedioic acid, methylenesuccinic acid, allylmalonic acid, isopropylidene succinic acid, 2,4-hexadienedioic acid, and acetylene dicarboxylic acid.

A copolymer obtained through polymerization of two or more types of acid monomers selected from the acid monomers described above may be used as the binding agent.

For example, as disclosed in JP2013065493 (A), a polymer that includes in the molecule thereof an acid anhydride group formed through condensation of carboxyl groups of a copolymer of acrylic acid and itaconic acid is also preferably used as the binding agent. Since the binding agent has a structure derived from a monomer with high acidity by having two or more carboxyl groups in a single molecule thereof, the binding agent is considered to easily trap the lithium ions and the like before a degradation reaction of the electrolytic solution occurs during charging. Furthermore, although the polymer has an increased acidity because the polymer has more carboxyl groups per monomer when compared to polyacrylic acid and polymethacrylic acid, the acidity is not increased too much because a certain amount of carboxyl groups have changed into acid anhydride groups. Therefore, the secondary battery having the negative electrode using the polymer as the binding agent has improved initial efficiency and improved input-output characteristics.

The blending ratio of the binding agent in the negative electrode active material layer in mass ratio is preferably negative electrode active material: binding agent=1:0.005 to 1:0.3. The reason is that when too little of the binding agent is contained, moldability of the electrode deteriorates, whereas too much of the binding agent is contained, energy density of the electrode becomes low.

The conductive additive is added for increasing conductivity of the electrode. Thus, the conductive additive is preferably added optionally when conductivity of the electrode is insufficient, and does not have to be added when conductivity of the electrode is sufficiently good. As the conductive additive, a fine electron conductor that is chemically inert may be used, and examples thereof include carbonaceous fine particles such as carbon black, graphite, acetylene black, Ketchen black (registered trademark), vapor grown carbon fiber (VGCF), and various metal particles. With regard to the conductive additive described above, a single type by itself, or a combination of two or more types may be added to the active material layer. The blending ratio of the conductive additive in the negative electrode active material layer in mass ratio is preferably negative electrode active material: conductive additive=1: 0.01 to 1:0.5. The reason is that when too little of the conductive additive is contained, efficient conducting paths are not formed, whereas when too much of the conductive additive is contained, moldability of the negative electrode active material layer deteriorates and energy density of the electrode becomes low.

The positive electrode used in the lithium ion secondary battery includes a positive electrode active material capable of occluding and releasing lithium ions. The positive electrode includes a current collector and a positive electrode active material layer bound to the surface of the current collector. The positive electrode active material layer includes a positive electrode active material, and, if necessary, a binding agent and/or a conductive additive. The current collector of the positive electrode is not limited in particular as long as the current collector is a metal capable of withstanding a voltage suited for the active material that is used. Examples of the current collector include at least one selected from silver, copper, gold, aluminum, tungsten, cobalt, zinc, nickel, iron, platinum, tin, indium, titanium, ruthenium, tantalum, chromium, and molybdenum, and metal materials such as stainless steel.

When the potential of the positive electrode is set to not lower than 4V using lithium as reference, aluminum is preferably used as the current collector.

Specifically, as the positive electrode current collector, one formed from aluminum or an aluminum alloy is preferably used. Here, aluminum refers to pure aluminum, and an aluminum whose purity is not less than 99.0% is referred to as pure aluminum. An alloy obtained by adding various elements to pure aluminum is referred to as an aluminum alloy. Examples of the aluminum alloy include those that are Al—Cu based, Al—Mn based, Al—Fe based, Al—Si based, Al—Mg based, Al—Mg—Si based, and Al—Zn—Mg based.

In addition, specific examples of aluminum or the aluminum alloy include A1000 series alloys (pure aluminum based) such as JIS A1085, A1N30, etc., A3000 series alloys (Al—Mn based) such as JIS A3003, A3004, etc., and A8000 series alloys (Al—Fe based) such as JIS A8079, A8021, etc.

The current collector may be coated with a known protective layer. One obtained by treating the surface of the current collector with a known method may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil are suitably used. When the current collector is in the form of a foil, a sheet, or a film, the thickness thereof is preferably in a range of 1 μm to 100 μm.

As the binding agent and the conductive additive for the positive electrode, those described with respect to the negative electrode are used at similar blending ratios.

Examples of the positive electrode active material include layer compounds that are $Li_aNi_bCo_cMn_dD_eO_f$ (0.2≤a≤1.2; b+c+d+e=1; 0≤e<1; D is at least one element selected from Li, Fe, Cr, Cu, Zn, Ca, Mg, S, Si, Na, K, Al, Zr, Ti, P, Ga, Ge, V, Mo, Nb, W, or La; 1.7≤f≤2.1) and $Li_2MnO_3$. Additional examples of the positive electrode active material include metal oxides having a spinel structure such as $LiMn_2O_4$, a solid solution formed from a mixture of a metal oxide having a spinel structure and a layer compound, and polyanion based compounds represented by $LiMPO_4$, $LiMVO_4$, $Li_2MSiO_4$ (where "M" is selected from at least one of Co, Ni, Mn, or Fe), or the like. Further additional examples of the positive electrode active material include tavorite based compounds represented by $LiMPO_4F$ ("M" is a transition metal) such as $LiFePO_4F$ and borate based compounds represented by $LiMBO_3$ ("M" is a transition metal) such as $LiFeBO_3$. Any metal oxide used as the positive electrode active material may have a basic composition of the composition formulae described above, and those in which a metal element included in the basic composition is substituted with another metal element may also be used. In addition, as the positive electrode active material, one that does not contain a charge carrier (e.g., a lithium ion contributing to the charging and discharging) may also be used. For example, elemental substance sulfur (S), a compound that is a composite of sulfur and carbon, metal sulfides such as $TiS_2$, oxides such as $V_2O_5$ and $MnO_2$, polyaniline and anthraquinone and compounds containing such aromatics in the chemical structure, conjugate based materials such as conjugate diacetic acid based organic matters, and known other materials may be used. Furthermore, a compound having a stable radical such as nitroxide, nitronyl nitroxide, galvinoxyl, and phenoxyl may be used as the positive electrode active material. When a positive electrode active material not containing a charge carrier such as lithium is to be used, a charge carrier has to be added in advance to the positive electrode and/or the negative electrode using a known method. The charge carrier may be added in an ionic state, or may be added in a nonionic state such as a metal. For example, when the charge carrier is lithium, a lithium foil may be pasted to and integrated with the positive electrode and/or the negative electrode.

Specific examples of the positive electrode active material include $LiNi_{0.5}Co_{0.2}Mn_{0.3}O_2$, $LiNi_{1/3}Co_{1/3}Mn_{1/3}O_2$, $LiNi_{0.5}Mn_{0.5}O_2$, $LiNi_{0.75}Co_{0.1}Mn_{0.15}O_2$, $LiMnO_2$, $LiNiO_2$, and $LiCoO_2$ having a layered rock salt structure. Another specific example of the positive electrode active material is $Li_2MnO_3$—$LiCoO_2$.

Specific examples of the positive electrode active material include $Li_xA_yMn_{2-y}O_4$ having a spinel structure ("A" is at least one element selected from Ca, Mg, S, Si, Na, K, Al, P, Ga, or Ge, and at least one type of metal element selected from transition metal elements, 0<x≤2.2, 0≤y≤1). More specific examples include $LiMn_2O_4$, and $LiNi_{0.5}Mn_{1.5}O_4$.

Specific examples of the positive electrode active material include $LiFePO_4$, $Li_2FeSiO_4$, $LiCoPO_4$, $Li_2CoPO_4$, $Li_2MnPO_4$, $Li_2MnSiO_4$, and $Li_2CoPO_4F$.

In order to form the active material layer on the surface of the current collector, the active material may be applied on the surface of the current collector using a known conventional method such as roll coating method, die coating method, dip coating method, doctor blade method, spray coating method, and curtain coating method. Specifically, an active material layer forming composition containing the active material and, if necessary, the binding agent and the conductive additive, is prepared, and, after adding a suitable solvent to this composition to obtain a paste, the paste is applied on the surface of the current collector and then dried. Examples of the solvent include N-methyl-2-pyrrolidone, methanol, methyl isobutyl ketone, and water. In order to increase electrode density, compression may be performed after drying.

A separator is used in the lithium ion secondary battery, if necessary. The separator is for separating the positive electrode and the negative electrode to allow passage of lithium ions while preventing short circuit due to a contact of both electrodes. As the separator, one that is known may be used. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

A specific method for manufacturing the lithium ion secondary battery of the present invention is described.

An electrode assembly is formed from the positive electrode, the negative electrode, and, if necessary, the separator interposed therebetween. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting, using current collecting leads or the like, the positive electrode current collector to a positive electrode external connection terminal and the negative electrode current collector to a negative electrode external connection terminal, and then adding the electrolytic solution of the present invention to the electrode assembly. In addition, the lithium ion secondary battery of the present invention preferably executes charging and discharging in a voltage range suitable for the types of active materials contained in the electrodes.

The form of the lithium ion secondary battery of the present invention is not limited in particular, and various forms such as a cylindrical type, a square type, a coin type, a laminated type, etc., are used.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of instruments on which the lithium ion secondary battery may be mounted include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

A capacitor of the present invention provided with the electrolytic solution of the present invention may be formed by replacing, with active carbon or the like that is used as a polarized electrode material, a part or all of the negative electrode active material or the positive electrode active material, or a part or all of the negative electrode active material and the positive electrode active material, in the lithium ion secondary battery of the present invention described above. Examples of the capacitor of the present invention include electrical double layer capacitors and hybrid capacitors such as lithium ion capacitors. As the description of the capacitor of the present invention, the description of the lithium ion secondary battery of the present invention above in which "lithium ion secondary battery" is replaced by "capacitor" as appropriate is used.

Although embodiments of the electrolytic solution of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described specifically by presenting Examples and Comparative Examples. The present invention is not limited to these Examples. Hereinafter, unless mentioned otherwise in particular, "part(s)" refers to part(s) by mass, and "%" refers to mass %.

Example 1-1

$(FSO_2)_2NLi$ serving as the metal salt was dissolved in dimethyl carbonate serving as the specific organic solvent, whereby an electrolytic solution of Example 1-1 having $(FSO_2)_2NLi$ at a concentration of 3.0 mol/L was produced. In the electrolytic solution of Example 1-1, the organic solvent is contained at a mole ratio of 3 relative to the metal salt.

Example 1-2

$(FSO_2)_2NLi$ serving as the metal salt was dissolved in dimethyl carbonate serving as the specific organic solvent, whereby an electrolytic solution of Example 1-2 having $(FSO_2)_2NLi$ at a concentration of 2.7 mol/L was produced. In the electrolytic solution of Example 1-2, the organic solvent is contained at a mole ratio of 3.5 relative to the metal salt.

Example 1-3

$(FSO_2)_2NLi$ serving as the metal salt was dissolved in dimethyl carbonate serving as the specific organic solvent, whereby an electrolytic solution of Example 1-3 having $(FSO_2)_2NLi$ at a concentration of 2.3 mol/L was produced. In the electrolytic solution of Example 1-3, the organic solvent is contained at a mole ratio of 4 relative to the metal salt.

Example 1-4

$(FSO_2)_2NLi$ serving as the metal salt was dissolved in dimethyl carbonate serving as the specific organic solvent, whereby an electrolytic solution of Example 1-4 having $(FSO_2)_2NLi$ at a concentration of 2.0 mol/L was produced. In the electrolytic solution of Example 1-4, the organic solvent is contained at a mole ratio of 5 relative to the metal salt.

Example 2-1

$(FSO_2)_2NLi$ serving as the metal salt was dissolved in a mixed solvent obtained by mixing dimethyl carbonate serving as the specific organic solvent and diethyl carbonate serving as the specific organic solvent at a mole ratio of 9:1, whereby an electrolytic solution of Example 2-1 having $(FSO_2)_2NLi$ at a concentration of 2.9 mol/L was produced. In the electrolytic solution of Example 2-1, the organic solvent is contained at a mole ratio of 3 relative to the metal salt.

Example 2-2

$(FSO_2)_2NLi$ serving as the metal salt was dissolved in a mixed solvent obtained by mixing dimethyl carbonate serving as the specific organic solvent and diethyl carbonate serving as the specific organic solvent at a mole ratio of 7:1, whereby an electrolytic solution of Example 2-2 having $(FSO_2)_2NLi$ at a concentration of 2.9 mol/L was produced. In the electrolytic solution of Example 2-2, the organic solvent is contained at a mole ratio of 3 relative to the metal salt.

Example 2-3

$(FSO_2)_2NLi$ serving as the metal salt was dissolved in a mixed solvent obtained by mixing dimethyl carbonate serving as the specific organic solvent and diethyl carbonate serving as the specific organic solvent at a mole ratio of 9:1, whereby an electrolytic solution of Example 2-3 having $(FSO_2)_2NLi$ at a concentration of 2.3 mol/L was produced. In the electrolytic solution of Example 2-3, the organic solvent is contained at a mole ratio of 4 relative to the metal salt.

Example 3

$(FSO_2)_2NLi$ serving as the metal salt was dissolved in a mixed solvent obtained by mixing dimethyl carbonate serving as the specific organic solvent and propylene carbonate serving as another hetero organic solvent at a mole ratio of 7:1, whereby an electrolytic solution of Example 3 having $(FSO_2)_2NLi$ at a concentration of 3.0 mol/L was produced. In the electrolytic solution of Example 3, the organic solvent is contained at a mole ratio of 3 relative to the metal salt.

Example 4

$(FSO_2)_2NLi$ serving as the metal salt was dissolved in a mixed solvent obtained by mixing dimethyl carbonate serving as the specific organic solvent and ethylene carbonate serving as another hetero organic solvent at a mole ratio of 7:1, whereby an electrolytic solution of Example 4 having $(FSO_2)_2NLi$ at a concentration of 3.0 mol/L was produced. In the electrolytic solution of Example 4, the organic solvent is contained at a mole ratio of 3.1 relative to the metal salt.

Example 5

$(FSO_2)_2NLi$ serving as the metal salt was dissolved in ethyl methyl carbonate serving as the specific organic solvent, whereby an electrolytic solution of Example 5 having $(FSO_2)_2NLi$ at a concentration of 2.2 mol/L was produced. In the electrolytic solution of Example 5, the organic solvent is contained at a mole ratio of 3.5 relative to the metal salt.

Example 6

$(FSO_2)_2NLi$ serving as the metal salt was dissolved in diethyl carbonate serving as the specific organic solvent, whereby an electrolytic solution of Example 6 having $(FSO_2)_2NLi$ at a concentration of 2.0 mol/L was produced. In the electrolytic solution of Example 6, the organic solvent is contained at a mole ratio of 3.5 relative to the metal salt.

Example 7-1

$(FSO_2)_2NLi$ serving as the metal salt was dissolved in acetonitrile serving as the specific organic solvent, whereby an electrolytic solution of Example 7-1 having $(FSO_2)_2NLi$ at a concentration of 4.0 mol/L was produced. In the electrolytic solution of Example 7-1, the organic solvent is contained at a mole ratio of 3 relative to the metal salt.

Example 7-2

$(FSO_2)_2NLi$ serving as the metal salt was dissolved in acetonitrile serving as the specific organic solvent, whereby an electrolytic solution of Example 7-2 having $(FSO_2)_2NLi$ at a concentration of 3.0 mol/L was produced. In the electrolytic solution of Example 7-2, the organic solvent is contained at a mole ratio of 4.7 relative to the metal salt.

Example 8-1

$(FSO_2)_2NLi$ serving as the metal salt was dissolved in 1,2-dimethoxyethane serving as the specific organic solvent, whereby an electrolytic solution of Example 8-1 having $(FSO_2)_2NLi$ at a concentration of 2.4 mol/L was produced. In the electrolytic solution of Example 8-1, the organic solvent is contained at a mole ratio of 3.3 relative to the metal salt.

Example 8-2

$(FSO_2)_2NLi$ serving as the metal salt was dissolved in 1,2-dimethoxyethane serving as the specific organic solvent, whereby an electrolytic solution of Example 8-2 having $(FSO_2)_2NLi$ at a concentration of 2.0 mol/L was produced. In the electrolytic solution of Example 8-2, the organic solvent is contained at a mole ratio of 4 relative to the metal salt.

Example 9

$(CF_3SO_2)_2NLi$ serving as the metal salt was dissolved in acetonitrile serving as the specific organic solvent, whereby an electrolytic solution of Example 9 having $(CF_3SO_2)_2NLi$ at a concentration of 3.0 mol/L was produced. In the electrolytic solution of Example 9, the organic solvent is contained at a mole ratio of 3.5 relative to the metal salt.

Example 10

$(CF_3SO_2)_2NLi$ serving as the metal salt was dissolved in 1,2-dimethoxyethane serving as the specific organic solvent, whereby an electrolytic solution of Example 10 having $(CF_3SO_2)_2NLi$ at a concentration of 1.6 mol/L was produced. In the electrolytic solution of Example 10, the organic solvent is contained at a mole ratio of 4.7 relative to the metal salt.

Example 11-1

$(FSO_2)_2NLi$ serving as the metal salt was dissolved in a mixed solvent obtained by mixing dimethyl carbonate serving as the specific organic solvent and ethyl methyl carbonate serving as the specific organic solvent at a mole ratio of 9:1, whereby an electrolytic solution of Example 11-1 having $(FSO_2)_2NLi$ at a concentration of 2.9 mol/L was produced. In the electrolytic solution of Example 11-1, the organic solvent is contained at a mole ratio of 3 relative to the metal salt.

Example 11-2

$(FSO_2)_2NLi$ serving as the metal salt was dissolved in a mixed solvent obtained by mixing dimethyl carbonate serving as the specific organic solvent and ethyl methyl carbonate serving as the specific organic solvent at a mole ratio of 9:1, whereby an electrolytic solution of Example 11-2 having $(FSO_2)_2NLi$ at a concentration of 2.6 mol/L was produced. In the electrolytic solution of Example 11-2, the organic solvent is contained at a mole ratio of 3.6 relative to the metal salt.

Example 11-3

$(FSO_2)_2NLi$ serving as the metal salt was dissolved in a mixed solvent obtained by mixing dimethyl carbonate serving as the specific organic solvent and ethyl methyl carbonate serving as the specific organic solvent at a mole ratio of 9:1, whereby an electrolytic solution of Example 11-3 having $(FSO_2)_2NLi$ at a concentration of 2.4 mol/L was produced. In the electrolytic solution of Example 11-3, the organic solvent is contained at a mole ratio of 4 relative to the metal salt.

Comparative Example 1

$(FSO_2)_2NLi$ serving as the metal salt was tried to be dissolved in toluene so as to produce an electrolytic solution having a mole ratio between toluene and the metal salt equivalent to that in the electrolytic solution of the present invention. However, $(FSO_2)_2NLi$ was not dissolved, resulting in a suspension.

Comparative Example 2

$(FSO_2)_2NLi$ serving as the metal salt was tried to be dissolved in hexane so as to produce an electrolytic solution having a mole ratio between hexane and the metal salt equivalent to that in the electrolytic solution of the present invention. However, $(FSO_2)_2NLi$ was not dissolved, resulting in a suspension.

Comparative Example 3-1

$(FSO_2)_2NLi$ serving as the metal salt was dissolved in dimethyl carbonate serving as the specific organic solvent, whereby an electrolytic solution of Comparative Example 3-1 having $(FSO_2)_2NLi$ at a concentration of 4.5 mol/L was produced. In the electrolytic solution of Comparative Example 3-1, the organic solvent is contained at a mole ratio of 1.6 relative to the metal salt.

Comparative Example 3-2

$(FSO_2)_2NLi$ serving as the metal salt was dissolved in dimethyl carbonate serving as the specific organic solvent, whereby an electrolytic solution of Comparative Example 3-2 having $(FSO_2)_2NLi$ at a concentration of 3.9 mol/L was produced. In the electrolytic solution of Comparative Example 3-2, the organic solvent is contained at a mole ratio of 2 relative to the metal salt.

Comparative Example 3-3

$(FSO_2)_2NLi$ serving as the metal salt was dissolved in dimethyl carbonate serving as the specific organic solvent, whereby an electrolytic solution of Comparative Example 3-3 having $(FSO_2)_2NLi$ at a concentration of 1.0 mol/L was produced. In the electrolytic solution of Comparative Example 3-3, the organic solvent is contained at a mole ratio of 11 relative to the metal salt.

Comparative Example 4-1

$(FSO_2)_2NLi$ serving as the metal salt was dissolved in acetonitrile serving as the specific organic solvent, whereby an electrolytic solution of Comparative Example 4-1 having $(FSO_2)_2NLi$ at a concentration of 5.0 mol/L was produced. In the electrolytic solution of Comparative Example 4-1, the organic solvent is contained at a mole ratio of 2.1 relative to the metal salt.

Comparative Example 4-2

$(FSO_2)_2NLi$ serving as the metal salt was dissolved in acetonitrile serving as the specific organic solvent, whereby an electrolytic solution of Comparative Example 4-2 having $(FSO_2)_2NLi$ at a concentration of 4.5 mol/L was produced. In the electrolytic solution of Comparative Example 4-2, the organic solvent is contained at a mole ratio of 2.4 relative to the metal salt.

Comparative Example 4-3

$(FSO_2)_2NLi$ serving as the metal salt was dissolved in acetonitrile serving as the specific organic solvent, whereby an electrolytic solution of Comparative Example 4-3 having $(FSO_2)_2NLi$ at a concentration of 2.0 mol/L was produced. In the electrolytic solution of Comparative Example 4-3, the organic solvent is contained at a mole ratio of 7.9 relative to the metal salt.

Comparative Example 4-4

$(FSO_2)_2NLi$ serving as the metal salt was dissolved in acetonitrile serving as the specific organic solvent, whereby an electrolytic solution of Comparative Example 4-4 having $(FSO_2)_2NLi$ at a concentration of 1.0 mol/L was produced. In the electrolytic solution of Comparative Example 4-4, the organic solvent is contained at a mole ratio of 17 relative to the metal salt.

Comparative Example 5-1

$(FSO_2)_2NLi$ serving as the metal salt was dissolved in 1,2-dimethoxyethane serving as the specific organic solvent, whereby an electrolytic solution of Comparative Example 5-1 having $(FSO_2)_2NLi$ at a concentration of 4.0 mol/L was produced. In the electrolytic solution of Comparative Example 5-1, the organic solvent is contained at a mole ratio of 1.5 relative to the metal salt.

Comparative Example 5-2

$(FSO_2)_2NLi$ serving as the metal salt was dissolved in 1,2-dimethoxyethane serving as the specific organic solvent, whereby an electrolytic solution of Comparative Example 5-2 having $(FSO_2)_2NLi$ at a concentration of 3.6 mol/L was produced. In the electrolytic solution of Comparative Example 5-2, the organic solvent is contained at a mole ratio of 1.9 relative to the metal salt.

Comparative Example 5-3

$(FSO_2)_2NLi$ serving as the metal salt was dissolved in 1,2-dimethoxyethane serving as the specific organic solvent, whereby an electrolytic solution of Comparative Example 5-3 having $(FSO_2)_2NLi$ at a concentration of 1.0 mol/L was produced. In the electrolytic solution of Comparative Example 5-3, the organic solvent is contained at a mole ratio of 8.8 relative to the metal salt.

Comparative Example 5-4

$(FSO_2)_2NLi$ serving as the metal salt was dissolved in 1,2-dimethoxyethane serving as the specific organic solvent, whereby an electrolytic solution of Comparative Example 5-4 having $(FSO_2)_2NLi$ at a concentration of 0.5 mol/L was produced. In the electrolytic solution of Comparative Example 5-4, the organic solvent is contained at a mole ratio of 18 relative to the metal salt.

Comparative Example 5-5

$(FSO_2)_2NLi$ serving as the metal salt was dissolved in 1,2-dimethoxyethane serving as the specific organic solvent, whereby an electrolytic solution of Comparative Example 5-5 having $(FSO_2)_2NLi$ at a concentration of 0.1 mol/L was produced. In the electrolytic solution of Comparative Example 5-5, the organic solvent is contained at a mole ratio of 93 relative to the metal salt.

Comparative Example 6

$LiPF_6$ serving as the electrolyte was dissolved in dimethyl carbonate serving as the specific organic solvent, whereby an electrolytic solution of Comparative Example 6 having LiPF$_6$ at a concentration of 3.2 mol/L was produced. In the electrolytic solution of Comparative Example 6, the organic solvent is contained at a mole ratio of 3 relative to the electrolyte.

Comparative Example 7

LiBF$_4$ serving as the electrolyte was dissolved in dimethyl carbonate serving as the specific organic solvent, whereby an electrolytic solution of Comparative Example 7 having LiBF$_4$ at a concentration of 3.4 mol/L was produced. In the electrolytic solution of Comparative Example 7 the organic solvent is contained at a mole ratio of 3 relative to the electrolyte.

Comparative Example 8

LiPF$_6$ serving as the electrolyte was dissolved in a mixed solvent obtained by mixing diethyl carbonate serving as the specific organic solvent and ethylene carbonate serving as another hetero organic solvent at a volume ratio of 7:3, whereby an electrolytic solution of Comparative Example 8 having LiPF$_6$ at a concentration of 1.0 mol/L was produced. In the electrolytic solution of Comparative Example 8, the organic solvent is contained at a mole ratio of about 10 relative to the electrolyte.

Comparative Example 9-1

(FSO$_2$)$_2$NLi serving as the metal salt was dissolved in a mixed solvent obtained by mixing dimethyl carbonate serving as the specific organic solvent and propylene carbonate serving as another hetero organic solvent at a mole ratio of 95:5, whereby an electrolytic solution of Comparative Example 9-1 having (FSO$_2$)$_2$NLi at a concentration of 4.0 mol/L was produced. In the electrolytic solution of Comparative Example 9-1, the organic solvent is contained at a mole ratio of 2 relative to the metal salt.

Comparative Example 9-2

(FSO$_2$)$_2$NLi serving as the metal salt was dissolved in a mixed solvent obtained by mixing dimethyl carbonate serving as the specific organic solvent and propylene carbonate serving as another hetero organic solvent at a mole ratio of 90:10, whereby an electrolytic solution of Comparative Example 9-2 having (FSO$_2$)$_2$NLi at a concentration of 4.0 mol/L was produced. In the electrolytic solution of Comparative Example 9-2, the organic solvent is contained at a mole ratio of 2 relative to the metal salt.

Comparative Example 9-3

(FSO$_2$)$_2$NLi serving as the metal salt was dissolved in a mixed solvent obtained by mixing dimethyl carbonate serving as the specific organic solvent and propylene carbonate serving as another hetero organic solvent at a mole ratio of 80:20, whereby an electrolytic solution of Comparative Example 9-3 having (FSO$_2$)$_2$NLi at a concentration of 4.0 mol/L was produced. In the electrolytic solution of Comparative Example 9-3, the organic solvent is contained at a mole ratio of 2 relative to the metal salt.

Comparative Example 9-4

(FSO$_2$)$_2$NLi serving as the metal salt was dissolved in a mixed solvent obtained by mixing dimethyl carbonate serving as the specific organic solvent and propylene carbonate serving as another hetero organic solvent at a mole ratio of 50:50, whereby an electrolytic solution of Comparative Example 9-4 having (FSO$_2$)$_2$NLi at a concentration of 4.0 mol/L was produced. In the electrolytic solution of Comparative Example 9-4, the organic solvent is contained at a mole ratio of 2 relative to the metal salt.

Comparative Example 10

LiPF$_6$ serving as the electrolyte was dissolved in a mixed solvent obtained by mixing ethylene carbonate serving as another hetero organic solvent, ethyl methyl carbonate serving as the specific organic solvent, and dimethyl carbonate serving as the specific organic solvent at a volume ratio of 3:3:4, whereby an electrolytic solution of Comparative Example 10 having LiPF$_6$ at a concentration of 1.0 mol/L was produced. In the electrolytic solution of Comparative Example 10, the organic solvent is contained at a mole ratio of about 10 relative to the electrolyte.

Table 3-1 shows the list of electrolytic solutions of Examples. Table 3-2 shows the list of electrolytic solutions of Comparative Examples. The results of Comparative Examples 1 and 2 have revealed that metal salts are not suitably dissolved in organic solvents not having a heteroelement, such as toluene and hexane.

TABLE 3-1

| | Metal salt | Organic solvent | Number of moles of organic solvent/number of moles of metal salt | Concentration of metal salt (mol/L) |
|---|---|---|---|---|
| Example 1-1 | LiFSA | DMC | 3 | 3.0 |
| Example 1-2 | LiFSA | DMC | 3.5 | 2.7 |
| Example 1-3 | LiFSA | DMC | 4 | 2.3 |
| Example 1-4 | LiFSA | DMC | 5 | 2.0 |
| Example 2-1 | LiFSA | Mole ratio of DMC:DEC = 9:1 | 3 | 2.9 |
| Example 2-2 | LiFSA | Mole ratio of DMC:DEC = 7:1 | 3 | 2.9 |
| Example 2-3 | LiFSA | Mole ratio of DMC:DEC = 9:1 | 4 | 2.3 |
| Example 3 | LiFSA | Mole ratio of DMC:PC = 7:1 | 3 | 3.0 |
| Example 4 | LiFSA | Mole ratio of DMC:EC = 7:1 | 3.1 | 3.0 |
| Example 5 | LiFSA | EMC | 3.5 | 2.2 |
| Example 6 | LiFSA | DEC | 3.5 | 2.0 |
| Example 7-1 | LiFSA | AN | 3 | 4.0 |
| Example 7-2 | LiFSA | AN | 4.7 | 3.0 |
| Example 8-1 | LiFSA | DME | 3.3 | 2.4 |
| Example 8-2 | LiFSA | DME | 4 | 2.0 |
| Example 9 | LiTFSA | AN | 3.5 | 3.0 |
| Example 10 | LiTFSA | DME | 4.7 | 1.6 |
| Example 11-1 | LiFSA | Mole ratio of DMC:EMC = 9:1 | 3 | 2.9 |
| Example 11-2 | LiFSA | Mole ratio of DMC:EMC = 9:1 | 3.6 | 2.6 |
| Example 11-3 | LiFSA | Mole ratio of DMC:EMC = 9:1 | 4 | 2.4 |

The meanings of abbreviations in Table 3-1 and thereafter are as follows.
LiFSA: (FSO$_2$)$_2$NLi
LiTFSA: (CF$_3$SO$_2$)$_2$NLi
DMC: dimethyl carbonate
EMC: ethyl methyl carbonate
DEC: diethyl carbonate
AN: acetonitrile DME: 1,2-dimethoxyethane
PC: propylene carbonate
EC: ethylene carbonate

TABLE 3-2

| | Metal salt or electrolyte | Organic solvent | Number of moles of organic solvent/number of moles of metal salt or electrolyte | Concentration of metal salt or electrolyte (mol/L) |
|---|---|---|---|---|
| Comparative Example 1 | LiFSA | toluene | not dissolved | |
| Comparative Example 2 | LiFSA | hexane | not dissolved | |
| Comparative Example 3-1 | LiFSA | DMC | 1.6 | 4.5 |
| Comparative Example 3-2 | LiFSA | DMC | 2 | 3.9 |
| Comparative Example 3-3 | LiFSA | DMC | 11 | 1.0 |
| Comparative Example 4-1 | LiFSA | AN | 2.1 | 5.0 |
| Comparative Example 4-2 | LiFSA | AN | 2.4 | 4.5 |
| Comparative Example 4-3 | LiFSA | AN | 7.9 | 2.0 |
| Comparative Example 4-4 | LiFSA | AN | 17 | 1.0 |
| Comparative Example 5-1 | LiFSA | DME | 1.5 | 4.0 |
| Comparative Example 5-2 | LiFSA | DME | 1.9 | 3.6 |
| Comparative Example 5-3 | LiFSA | DME | 8.8 | 1.0 |
| Comparative Example 5-4 | LiFSA | DME | 18 | 0.5 |
| Comparative Example 5-5 | LiFSA | DME | 93 | 0.1 |
| Comparative Example 6 | $LiPF_6$ | DMC | 3 | 3.2 |
| Comparative Example 7 | $LiBF_4$ | DMC | 3 | 3.4 |
| Comparative Example 8 | $LiPF_6$ | Volume ratio of DEC:EC = 7:3 | 10 | 1.0 |
| Comparative Example 9-1 | LiFSA | Mole ratio of DMC:PC = 95:5 | 2 | 4.0 |
| Comparative Example 9-2 | LiFSA | Mole ratio of DMC:PC = 90:10 | 2 | 4.0 |
| Comparative Example 9-3 | LiFSA | Mole ratio of DMC:PC = 80:20 | 2 | 4.0 |
| Comparative Example 9-4 | LiFSA | Mole ratio of DMC:PC = 50:50 | 2 | 4.0 |
| Comparative Example 10 | $LiPF_6$ | Volume ratio of EC:EMC:DMC = 3:3:4 | 10 | 1.0 |

Evaluation Example 1: Ionic Conductivity

Ionic conductivities of electrolytic solutions of Examples and Comparative Examples were measured under the following conditions. Table 4-1 and Table 4-2 show the results. Each blank in the tables means that measurement was not performed.

Ionic Conductivity Measuring Condition

Under an Ar atmosphere, an electrolytic solution was sealed in a glass cell that had a platinum electrode and whose cell constant was known, and impedance thereof was measured at 30° C., 1 kHz. Ionic conductivity was calculated on the basis of the measurement result of the impedance. As a measurement instrument, Solartron 147055BEC (Solartron Analytical) was used.

TABLE 4-1

| | Metal salt | Organic solvent | Number of moles of organic solvent/number of moles of metal salt | Ionic conductivity (mS/cm) |
|---|---|---|---|---|
| Example 1-1 | LiFSA | DMC | 3 | 5.9 |
| Example 1-2 | LiFSA | DMC | 3.5 | |
| Example 1-3 | LiFSA | DMC | 4 | |
| Example 1-4 | LiFSA | DMC | 5 | 8.7 |
| Example 2-1 | LiFSA | Mole ratio of DMC:DEC = 9:1 | 3 | |
| Example 2-2 | LiFSA | Mole ratio of DMC:DEC = 7:1 | 3 | |
| Example 3 | LiFSA | Mole ratio of DMC:PC = 7:1 | 3 | 4.7 |
| Example 4 | LiFSA | Mole ratio of DMC:EC = 7:1 | 3.1 | 4.8 |
| Example 5 | LiFSA | EMC | 3.5 | |
| Example 6 | LiFSA | DEC | 3.5 | |
| Example 7-1 | LiFSA | AN | 3 | 16.1 |
| Example 7-2 | LiFSA | AN | 4.7 | 29.7 |
| Example 8-1 | LiFSA | DME | 3.3 | 12.0 |
| Example 8-2 | LiFSA | DME | 4 | 14.0 |
| Example 9 | LiTFSA | AN | 3.5 | 10.3 |
| Example 10 | LiTFSA | DME | 4.7 | 12.0 |

TABLE 4-2

| | Metal salt or electrolyte | Organic solvent | Number of moles of organic solvent/number of moles of metal salt or electrolyte | Ionic conductivity (mS/cm) |
|---|---|---|---|---|
| Comparative Example 3-1 | LiFSA | DMC | 1.6 | 2.6 |
| Comparative Example 3-2 | LiFSA | DMC | 2 | 3.2 |
| Comparative Example 3-3 | LiFSA | DMC | 11 | 6.8 |
| Comparative Example 4-1 | LiFSA | AN | 2.1 | 7.5 |
| Comparative Example 4-2 | LiFSA | AN | 2.4 | 9.7 |
| Comparative Example 4-3 | LiFSA | AN | 7.9 | 48.4 |
| Comparative Example 4-4 | LiFSA | AN | 17 | 50.9 |
| Comparative Example 5-1 | LiFSA | DME | 1.5 | 7.1 |
| Comparative Example 5-2 | LiFSA | DME | 1.9 | 7.2 |
| Comparative Example 5-3 | LiFSA | DME | 8.8 | 17.0 |
| Comparative Example 5-4 | LiFSA | DME | 18 | 10.0 |
| Comparative Example 5-5 | LiFSA | DME | 93 | 6.3 |
| Comparative Example 6 | $LiPF_6$ | DMC | 3 | 4.2 |
| Comparative Example 7 | $LiBF_4$ | DMC | 3 | 2.0 |
| Comparative Example 8 | $LiPF_6$ | Volume ratio of DEC:EC = 7:3 | 10 | 10.1 |

Electrolytic solutions of Examples all showed suitable ionic conductivity. Thus, the electrolytic solutions of the present invention are all understood to function as electrolytic solutions for various power storage devices. Further, with reference to the results of the electrolytic solutions of Example 1-1, Comparative Example 6, and Comparative Example 7, the metal salt used in the electrolytic solution of the present invention is understood to exhibit suitable ionic conductivity, when compared to other electrolytes. In addition, with reference to the results of the electrolytic solutions of Example 1-1, Example 3, and Example 4, ionic conductivity is understood to be reduced when a heteroelement-containing organic solvent having a part of the specific organic solvent substituted with another hetero organic solvent is used.

Here, with respect to the electrolytic solutions of Examples 1-1, 1-4 and Comparative Examples 3-1 to 3-3, each having LiFSA as the metal salt and DMC, which is a linear carbonate, as the specific organic solvent, a graph showing the relationship between the ionic conductivity and the mole ratio of the specific organic solvent relative to the metal salt was made. FIG. 1 shows the graph.

FIG. 1 suggests that, in an electrolytic solution whose metal salt is LiFSA and whose specific organic solvent is DMC, which is a linear carbonate, the maximum value of ionic conductivity is in a range of mole ratio of 3-5 of the specific organic solvent relative to the metal salt.

Evaluation Example 2: Density

Densities at 20° C. of electrolytic solutions of Examples and Comparative Examples were measured. Table 5-1 and Table 5-2 show the results. Each blank in the tables means that measurement was not performed.

TABLE 5-1

| | Metal salt | Organic solvent | Number of moles of organic solvent/number of moles of metal salt | Density (g/cm$^3$) |
|---|---|---|---|---|
| Example 1-1 | LiFSA | DMC | 3 | 1.38 |
| Example 1-2 | LiFSA | DMC | 3.5 | 1.35 |
| Example 1-3 | LiFSA | DMC | 4 | 1.31 |
| Example 1-4 | LiFSA | DMC | 5 | 1.27 |
| Example 2-1 | LiFSA | Mole ratio of DMC:DEC = 9:1 | 3 | 1.33 |
| Example 2-2 | LiFSA | Mole ratio of DMC:DEC = 7:1 | 3 | |
| Example 3 | LiFSA | Mole ratio of DMC:PC = 7:1 | 3 | 1.38 |
| Example 4 | LiFSA | Mole ratio of DMC:EC = 7:1 | 3.1 | 1.39 |
| Example 5 | LiFSA | EMC | 3.5 | |
| Example 6 | LiFSA | DEC | 3.5 | 1.20 |
| Example 7-1 | LiFSA | AN | 3 | 1.25 |
| Example 7-2 | LiFSA | AN | 4.7 | 1.14 |
| Example 8-1 | LiFSA | DME | 3.3 | 1.18 |
| Example 8-2 | LiFSA | DME | 4 | 1.13 |
| Example 9 | LiTFSA | AN | 3.5 | 1.31 |
| Example 10 | LiTFSA | DME | 4.7 | 1.18 |
| Example 11-1 | LiFSA | Mole ratio of DMC:EMC = 9:1 | 3 | 1.34 |
| Example 11-2 | LiFSA | Mole ratio of DMC:EMC = 9:1 | 3.6 | 1.32 |

TABLE 5-2

| | Metal salt or electrolyte | Organic solvent | Number of moles of organic solvent/number of moles of metal salt or electrolyte | Density (g/cm$^3$) |
|---|---|---|---|---|
| Comparative Example 3-1 | LiFSA | DMC | 1.6 | 1.48 |
| Comparative Example 3-2 | LiFSA | DMC | 2 | 1.44 |
| Comparative Example 3-3 | LiFSA | DMC | 11 | 1.16 |
| Comparative Example 4-1 | LiFSA | AN | 2.1 | 1.36 |
| Comparative Example 4-2 | LiFSA | AN | 2.4 | 1.31 |
| Comparative Example 4-3 | LiFSA | AN | 7.9 | 1.02 |
| Comparative Example 4-4 | LiFSA | AN | 17 | 0.90 |
| Comparative Example 5-1 | LiFSA | DME | 1.5 | 1.33 |
| Comparative Example 5-2 | LiFSA | DME | 1.9 | 1.29 |
| Comparative Example 5-3 | LiFSA | DME | 8.8 | 1.01 |
| Comparative Example 5-4 | LiFSA | DME | 18 | 0.94 |
| Comparative Example 5-5 | LiFSA | DME | 93 | 0.88 |
| Comparative Example 6 | LiPF$_6$ | DMC | 3 | 1.36 |
| Comparative Example 7 | LiBF$_4$ | DMC | 3 | 1.24 |
| Comparative Example 8 | LiPF$_6$ | Volume ratio of DEC:EC = 7:3 | 10 | |
| Comparative Example 10 | LiPF$_6$ | Volume ratio of EC:EMC:DMC = 3:3:4 | 10 | 1.23 |

Evaluation Example 3: Viscosity

Viscosities of electrolytic solutions of Examples and Comparative Examples were measured under the following conditions. Table 6-1 and Table 6-2 show the results.

Viscosity Measuring Condition

Under an Ar atmosphere, an electrolytic solution was sealed in a test cell, and viscosity was measured under a condition of 30° C. by using a falling ball viscometer (Lovis 2000 M manufactured by Anton Paar GmbH).

TABLE 6-1

| | Metal salt | Organic solvent | Number of moles of organic solvent/number of moles of metal salt | Viscosity (mPa · s) |
|---|---|---|---|---|
| Example 1-1 | LiFSA | DMC | 3 | 17.6 |
| Example 1-2 | LiFSA | DMC | 3.5 | |
| Example 1-3 | LiFSA | DMC | 4 | |
| Example 1-4 | LiFSA | DMC | 5 | 5.4 |
| Example 2-1 | LiFSA | Mole ratio of DMC:DEC = 9:1 | 3 | |
| Example 2-2 | LiFSA | Mole ratio of DMC:DEC = 7:1 | 3 | |
| Example 3 | LiFSA | Mole ratio of DMC:PC = 7:1 | 3 | 17.8 |
| Example 4 | LiFSA | Mole ratio of DMC:EC = 7:1 | 3.1 | 18.0 |
| Example 5 | LiFSA | EMC | 3.5 | |
| Example 6 | LiFSA | DEC | 3.5 | |
| Example 7-1 | LiFSA | AN | 3 | 10.9 |
| Example 7-2 | LiFSA | AN | 4.7 | 3.8 |
| Example 8-1 | LiFSA | DME | 3.3 | 8.5 |

TABLE 6-1-continued

| | Metal salt | Organic solvent | Number of moles of organic solvent/number of moles of metal salt | Viscosity (mPa · s) |
|---|---|---|---|---|
| Example 8-2 | LiFSA | DME | 4 | 4.6 |
| Example 9 | LiTFSA | AN | 3.5 | 9.0 |
| Example 10 | LiTFSA | DME | 4.7 | 3.6 |

TABLE 6-2

| | Metal salt or electrolyte | Organic solvent | Number of moles of organic solvent/number of moles of metal salt or electrolyte | Viscosity (mPa · s) |
|---|---|---|---|---|
| Comparative Example 3-1 | LiFSA | DMC | 1.6 | 105.5 |
| Comparative Example 3-2 | LiFSA | DMC | 2 | 50.9 |
| Comparative Example 3-3 | LiFSA | DMC | 11 | 1.7 |
| Comparative Example 4-1 | LiFSA | AN | 2.1 | 31.5 |
| Comparative Example 4-2 | LiFSA | AN | 2.4 | 23.8 |
| Comparative Example 4-3 | LiFSA | AN | 7.9 | 1.4 |
| Comparative Example 4-4 | LiFSA | AN | 17 | 0.7 |
| Comparative Example 5-1 | LiFSA | DME | 1.5 | 30.3 |
| Comparative Example 5-2 | LiFSA | DME | 1.9 | 25.1 |
| Comparative Example 5-3 | LiFSA | DME | 8.8 | 1.2 |
| Comparative Example 5-4 | LiFSA | DME | 18 | 0.7 |
| Comparative Example 5-5 | LiFSA | DME | 93 | 0.4 |
| Comparative Example 6 | $LiPF_6$ | DMC | 3 | |
| Comparative Example 7 | $LiBF_4$ | DMC | 3 | |
| Comparative Example 8 | $LiPF_6$ | Volume ratio of DEC:EC = 7:3 | 10 | |

Viscosities of the electrolytic solutions of Examples are understood to be neither too low nor too high. With respect to electrolytic solutions having a mole ratio outside the range of the mole ratio of the specific organic solvent relative to the metal salt defined for the electrolytic solution of the present invention, the viscosity is understood to be sometimes too low or too high. When the viscosity of an electrolytic solution is too low, if a power storage device provided with such an electrolytic solution is damaged, leakage of a large amount of the electrolytic solution is concerned. On the other hand, when the viscosity of an electrolytic solution is too high, lowering of ion conductive property of the electrolytic solution is concerned, and lowering of productivity is concerned due to inferior impregnating ability of the electrolytic solution into the electrode, the separator, etc., during manufacture of the power storage device.

In addition, with reference to the results of the electrolytic solutions of Example 1-1, Example 3, and Example 4, the viscosity is understood to be increased when a heteroelement-containing organic solvent having a part of the specific organic solvent substituted with another hetero organic solvent is used.

Evaluation Example 4: Low Temperature Storage Test

The electrolytic solution of each of Example 1-1, Example 1-3, Example 1-4, Comparative Example 3-2, and Comparative Example 3-3 was placed in a container, and the container was filled with inert gas and sealed. These were stored in a −20° C. freezer for two days. Each electrolytic solution having been stored was observed. Table 7 shows the results.

TABLE 7

| | Metal salt | Organic solvent | Number of moles of organic solvent/number of moles of metal salt | State of electrolytic solution after being stored |
|---|---|---|---|---|
| Example 1-1 | LiFSA | DMC | 3 | no change |
| Example 1-3 | LiFSA | DMC | 4 | no change |
| Example 1-4 | LiFSA | DMC | 5 | solidified |
| Comparative Example 3-2 | LiFSA | DMC | 2 | no change |
| Comparative Example 3-3 | LiFSA | DMC | 11 | solidified |

The electrolytic solutions are understood to be easily solidified at a low temperature when the value of the mole ratio of the specific organic solvent relative to the metal salt is increased, i.e., becomes closer to conventional values. The electrolytic solution of Example 1-4 was solidified as a result of having been stored at −20° C. for two days, but is considered to be less likely to be solidified when compared to the electrolytic solution of Comparative Example 3-3, which is an electrolytic solution having a conventional concentration.

Evaluation Example 5: DSC Measurement

The electrolytic solution of Example 1-1 was placed in a stainless steel pan, and the pan was sealed. Using an empty sealed pan as a control, differential scanning calorimetry analysis was performed in a nitrogen atmosphere using the following temperature program. As a differential scanning calorimeter, Rigaku DSC8230 was used.

Temperature Program:

Increase the temperature from room temperature to 70° C. at 5° C./min., and keep the temperature for 10 minutes→decrease the temperature to −120° C. at 5° C./min., and keep the temperature for 10 minutes→increase the temperature to 70° C. at 3° C./min.

Figure 2:
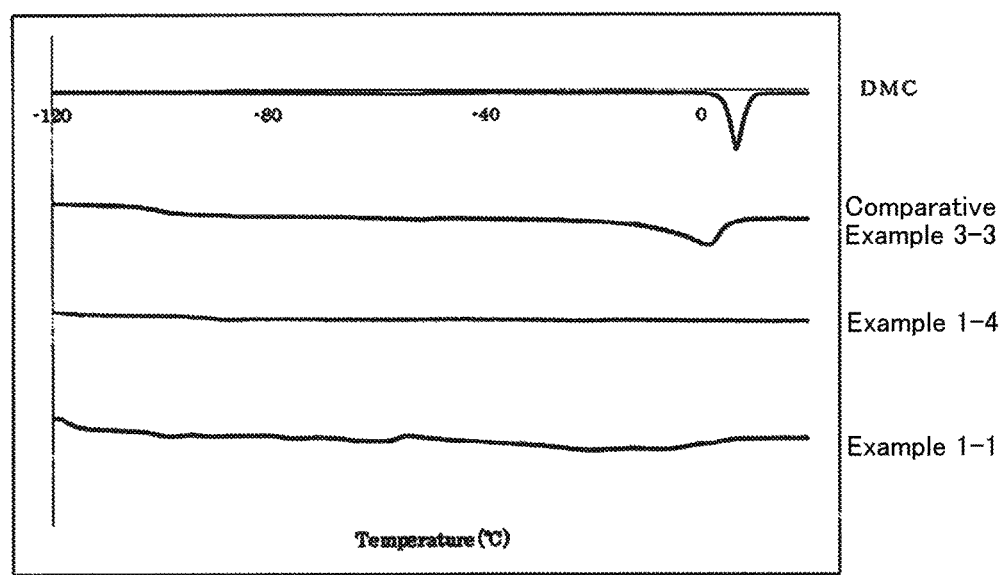
FIG. 2 shows overlaid DSC curves obtained in Evaluation Example 5.

The DSC curve obtained when the temperature was increased from −120° C. to 70° C. at 3° C./min. was observed. Also with respect to the electrolytic solution of Example 1-4, the electrolytic solution of Comparative Example 3-3, and DMC, differential scanning calorimetry analysis was performed in a similar manner. FIG. 2 shows the overlaid respective DSC curves.

In each of the DSC curves of DMC and the electrolytic solution of Comparative Example 3-3 shown in FIG. 2, a melting peak was observed near 0 to 10° C. On the other hand, in each of the DSC curves of Example 1-1 and Example 1-4, no clear melting peak was observed. This result suggests that the electrolytic solutions of the present invention are less likely to be solidified or crystallized in a low temperature environment. Thus, the electrolytic solutions of the present invention are speculated to suppress to some extent lowering of ionic conductivity in a low temperature environment. With respect to the electrolytic solutions of the present invention, when usage in a low temperature environment is important, not only DMC having a melting point near 4° C. but also EMC having a melting point near −55° C. and DEC having a melting point near −43° C. are preferably used in combination as the specific organic solvent.

Evaluation Example 6: DSC Measurement <2>

The electrolytic solution of Example 2-3 was placed in a pan formed from aluminum, and the pan was sealed. Using an empty sealed pan as a control, differential scanning calorimetry analysis was performed in a nitrogen atmosphere using the following temperature program. As a differential scanning calorimeter, DSC Q2000 (manufactured by TA Instruments) was used.

Temperature Program:
Decrease the temperature from room temperature to −75° C. at 5° C./min., and keep the temperature for 10 minutes→increase the temperature to 70° C. at 5° C./min.

Figure 3:
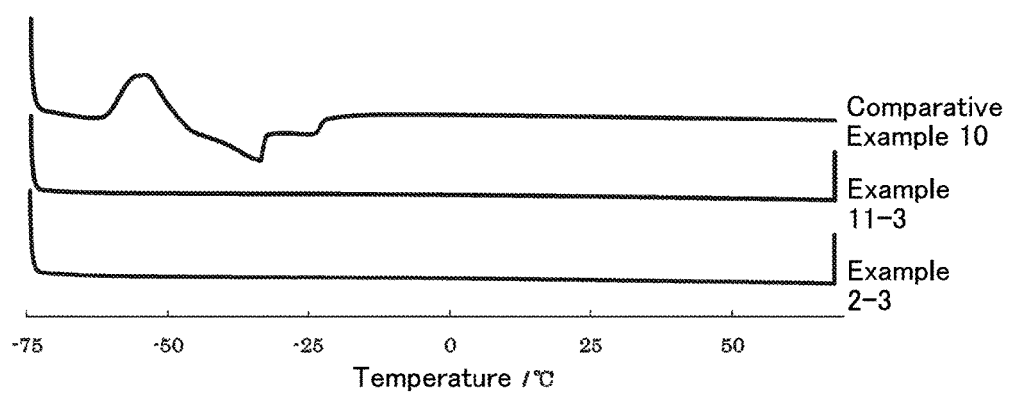
FIG. 3 shows overlaid DSC curves obtained in Evaluation Example 6.

The DSC curve obtained when the temperature was increased from −75° C. to 70° C. at 5° C./min. was observed. Also with respect to the electrolytic solution of Example 11-3 and the electrolytic solution of Comparative Example 10, differential scanning calorimetry analysis was performed in a similar manner. FIG. 3 shows the overlaid respective DSC curves.

With reference to FIG. 3, in the DSC curve of the electrolytic solution of Comparative Example 10, an endothermal peak estimated to be derived from the melting point was observed near −50 to −20° C. On the other hand, no endothermal peak was observed in the DSC curves of Example 2-3 and Example 11-3. Also with respect to the electrolytic solutions of the present invention using the specific organic solvent in combination, less likelihood of solidification and crystallization were supported. Therefore, secondary batteries using the electrolytic solution of the present invention are speculated to suitably act even under a significantly low temperature condition.

Example A

A half-cell using the electrolytic solution of Example 1-1 was produced in the following manner.

An aluminum foil (JIS A1000 series) having a diameter of 13.82 mm, an area of 1.5 cm$^2$, and a thickness of 20 μm was used as the working electrode, and metal Li was used as the counter electrode. As the separator, Whatman glass filter nonwoven fabric (article number 1825-055) having a thickness of 400 μm was used.

The working electrode, the counter electrode, the separator, and the electrolytic solution of Example 1-1 were housed in a battery case (CR2032 type coin cell case manufactured by Hohsen Corp.) to form a half-cell. This was used as a half-cell of Example A.

Comparative Example A

A half-cell of Comparative Example A was produced similarly to the half-cell of Example A, except for using the electrolytic solution of Comparative Example 3-3.

Evaluation Example A: Cyclic Voltammetry Evaluation Using Working Electrode A1

With respect to the half-cells of Example A and Comparative Example A, 10 cycles of cyclic voltammetry evaluation were performed under a condition of 1 mV/s in a range of 3.0 V to 4.5 V. Then, 10 cycles of cyclic voltammetry evaluation were performed under a condition of 1 mV/s in a range of 3.0 V to 5.0 V. FIG. 4 to FIG. 7 show graphs showing the relationship between potential and response current in the half-cells of Example A and Comparative Example A.

Figure 6:
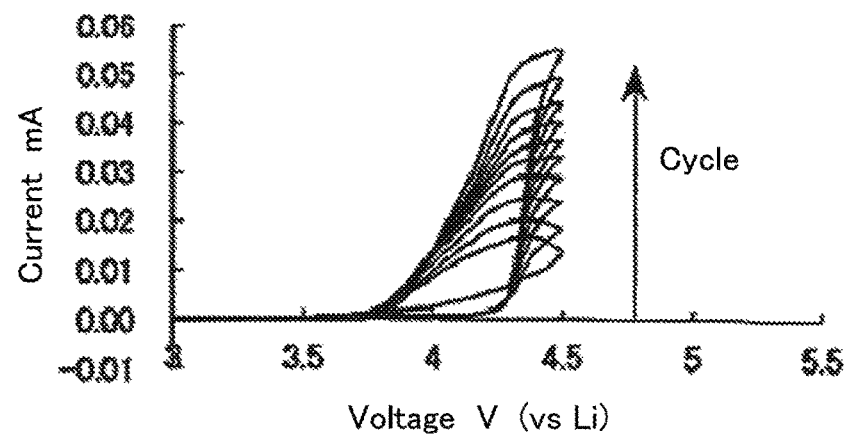
FIG. 6 is a graph showing the relationship between potential 3.0 to 4.5 V) and response current regarding a half-cell of Comparative Example A.
Figure 7:
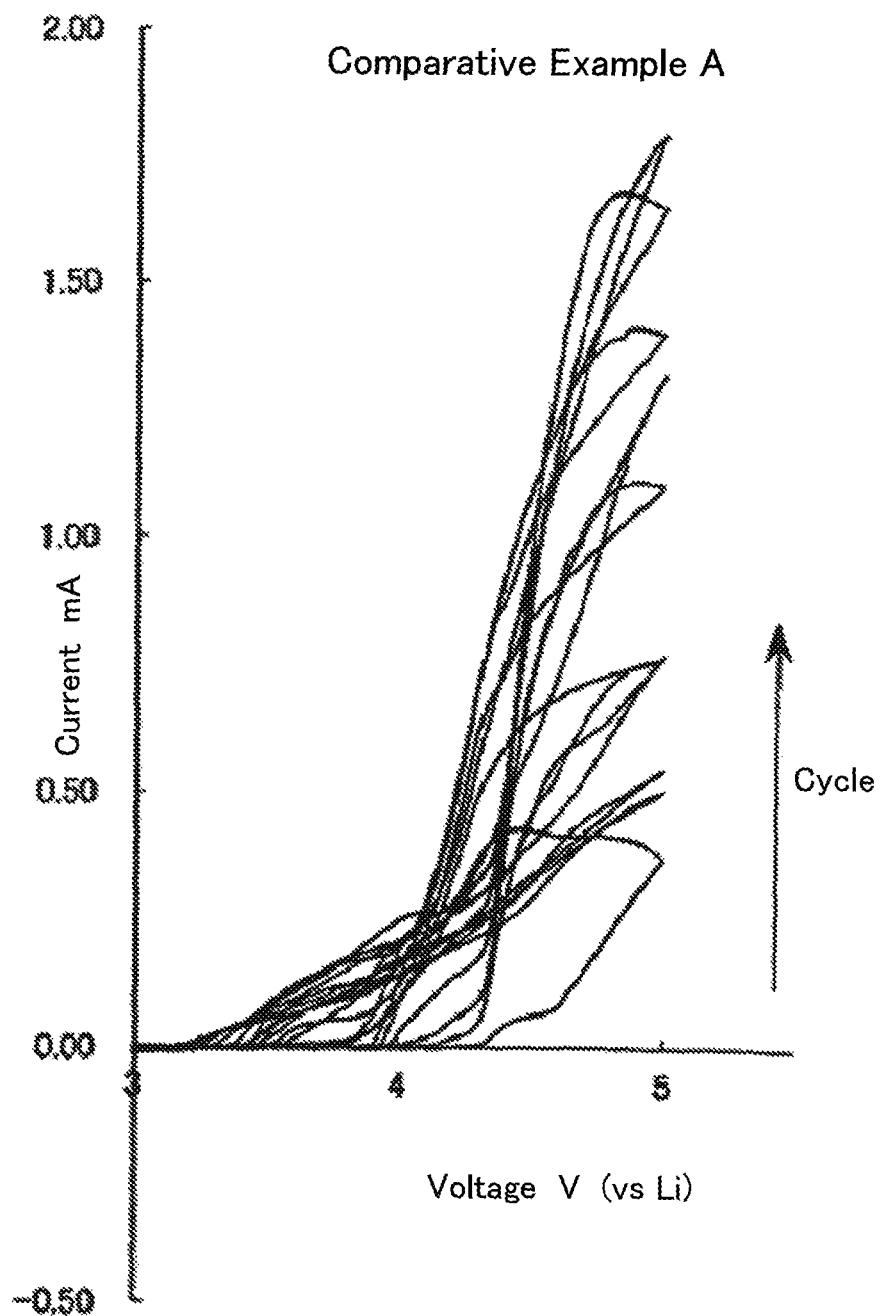
FIG. 7 is a graph showing the relationship between potential (3.0 to 5.0 V) and response current regarding the half-cell of Comparative Example A.

With reference to FIG. 6 and FIG. 7, in the half-cell of Comparative Example A, current is understood to flow in a range of 3.0 V to 4.5 V during and after the second cycle, and the current is understood to be increased as the potential becomes higher. This current is estimated to be a current resulting from oxidation of Al, generated through corrosion of aluminum of the working electrode.

Figure 4:
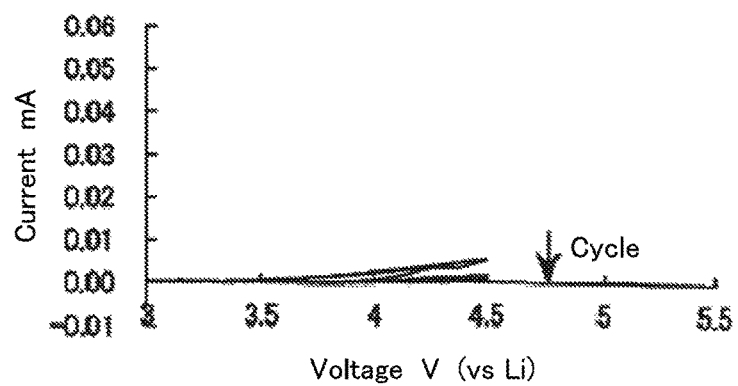
FIG. 4 shows a graph showing the relationship between potential (3.0 to 4.5 V) and response current regarding a half-cell of Example A.
Figure 5:
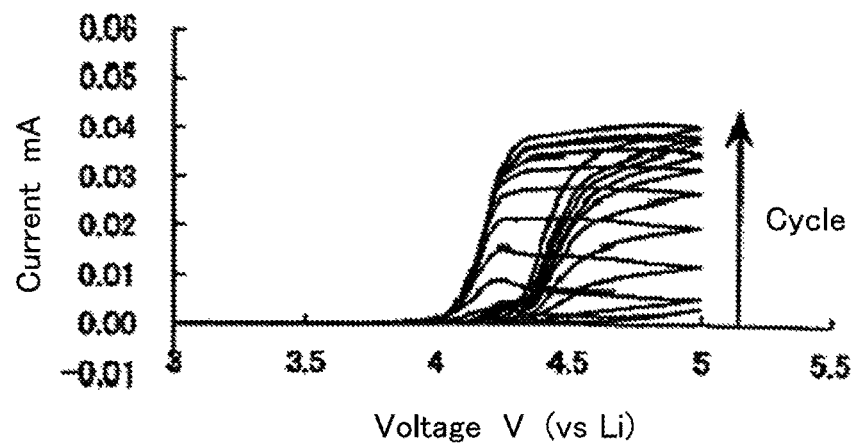
FIG. 5 is a graph showing the relationship between potential (3.0 to 5.0 V) and response current regarding the half-cell of Example A.

With reference to FIG. 4 and FIG. 5, in the half-cell of Example A, almost no current is understood to flow in a range of 3.0 V to 4.5 V during and after the second cycle. In particular, during and after the third cycle, almost no increase in current is observed until reaching 4.5V. In the half-cell of Example A, although increase in current is observed at 4.5 V and thereafter where the potential becomes high, such a value is much smaller when compared to a current value at 4.5 V and thereafter in the half-cell of Comparative Example A.

From the results of cyclic voltammetry evaluation, corrosiveness and oxidative destruction property of the electrolytic solution of Example 1-1 with respect to aluminum is considered to be low even at a high potential condition at least about 4.5 V. That is, the electrolytic solution of Example 1-1 is considered to be an electrolytic solution suitable for a power storage device using aluminum as a current collector or the like.

Reference Example A

A half-cell using the electrolytic solution of Comparative Example 3-2 was produced in the following manner.

90 parts by mass of graphite serving as the active material and having a mean particle diameter of 10 μm was mixed with 10 parts by mass of polyvinylidene fluoride serving as the binding agent. This mixture was dispersed in a proper amount of N-methyl-2-pyrrolidone to create a slurry. As the current collector, a copper foil having a thickness of 20 μm was prepared. The slurry was applied in a film form on the surface of the copper foil by using a doctor blade. The copper foil on which the slurry was applied was dried to remove N-methyl-2-pyrrolidone, and then the copper foil was pressed to obtain a joined object. The obtained joined object was heated and dried in a vacuum dryer for 6 hours at 120° C. to obtain a copper foil having an active material layer formed thereon. This was used as a working electrode.

Metal Li was used as the counter electrode.

The working electrode, the counter electrode, a 400 μm-thick Whatman glass fiber filter paper interposed therebetween and serving as the separator, and the electrolytic solution of Comparative Example 3-2 were housed in a battery case (CR2032 type coin cell case manufactured by Hohsen Corp.), to form a half-cell. This was used as a half-cell of Reference Example A.

Reference Example B

A half-cell of Reference Example B was produced using a method similar to that in Reference Example A except for using the electrolytic solution of Comparative Example 9-1 as the electrolytic solution.

Reference Example C

A half-cell of Reference Example C was produced using a method similar to that in Reference Example A except for using the electrolytic solution of Comparative Example 9-2 as the electrolytic solution.

Reference Example D

A half-cell of Reference Example D was produced using a method similar to that in Reference Example A except for using the electrolytic solution of Comparative Example 9-3 as the electrolytic solution.

Reference Example E

A half-cell of Reference Example E was produced using a method similar to that in Reference Example A except for using the electrolytic solution of Comparative Example 9-4 as the electrolytic solution.

Reference Evaluation Example A: Rate Capacity Test

The rate capacity of the half-cell of each of Reference Examples A to E was tested using the following method.

A charging and discharging cycle test was performed in which, with respect to each half-cell, discharging from 2.0 V to 0.01 V and charging from 0.01 V to 2.0 V were performed in the rate order of 0.1 C, 0.2 C, 0.5 C, 1 C, 2 C, 5 C, 10 C, and 0.1 C, three times for each rate. Table 8 shows results obtained by calculating the ratio of the discharge capacity at the second time at 5 C rate relative to the discharge capacity at the second time at the initial 0.1 C rate, and the ratio of the discharge capacity at the second time at 10 C rate relative to the discharge capacity at the second time at the initial 0.1 C rate. In the description here, the counter electrode is regarded as the negative electrode, and the working electrode is regarded as the positive electrode. 1 C means the current value required for fully charging or discharging the battery in 1 hour with a constant current.

With reference to Table 8, the capacity at a high rate of each cell is understood to be decreased in accordance with decrease in the ratio of the specific organic solvent in a heteroelement-containing organic solvent of the electrolytic solution, in other words, in accordance with increase in the ratio of another hetero organic solvent having high permittivity and high dipole moment. This fact suggests that the reaction resistance in the electrode is increased in accordance with decrease in the ratio of the specific organic solvent or increase in the ratio of another hetero organic solvent, in a heteroelement-containing organic solvent of the electrolytic solution.

Example I

A lithium ion secondary battery of Example I using the electrolytic solution of Example 1-1 was produced in the following manner.

90 parts by mass of a lithium containing metal oxide having a layered rock salt structure and represented by $LiNi_{5/10}Co_{2/10}Mn_{3/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 20 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 20 μm was prepared. The slurry was applied in a film form on the surface of the copper foil by using a doctor blade. The copper foil on which the slurry was applied was dried to remove water, and then, the copper foil was pressed to obtain

TABLE 8

| Half-cell | Electrolytic solution | Organic solvent of electrolytic solution | Number of moles of organic solvent/number of moles of metal salt | 5 C capacity/ 0.1 C capacity | 10 C capacity/ 0.1 C capacity |
|---|---|---|---|---|---|
| Reference Example A | Comparative Example 3-2 | DMC | 2 | 0.82 | 0.68 |
| Reference Example B | Comparative Example 9-1 | Mole ratio of DMC:PC = 95:5 | 2 | 0.77 | 0.58 |
| Reference Example C | Comparative Example 9-2 | Mole ratio of DMC:PC = 90:10 | 2 | 0.72 | 0.48 |
| Reference Example D | Comparative Example 9-3 | Mole ratio of DMC:PC = 80:20 | 2 | 0.74 | 0.50 |
| Reference Example E | Comparative Example 9-4 | Mole ratio of DMC:PC = 50:50 | 2 | 0.64 | 0.34 | a joined object. The obtained joined object was heated and dried in a vacuum dryer for 6 hours at 100° C. to obtain a copper foil having a negative electrode active material layer formed thereon. This was used as the negative electrode.

As the separator, a nonwoven fabric made from cellulose and having a thickness of 20 μm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Example 1-1 was poured into the laminate film. Four sides were sealed airtight by sealing the remaining one side to obtain a lithium ion secondary battery in which the electrode assembly and the electrolytic solution were sealed. This battery was used as the lithium ion secondary battery of Example I.

Example II

A lithium ion secondary battery of Example II was obtained using a method similar to that in Example I except for using the electrolytic solution of Example 1-3 as the electrolytic solution.

Comparative Example I

A lithium ion secondary battery of Comparative Example I was obtained using a method similar to that in Example I except for using the electrolytic solution of Comparative Example 3-2 as the electrolytic solution.

Comparative Example II

A lithium ion secondary battery of Comparative Example II was obtained using a method similar to that in Example I except for using the electrolytic solution of Comparative Example 4-2 as the electrolytic solution.

Comparative Example III

A lithium ion secondary battery of Comparative Example III was obtained using a method similar to that in Example I except for using the electrolytic solution of Comparative Example 8 as the electrolytic solution.

Evaluation Example I: Internal Resistance of Battery

With respect to the lithium ion secondary batteries of Examples I to II and Comparative Examples I to III, the internal resistance of the batteries were evaluated using the following method.

Figure 8:
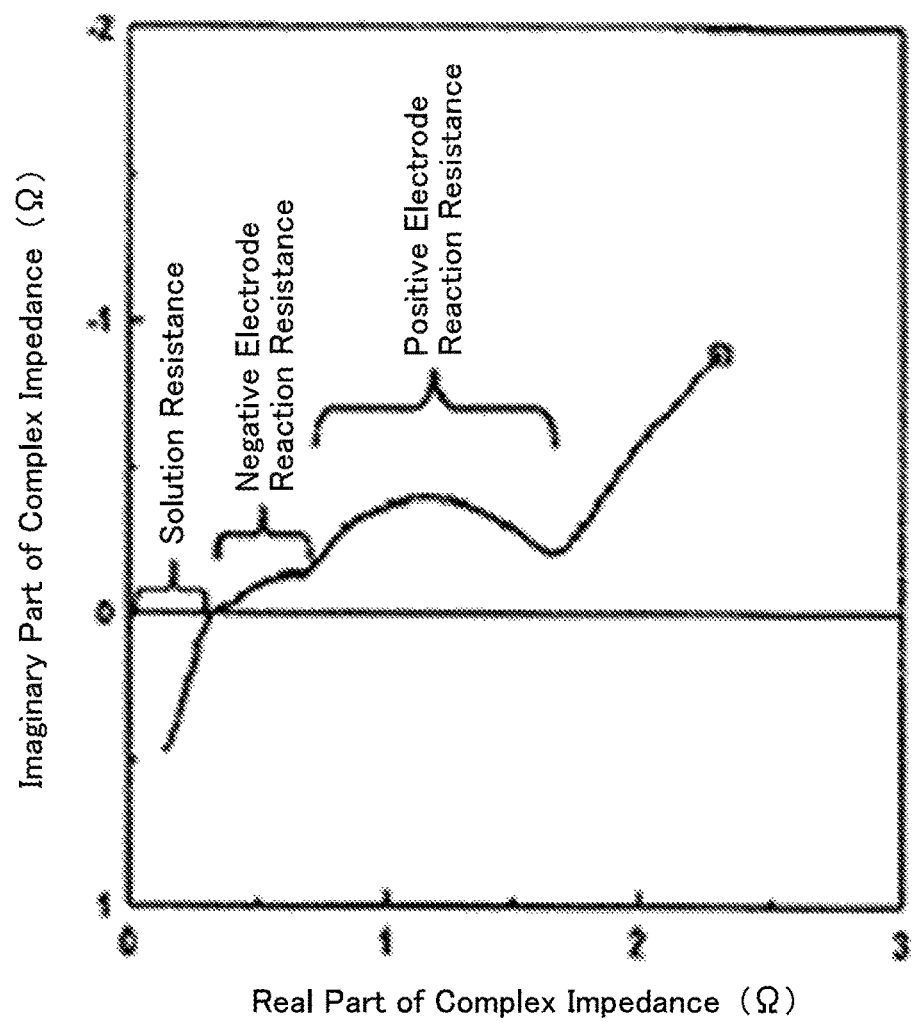
FIG. 8 is a complex impedance planar plot of a battery in Evaluation Example I.

For each of the lithium ion secondary batteries, CC charging and discharging, i.e., constant current charging and discharging, were repeated at room temperature in a range of 3.0 V to 4.1 V (vs. Li reference). Then, an alternating current impedance after the first charging and discharging and an alternating current impedance after 100 cycles were measured. On the basis of obtained complex impedance planar plots, reaction resistances of electrolytic solutions, negative electrodes, and positive electrodes were each analyzed. As shown in FIG. 8, two circular arcs were observed in a complex impedance planar plot. A circular arc on the left side of FIG. 8 (i.e., a side in which the real part of complex impedance is smaller) is referred to as a first circular arc. A circular arc on the right side of the FIG. 8 is referred to as a second circular arc. Reaction resistance of the negative electrode was analyzed on the basis of the size of the fist circular arc, and reaction resistance of the positive electrode was analyzed on the basis of the size of the second circular arc. Resistance of the electrolytic solution was analyzed on the basis of a plot continuing from the fist circular arc toward the leftmost side in FIG. 8. Table 9 and Table 10 show the analysis results. Table 9 shows the resistance of the electrolytic solution (i.e., solution resistance), the reaction resistance of the negative electrode, and the reaction resistance of the positive electrode after the first charging and discharging. Table 10 shows respective resistances after 100 cycles.

TABLE 9

<Initial alternating-current resistance>

| Secondary battery | Electrolytic solution | Organic solvent of electrolytic solution Metal salt or electrolyte Number of moles of organic solvent/number of moles of metal salt or electrolyte | Solution resistance (Ω) | Negative electrode reaction resistance (Ω) | Positive electrode reaction resistance (Ω) |
|---|---|---|---|---|---|
| Example I | Example 1-1 | DMC LiFSA 3 | 0.4 | 0.4 | 0.5 |
| Example II | Example 1-3 | DMC LiFSA 4 | 0.3 | 0.5 | 0.5 |
| Comparative Example I | Comparative Example 3-2 | DMC LiFSA 2 | 0.5 | 0.5 | 0.5 |
| Comparative Example II | Comparative Example 4-2 | AN LiFSA 2.4 | 0.3 | 0.4 | 0.1 |
| Comparative Example III | Comparative Example 8 | DEC and EC (volume ratio = 7:3) $LiPF_6$ 10 | 0.3 | 0.4 | 1.0 |

From the results of Example I, Example II, and Comparative Example I shown in Table 9, the solution resistance is understood to be decreased in accordance with increase in the mole ratio of the specific organic solvent relative to the metal salt. Taking into consideration the result of Table 4 and the ionic conductivity shown in FIG. 1 in combination, the electrolytic solution of the present invention in the range of mole ratio of 3-5 of the specific organic solvent relative to the metal salt is understood to suitably satisfy both the ionic conductivity and the reaction resistance. In addition, the lithium ion secondary battery of Comparative Example III had a significantly high positive electrode reaction resistance.

TABLE 10

<Alternating-current resistance after 100 cycles>

| Secondary battery | Electrolytic solution | Organic solvent of electrolytic solution Metal salt or electrolyte Number of moles of organic solvent/number of moles of metal salt or electrolyte | Solution resistance ($\Omega$) | Negative electrode reaction resistance ($\Omega$) | Positive electrode reaction resistance ($\Omega$) |
|---|---|---|---|---|---|
| Example I | Example 1-1 | DMC LiFSA 3 | 0.3 | 0.3 | 0.2 |
| Example II | Example 1-3 | DMC LiFSA 4 | 0.3 | 0.4 | 0.2 |
| Comparative Example I | Comparative Example 3-2 | DMC LiFSA 2 | 0.5 | 0.4 | 0.2 |
| Comparative Example II | Comparative Example 4-2 | AN LiFSA 2.4 | 0.3 | 0.2 | 0.3 |
| Comparative Example III | Comparative Example 8 | DEC and EC (volume ratio = 7:3) LiPF$_6$ 10 | 0.3 | 0.4 | 0.6 |

With reference to Table 9 and Table 10, with respect to each lithium ion secondary battery provided with an electrolytic solution having DMC as the specific organic solvent and LiFSA as the metal salt, the solution resistance, the negative electrode reaction resistance, and the positive electrode reaction resistance after the charging and discharging cycles are all understood to be equivalent to or decreased from those at the initial states thereof. On the other hand, with respect to the lithium ion secondary battery provided with an electrolytic solution having AN as the specific organic solvent and LiFSA as the metal salt, the positive electrode reaction resistance after the charging and discharging cycles is understood to be increased compared to that at the initial state thereof.

Evaluation Example II: Capacity Retention Rate

With respect to the lithium ion secondary batteries of Examples I to II and Comparative Examples I to III, the capacity retention rate was evaluated using the following method.

For each of the lithium ion secondary batteries, CC charging and discharging were repeated at room temperature in a range of 3.0 V to 4.1 V (vs. Li reference). The discharge capacity at the first charging and discharging and the discharge capacity at the 300-th cycle were measured. Then, assuming the capacity of each lithium ion secondary battery at the first charging and discharging to be 100%, the capacity retention rate (%) of each lithium ion secondary battery at the 300-th cycle was calculated. Table 11 shows the results.

TABLE 11

| Secondary battery | Electrolytic solution | Organic solvent of electrolytic solution Metal salt or electrolyte Number of moles of organic solvent/number of moles of metal salt or electrolyte | Capacity retention rate (%) |
|---|---|---|---|
| Example I | Example 1-1 | DMC LiFSA 3 | 93 |
| Example II | Example 1-3 | DMC LiFSA 4 | 93 |
| Comparative Example I | Comparative Example 3-2 | DMC LiFSA 2 | 93 |
| Comparative Example II | Comparative Example 4-2 | AN LiFSA 2.4 | 80 |
| Comparative Example III | Comparative Example 8 | DEC and EC (volume ratio = 7:3) LiPF$_6$ 10 | 90 |

Each of the lithium ion secondary batteries of Examples I to II showed a capacity retention rate equivalent to or higher than that of the lithium ion secondary batteries of Comparative Examples I to III. Excellent durability in terms of charging and discharging cycles of lithium ion secondary batteries provided with the electrolytic solution of the present invention were supported.

Evaluation Example III: Analysis of S- and O-Containing Coating of Electrode

Figure 9:
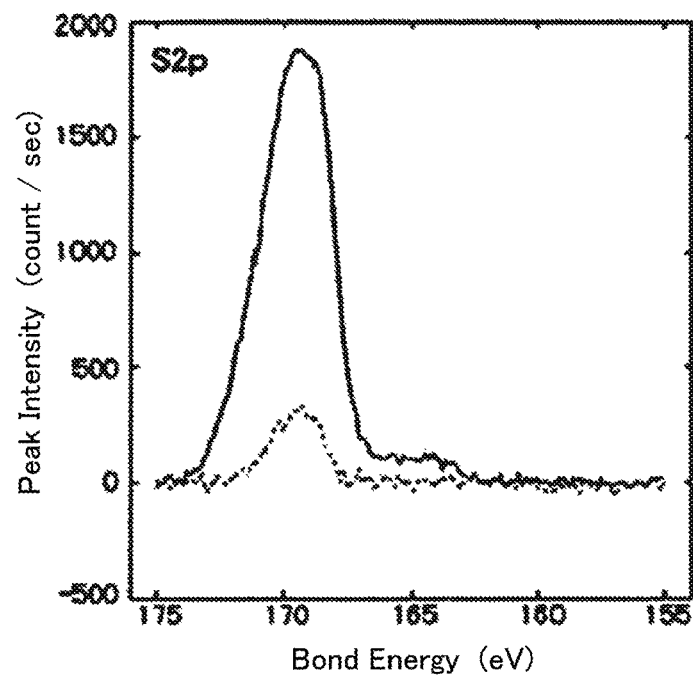
FIG. 9 is an X-ray photoelectron spectroscopy analysis chart regarding sulfur element in Evaluation Example III.
Figure 10:
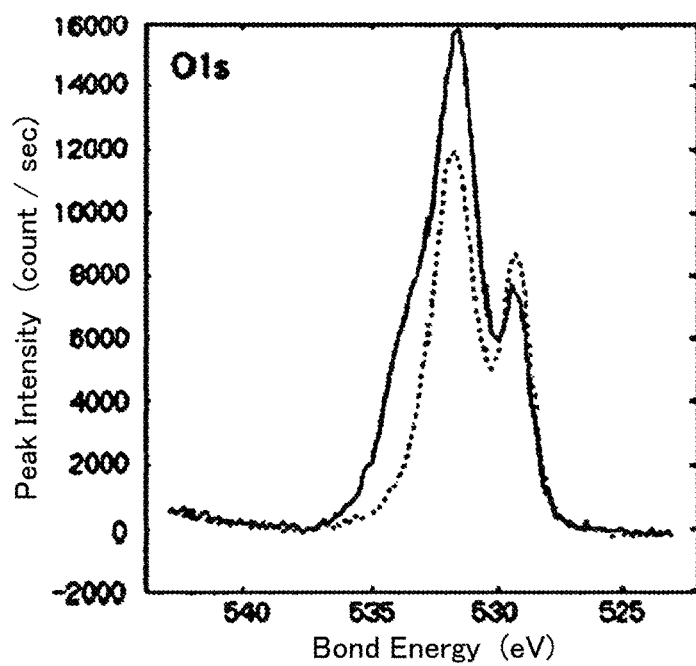
FIG. 10 is an X-ray photoelectron spectroscopy analysis chart regarding oxygen element in Evaluation Example III.

The lithium ion secondary battery of Example II before Evaluation Example II and the lithium ion secondary battery of Example II after Evaluation Example II were disassembled, and the respective positive electrodes were taken out. Then, each positive electrode was washed with dimethyl carbonate three times, then dried, and then used as an analysis target positive electrode. All steps from disassembling of each lithium ion secondary battery to transporting each analysis target positive electrode to an analyzer were performed in an Ar gas atmosphere. Each analysis target positive electrode was analyzed under the following condition by using an X-ray photoelectron spectroscopy. FIG. 9 shows an analysis chart regarding sulfur element, and FIG. 10 shows an analysis chart regarding oxygen element. In each figure, the dotted line shows the peak of the positive electrode of the lithium ion secondary battery of Example II before Evaluation Example II, and the solid line shows the peak of the positive electrode of the lithium ion secondary battery of Example II after Evaluation Example II.

Apparatus: ULVAC-PHI, Inc., PHI5000 VersaProbe II

X-ray source: monochromatic Al K-alpha radiation, voltage 15 kV, current 10 mA

With reference to FIG. 9 and FIG. 10, the positive electrode of the lithium ion secondary battery of Example II after Evaluation Example II is understood to have an S- and O-containing coating newly formed thereon. The peak near 170 eV observed in FIG. 9 is considered to be a peak derived from S=O bonds. Thus, S=O bonds are considered to exist in the S- and O-containing coating of the positive electrode described above. In addition, the lithium ion secondary battery of Example II is provided with a metal salt having S and S=O bonds, and is not provided with any substance having S or S=O bond other than the metal salt. Therefore, the above-mentioned S or S=O bonds in the S- and O-containing coating of the positive electrode is considered to be derived from the metal salt.

Evaluation Example IV: Confirmation of Elution of Ni, Mn, and Co

With respect to the lithium ion secondary batteries of Example II and Comparative Example II, the amount of each of Ni, Mn, and Co deposited on the negative electrode was analyzed using the following method.

For each of the lithium ion secondary batteries, constant current charging and discharging were repeated 200 times at 1 C rate at 60° C. in a range of 3.0 V to 4.1 V. Then, each lithium ion secondary battery was disassembled, and the negative electrode was taken out. The amount of each of Ni, Mn, and Co deposited on the surface of the negative electrode was analyzed by high frequency inductively coupled plasma emission spectrometry. Table 12 shows the measurement results. The amounts (%) of Ni, Mn, and Co in the table are the proportions of the masses of Ni, Mn, and Co in the negative electrode active material layer, respectively.

TABLE 12

| Secondary battery | Electrolytic solution | Organic solvent of electrolytic solution Metal salt Number of moles of organic solvent/number of moles of metal salt | Ni amount (%) Mn amount (%) Co amount (%) |
|---|---|---|---|
| Example II | Example 1-3 | DMC<br>LiFSA<br>4 | <0.001<br><0.005<br><0.005 |
| Comparative Example II | Comparative Example 4-2 | AN<br>LiFSA<br>2.4 | 0.154<br>0.029<br>0.071 |

In the negative electrode of the lithium ion secondary battery of Example II, the amounts of Ni, Mn, and Co are respectively less than detection limits therefor. On the other hand, in the negative electrode of the lithium ion secondary battery of Comparative Example II, Ni, Mn, and Co were each detected. Here, Ni, Mn, and Co detected from the negative electrode are each speculated to have eluted from the positive electrode into the electrolytic solution, and then deposited on the negative electrode. That is, in the lithium ion secondary battery of Example II provided with the electrolytic solution of the present invention, the transition metal in the positive electrode is considered to be extremely less likely to elute into the electrolytic solution of the present invention. In other words, the electrolytic solution of the present invention is considered to suitably suppress elution of the transition metal from the positive electrode.

Example III

A lithium ion secondary battery of Example III provided with the electrolytic solution of Example 1-2 was produced in the following manner.

90 parts by mass of $LiN_{5/10}Co_{2/10}Mn_{3/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil corresponding to JIS A1000 series having a thickness of 20 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode. The positive electrode active material layer was formed at 5.5 mg/cm² per unit area of the applied surface of the positive electrode current collector. The density of the positive electrode active material layer was 2.4 g/cm³.

As the negative electrode active material, 98 parts by mass of spheroidal graphite, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 20 μm was prepared. The slurry was applied in a film form on the surface of the copper foil by using a doctor blade. The copper foil on which the slurry was applied was dried to remove water, and then the copper foil was pressed to obtain a joined object. The obtained joined object was heated and dried in a vacuum dryer for 6 hours at 100° C. to obtain a copper foil having a negative electrode active material layer formed thereon. This was used as the negative electrode. The negative electrode active material layer was formed at 3.8 mg/cm$^2$ per unit area of the applied surface of the negative electrode current collector. The density of the negative electrode active material layer was 1.1 g/cm$^3$.

As the separator, a nonwoven fabric made from cellulose and having a thickness of 20 μm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Example 1-2 was poured into the laminate film. Four sides were sealed airtight by sealing the remaining one side to obtain a lithium ion secondary battery in which the electrode assembly and the electrolytic solution were sealed. This battery was used as the lithium ion secondary battery of Example III.

Example IV

A lithium ion secondary battery of Example IV was obtained in a manner similar to that in Example III except for using the electrolytic solution of Example 1-3 as the electrolytic solution.

Comparative Example IV

A lithium ion secondary battery of Comparative Example IV was obtained in a manner similar to that in Example III except for using the electrolytic solution of Comparative Example 3-2 as the electrolytic solution.

Comparative Example V

A lithium ion secondary battery of Comparative Example V was obtained in a manner similar to that in Example III except for using the electrolytic solution of Comparative Example 4-2 as the electrolytic solution.

Comparative Example VI

A lithium ion secondary battery of Comparative Example VI was obtained in a manner similar to that in Example III except for using the electrolytic solution of Comparative Example 8 as the electrolytic solution.

Evaluation Example V: Capacity Retention Rate <2> and Direct Current Resistance

With respect to the lithium ion secondary batteries of Example III, Example IV, and Comparative Example IV to Comparative Example VI, the following test was performed to evaluate the capacity retention rate and the direct current resistance.

For each of the lithium ion secondary batteries, a charging and discharging cycle of charging up to 4.1 V with a constant current at 1 C rate at a temperature of 25° C., and pausing for 1 minute, and then discharging down to 3.0 V with a constant current at 1 C rate, and pausing for 1 minute, was repeated by 300 cycles. The capacity retention rate was calculated by the following formula. Capacity retention rate (%)=100×(discharge capacity at 300-th cycle)/(initial discharge capacity)

For each of the lithium ion secondary batteries after 300 cycles, the voltage was adjusted to 3.5 V with a constant current at 0.5 C rate at a temperature of 25° C., and then, constant current discharging was performed at 3 C rate for 10 seconds. From the current value and the amount of change in voltage before and after this constant current discharging, the direct current resistance during discharging was calculated according to Ohm's law.

Further, for each of the lithium ion secondary batteries after 300 cycles, the voltage was adjusted to 3.5 V with a constant current at 0.5 C rate at a temperature of 25° C., and then, constant current charging was performed at 3 C rate for 10 seconds. From the current value and the amount of change in voltage before and after this constant current charging, the direct current resistance during charging was calculated according to Ohm's law.

Table 13 shows the test results.

TABLE 13

| Secondary battery | Electrolytic solution | Organic solvent of electrolytic solution Metal salt or electrolyte Number of moles of organic solvent/number of moles of metal salt or electrolyte | Capacity retention rate (%) | Direct current resistance during discharging (Ω) | Direct current resistance during charging (Ω) |
|---|---|---|---|---|---|
| Example III | Example 1-2 | DMC<br>LiFSA<br>3.5 | 92 | 3.1 | 3.1 |
| Example IV | Example 1-3 | DMC<br>LiFSA<br>4 | 90 | 3.2 | 3.1 |
| Comparative Example IV | Comparative Example 3-2 | DMC<br>LiFSA<br>2 | 93 | 4.2 | 4.2 |
| Comparative Example V | Comparative Example 4-2 | AN<br>LiFSA<br>2.4 | 82 | 2.9 | 2.9 |
| Comparative Example VI | Comparative Example 8 | DEC and EC (volume ratio = 7:3)<br>LiPF$_6$<br>10 | 92 | 3.8 | 3.6 |

From the results shown in Table 13, the lithium ion secondary batteries of the present invention provided with the electrolytic solutions of the present invention are understood to suitably retain the capacity even after the charging and discharging cycles and to have small direct current resistance during charging and discharging. On the other hand, the lithium ion secondary batteries of Comparative Example IV and Comparative Example VI are understood to have large direct current resistance during charging and discharging, and the lithium ion secondary battery of Comparative Example V is understood to be inferior in terms of the capacity retention rate.

Example V

A lithium ion secondary battery of Example V was obtained in a manner similar to that in Example III except that the electrolytic solution of Example 1-1 was used as the electrolytic solution and except that the density of the positive electrode active material layer was 2.3 g/cm$^3$.

Example VI

A lithium ion secondary battery of Example VI was obtained in a manner similar to that in Example V except for using the electrolytic solution of Example 2-1 as the electrolytic solution.

Example VII

A lithium ion secondary battery of Example VII was obtained in a manner similar to that in Example V except for using the electrolytic solution of Example 2-2 as the electrolytic solution.

Comparative Example VII

A lithium ion secondary battery of Comparative Example VII was obtained in a manner similar to that in Example V except for using the electrolytic solution of Comparative Example 8 as the electrolytic solution.

Evaluation Example VI: Capacity Retention Rate <3> and Direct Current Resistance <2>

With respect to the lithium ion secondary batteries of Example V, Example VI, Example VII, and Comparative Example VII, a test was performed using a method similar to that in Evaluation Example V, to evaluate the capacity retention rate and the direct current resisitance. Table 14 shows the results.

TABLE 14

| Secondary battery | Electrolytic solution | Organic solvent of electrolytic solution Metal salt or electrolyte Number of moles of organic solvent/number of moles of metal salt or electrolyte | Capacity retention rate (%) | Direct current resistance during discharging (Ω) | Direct current resistance during charging (Ω) |
| --- | --- | --- | --- | --- | --- |
| Example V | Example 1-1 | DMC<br>LiFSA<br>3 | 98 | 3.3 | 2.9 |
| Example VI | Example 2-1 | DMC and DEC<br>(mole ratio = 9:1)<br>LiFSA<br>3 | 98 | 4.0 | 3.5 |
| Example VII | Example 2-2 | DMC and DEC<br>(mole ratio = 7:1)<br>LiFSA<br>3 | 98 | 3.8 | 3.3 |
| Comparative Example VII | Comparative Example 8 | DEC and EC<br>(volume ratio = 7:3)<br>LiPF$_6$<br>10 | 96 | 5.8 | 4.6 |

Also from the results shown in Table 14, the lithium ion secondary batteries of the present invention provided with the electrolytic solutions of the present invention are understood to suitably retain the capacity even after the charging and discharging cycles, and to have small direct current resistance during charging and discharging. On the other hand, the lithium ion secondary battery of Comparative Example VII is understood to have large direct current resistance during charging and discharging.

Example VIII

A lithium ion secondary battery of Example VIII was obtained in a manner similar to that in Example VI except for using, as the separator, a microporous film made from polyolefin and having a thickness of 20 μm.

Example IX

A lithium ion secondary battery of Example IX was obtained in a manner similar to that in Example VIII except for using the electrolytic solution of Example 11-1 as the electrolytic solution.

Example X

A lithium ion secondary battery of Example X was obtained in a manner similar to that in Example VIII except for using the electrolytic solution of Example 11-2 as the electrolytic solution.

Comparative Example VIII

A lithium ion secondary battery of Comparative Example VIII was obtained in a manner similar to that in Example VIII except for using the electrolytic solution of Comparative Example 10 as the electrolytic solution.

Evaluation Example VII: Capacity Retention Rate <4> and Direct Current Resistance <3>

With respect to the lithium ion secondary batteries of Example VIII, Example IX, Example X, and Comparative Example VIII, the following test was performed to evaluate the capacity retention rate and the direct current resistance.

For each of the lithium ion secondary batteries, a charging and discharging cycle of charging up to 4.1 V with a constant current at IC rate at a temperature of 60° C., and pausing for 1 minute, and then discharging down to 3.0 V with a constant current at 1 C rate, and pausing for 1 minute, was repeated by 300 cycles. The capacity retention rate was calculated by the following formula. Capacity retention rate (%)=100×(discharge capacity at 300-th cycle)/(initial discharge capacity)

For each of the lithium ion secondary batteries after 300 cycles, the voltage was adjusted to 3.5 V with a constant current at 0.5 C rate at a temperature of 25° C., and then, constant current discharging was performed at 15 C rate for 2 seconds. From the current value and the amount of change in voltage before and after this constant current discharging, the direct current resistance during discharging was calculated according to Ohm's law.

Further, for each of the lithium ion secondary batteries after 300 cycles, the voltage was adjusted to 3.7 V with a constant current at 0.5 C rate at a temperature of 25° C., and then, constant current charging was performed at 15 C rate for 10 seconds. From the current value and the amount of change in voltage before and after this constant current charging, the direct current resistance during charging was calculated according to Ohm's law.

Table 15 shows the test results.

TABLE 15

| Secondary battery | Electrolytic solution | Organic solvent of electrolytic solution Metal salt or electrolyte Number of moles of organic solvent/number of moles of metal salt or electrolyte | Capacity retention rate (%) | Direct current resistance during discharging ($\Omega$) | Direct current resistance during charging ($\Omega$) |
|---|---|---|---|---|---|
| Example VIII | Example 2-1 | DMC and DEC (mole ratio = 9:1) LiFSA 3 | 90 | 2.7 | 3.4 |
| Example IX | Example 11-1 | DMC and EMC (mole ratio = 9:1) LiFSA 3 | 89 | 2.0 | 2.9 |
| Example X | Example 11-2 | DMC and EMC (mole ratio = 9:1) LiFSA 3.6 | 88 | 1.8 | 2.6 |
| Comparative Example VIII | Comparative Example 10 | EC, EMC, DMC (volume ratio = 3:3:4) $LiPF_6$ 10 | 72 | 4.1 | 5.2 |

From the results shown in Table 15, the lithium ion secondary batteries of the present invention provided with the electrolytic solutions of the present invention are understood to suitably retain the capacity even after the charging and discharging cycles and to have small direct current resistance during charging and discharging. On the other hand, the lithium ion secondary battery of Comparative Example VIII is understood to have large direct current resistance during charging and discharging and to be inferior in terms of the capacity retention rate.

Example XI

A lithium ion secondary battery of Example XI provided with the electrolytic solution of Example 2-1 was produced in the following manner.

90 parts by mass of a lithium containing metal oxide having a layered rock salt structure and represented by $LiNi_{5/10}Co_{2/10}Mn_{3/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 15 μm was prepared. The slurry was applied in a film form on both surfaces of the aluminum foil. The aluminum foil on which the slurry was applied was dried in a furnace at 120° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having positive electrode active material layers formed thereon. This was used as the positive electrode plate.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on both surfaces of the copper foil. The copper foil on which the slurry was applied was dried to remove water, and then, the copper foil was pressed to obtain a joined object. The obtained joined object was heated and dried in a vacuum dryer for 6 hours at 100° C. to obtain a copper foil having negative electrode active material layers formed thereon. This was used as the negative electrode plate.

As the separator, a microporous film made from polyolefin and having a thickness of 20 μm was prepared.

An electrode assembly was formed by winding the positive electrode plate and the negative electrode plate via the separator. The electrode assembly was housed in a square type case together with the electrolytic solution of Example 2-1, to obtain a lithium ion secondary battery in which the electrode assembly and the electrolytic solution were sealed. This battery was used as the lithium ion secondary battery of Example XI.

Comparative Example IX

A lithium ion secondary battery of Comparative Example IX was obtained in a manner similar to that in Example XI except for using the electrolytic solution of Comparative Example 10 as the electrolytic solution.

Evaluation Example VIII: High-Rate Charging and Discharging Cycle Test

With respect to the lithium ion secondary batteries of Example XI and Comparative Example IX, constant current charging and discharging was repeated at room temperature in a range of 3.0 V to 4.1 V (vs. Li reference). Then, for each of the secondary batteries adjusted to an SOC (state of charge) of 60% at 25° C., constant current charging was performed at 15 C rate for 10 seconds. From the current value and the amount of change in voltage before and after this charging, the direct current resistance during charging was calculated according to Ohm's law.

Then, for each of the secondary batteries adjusted to an SOC of 60% at 25° C. again, a 5400 cycle durability test was performed. In the 5400 cycle durability test, 1 cycle is composed of charging with a constant current at 15 C rate for 40 seconds and discharging with a constant current at 2 C rate for 300 seconds. With respect to each secondary battery after the durability test, the direct current resistance was measured using a method similar to that used before the durability test.

The direct current resistance after the durability test was divided by the direct current resistance before the durability test and then multiplied by 100, whereby the resistance increase rate (%) was calculated. Table 16 shows the results.

TABLE 16

| Secondary battery | Electrolytic solution | Organic solvent of electrolytic solution Metal salt or electrolyte Number of moles of organic solvent/number of moles of metal salt or electrolyte | Resistance increase rate (%) |
| --- | --- | --- | --- |
| Example XI | Example 2-1 | DMC and DEC (mole ratio = 9:1) LiFSA 3 | 134 |
| Comparative Example IX | Comparative Example 10 | EC, EMC, DMC (volume ratio = 3:3:4) $LiPF_6$ 10 | 218 |

That the resistance increase after the durability test is suppressed when the electrolytic solution of the present invention is used, is understood. The reason for this is that due to the characteristics of the electrolytic solution of the present invention described above, uneven distribution of the metal salt concentration of the electrolytic solution, which may sometimes occur during high-rate charging and discharging of a secondary battery, is less likely to occur in the electrolytic solution of the present invention.

Example XII

A lithium ion secondary battery of Example XII provided with the electrolytic solution of Example 2-1 was produced in the following manner.

90 parts by mass of a lithium containing metal oxide having a layered rock salt structure and represented by $LiNi_{5/10}Co_{2/10}Mn_{3/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 15 μm was prepared. The slurry was applied in a film form on both surfaces of the aluminum foil. The aluminum foil on which the slurry was applied was dried in a furnace at 120° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having positive electrode active material layers formed thereon. This was used as the positive electrode plate.

98 parts by mass of graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on both surfaces of the copper foil. The copper foil on which the slurry was applied was dried to remove water, and then, the copper foil was pressed to obtain a joined object. The obtained joined object was heated and dried in a vacuum dryer for 6 hours at 100° C. to obtain a copper foil having negative electrode active material layers formed thereon. This was used as the negative electrode plate.

As the separator, a microporous film made from polyolefin and having a thickness of 20 μm was prepared.

An electrode assembly was formed by winding the positive electrode plate and the negative electrode plate via the separator. The electrode assembly was housed in a square type case together with the electrolytic solution of Example 2-1, to obtain a lithium ion secondary battery in which the electrode assembly and the electrolytic solution were sealed. This battery was used as the lithium ion secondary battery of Example XII.

Example XIII

A lithium ion secondary battery of Example XIII was obtained using a method similar to that in Example XII except for using the electrolytic solution of Example 11-2 as the electrolytic solution.

Example XIV

A lithium ion secondary battery of Example XIV was obtained using a method similar to that in Example XII except for producing the negative electrode plate in the following manner.

90 parts by mass of graphite serving as the negative electrode active material and 10 parts by mass of polyvinylidene fluoride serving as the binding agent, and a proper amount of N-methyl-2-pyrrolidone were mixed to create a slurry. As the negative electrode current collector, a copper foil having a thickness of 10 μm was prepared. The slurry was applied in a film form on both surfaces of the copper foil. The copper foil on which the slurry was applied was dried to remove N-methyl-2-pyrrolidone, and then, the copper foil was pressed to obtain a joined object. The obtained joined object was heated and dried in a vacuum dryer for 6 hours at 100° C. to obtain a copper foil having negative electrode active material layers formed thereon. This was used as the negative electrode plate.

Evaluation Example IX: Capacity Retention Rate
<5>

With respect to the lithium ion secondary batteries of Example XII, Example XIII, and Example XIV, the following test was performed to evaluate the capacity retention rate.

For each of the lithium ion secondary batteries, charging was performed up to 4.1 V with a constant current at 0.1 C rate at a temperature of 25° C., and then, discharging was performed down to 3.0 V with a constant current at 0.1 C rate, whereby the lithium ion secondary battery was activated.

For each of the lithium ion secondary batteries having been activated, a charging and discharging cycle of charging up to 4.1 V with a constant current at 1 C rate at a temperature of 25° C., and keeping the voltage for 1 hour, and then, discharging down to 3.0 V with a constant current at 1 C rate, and pausing for 1 minute, was repeated by 49 cycles. The capacity retention rate was calculated by the following formula.

Capacity retention rate(%)=100×(discharge capacity at 49-th cycle)/(discharge capacity at first cycle)

Table 17 shows the test results.

TABLE 17

| Secondary battery | Electrolytic solution | Organic solvent of electrolytic solution Metal salt Number of moles of organic solvent/number of moles of metal salt | Negative electrode binding agent | Capacity retention rate (%) |
|---|---|---|---|---|
| Example XII | Example 2-1 | DMC and DEC (mole ratio = 9:1) LiFSA 3 | CMC SBR | 96 |
| Example XIII | Example 11-2 | DMC and EMC (mole ratio = 9:1) LiFSA 3.6 | CMC SBR | 96 |
| Example XIV | Example 2-1 | DMC and DEC (mole ratio = 9:1) LiFSA 3 | PVDF | 77 |

The meanings of abbreviations in Table 17 and thereafter are as follows.

CMC: carboxymethyl cellulose

SBR: styrene-butadiene-rubber

PVDF: polyvinylidene fluoride

From the results shown in Table 17, the secondary batteries of the present invention provided with a polymer having a hydrophilic group such as CMC as the binding agent of the negative electrode are understood to significantly suitably retain the capacity.

Example XV

A lithium ion secondary battery of Example XV provided with the electrolytic solution of Example 2-1 was produced in the following manner.

90 parts by mass of a lithium containing metal oxide having a layered rock salt structure and represented by $LiNi_{5/10}Co_{2/10}Mn_{3/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil having a thickness of 15 µm was prepared. The slurry was applied in a film form on both surfaces of the aluminum foil. The aluminum foil on which the slurry was applied was dried in a furnace at 120° C. to remove N-methyl-2-pyrrolidone through volatilization. Then, the aluminum foil was pressed to obtain a joined object. The obtained joined object was heated and dried in a vacuum dryer for 6 hours at 120° C. to obtain an aluminum foil having positive electrode active material layers formed thereon. This was used as the positive electrode plate.

As the negative electrode active material, a graphite having a BET specific surface area of 8.8 m²/g and a mean particle diameter of 10.0 µm was prepared.

98 parts by mass of the graphite, 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 µm was prepared. The slurry was applied in a film form on both surfaces of the copper foil. The copper foil on which the slurry was applied was dried to remove water. Then, the copper foil was pressed to obtain a joined object. The obtained joined object was heated and dried in a vacuum dryer for 6 hours at 100° C. to obtain a copper foil having negative electrode active material layers formed thereon. This was used as the negative electrode plate.

As the separator, a microporous film made from polyolefin and having a thickness of 20 µm was prepared.

An electrode assembly was formed by winding the positive electrode plate and the negative electrode plate via the separator. The electrode assembly was housed in a square type case together with the electrolytic solution of Example 2-1 to obtain a lithium ion secondary battery in which the electrode assembly and the electrolytic solution were sealed. This battery was used as the lithium ion secondary battery of Example XV.

Example XVI

A lithium ion secondary battery of Example XVI was obtained using a method similar to that in Example XV except for using a graphite having a BET specific surface area of 10.1 m²/g and a mean particle diameter of 8.1 µm as the negative electrode active material.

Example XVII

A lithium ion secondary battery of Example XVII was obtained using a method similar to that in Example XV except for using a graphite having a BET specific surface area of 4.0 m²/g and a mean particle diameter of 11.0 µm as the negative electrode active material.

Example XVIII

A lithium ion secondary battery of Example XVIII was obtained using a method similar to that in Example XV except for producing the negative electrode plate in the following manner.

As the negative electrode active material, a graphite having a BET specific surface area of 8.8 m²/g and a mean particle diameter of 10.0 µm was prepared.

90 parts by mass of the graphite, 10 parts by mass of polyvinylidene fluoride serving as the binding agent, and a proper amount of N-methyl-2-pyrrolidone were mixed to create a slurry. As the negative electrode current collector, a copper foil having a thickness of 10 µm was prepared. The slurry was applied in a film form on both surfaces of the copper foil. The copper foil on which the slurry was applied was dried to remove N-methyl-2-pyrrolidone. Then, the copper foil was pressed to obtain a joined object. The obtained joined object was heated and dried in a vacuum dryer for 6 hours at 100° C. to obtain a copper foil having negative electrode active material layers formed thereon. This was used as the negative electrode plate.

Comparative Example X

A lithium ion secondary battery of Comparative Example X was obtained using a method similar to that in Example XV except for using the electrolytic solution of Comparative Example 10 as the electrolytic solution.

Comparative Example XI

A lithium ion secondary battery of Comparative Example XI was obtained using a method similar to that in Example XVI except for using the electrolytic solution of Comparative Example 10 as the electrolytic solution.

Comparative Example XII

A lithium ion secondary battery of Comparative Example XII was obtained using a method similar to that in Example XVII except for using the electrolytic solution of Comparative Example 10 as the electrolytic solution.

Comparative Example XIII

A lithium ion secondary battery of Comparative Example XIII was obtained using a method similar to that in Example XVIII except for using the electrolytic solution of Comparative Example 10 as the electrolytic solution.

Evaluation Example X: Capacity Retention Rate <6> and Reaction Resistance of Negative Electrode With respect to the lithium ion secondary batteries of Examples XV to XVIII and Comparative Examples X to XIII, the following test was performed to evaluate the capacity retention rate and the increase rate of negative electrode reaction resistance.

For each of the lithium ion secondary batteries, charging was performed up to 4.1 V with a constant current at 0.1 C rate at a temperature of 25° C., and keeping the voltage for 2 hours, and then, discharging was performed down to 3.0 V with a constant current at 0.1 C rate, whereby the lithium ion secondary battery was activated.

For each of the lithium ion secondary batteries having been activated, a charging and discharging cycle of charging up to 4.1 V with a constant current at 1 C rate at a temperature of 60° C., and then discharging down to 3.0 V with a constant current at 1 C rate, was repeated by 200 cycles.

For each of the lithium ion secondary batteries having been activated, and each of the lithium ion secondary batteries after the above 200 cycles of charging and discharging, the negative electrode reaction resistance was analyzed using a method similar to that in Evaluation Example I. The increase rate of the negative electrode reaction resistance was calculated by the following formula.

Increase rate(%) of negative electrode reaction resistance=100×(negative electrode reaction resistance after 200 cycles of charging and discharging)/(negative electrode reaction resistance after activation)

Table 18 shows the test results.

TABLE 18

| Secondary battery | Electrolytic solution | BET specific surface area of graphite (m²/g) | Mean particle diameter of graphite (μm) | Negative electrode binding agent | Increase rate of negative electrode reaction resistance (%) |
|---|---|---|---|---|---|
| Example XV | Example 2-1 | 8.8 | 10.0 | CMC SBR | 91.9 |
| Example XVI | Example 2-1 | 10.1 | 8.1 | CMC SBR | 103.6 |
| Example XVII | Example 2-1 | 4.0 | 11.0 | CMC SBR | 108.1 |
| Example XVIII | Example 2-1 | 8.8 | 10.0 | PVDF | 77.1 |
| Comparative Example X | Comparative Example 10 | 8.8 | 10.0 | CMC SBR | 226 |
| Comparative Example XI | Comparative Example 10 | 10.1 | 8.1 | CMC SBR | 340.0 |
| Comparative Example XII | Comparative Example 10 | 4.0 | 11.0 | CMC SBR | 224.4 |
| Comparative Example XIII | Comparative Example 10 | 8.8 | 10.0 | PVDF | 165.2 |

With respect to the lithium ion secondary batteries of Examples, the negative electrode reaction resistance is considered to have hardly increased even after 200 cycles of charging and discharging. In particular, although Examples XV, XVI, and XVIII are each provided with a graphite having a large BET specific surface area, these Examples exhibited suppression of the increase rate in the reaction resistance of a similar level to or higher than that of Example XVII provided with a graphite having a smaller BET specific surface area. This fact is particularly noteworthy.

On the other hand, in the lithium ion secondary batteries of Comparative Examples, the negative electrode reaction resistance after 200 cycles of charging and discharging significantly increased. The phenomena observed in the lithium ion secondary batteries of Comparative Examples are usually observed in lithium ion secondary batteries provided with conventional electrolytic solutions.

Example XIX

A lithium ion secondary battery of Example XIX provided with the electrolytic solution of Example 11-2 was produced in the following manner.

90 parts by mass of $Li_{1.1}Ni_{5/10}Co_{3/10}Mn_{2/10}O_2$ serving as the positive electrode active material, 8 parts by mass of acetylene black serving as the conductive additive, and 2 parts by mass of polyvinylidene fluoride serving as the binding agent were mixed. This mixture was dispersed in a proper amount of N-methyl-2-pyrrolidone to create a slurry. As the positive electrode current collector, an aluminum foil corresponding to JIS A1000 series and having a thickness of 15 μm was prepared. The slurry was applied in a film form on the surface of the aluminum foil by using a doctor blade. The aluminum foil on which the slurry was applied was dried for 20 minutes at 80° C. to remove N-methyl-2-pyrrolidone. Then, the aluminum foil was pressed to obtain a joined object. The obtained joined object was heated and dried in a vacuum dryer for 6 hours at 120° C. to obtain an aluminum foil having a positive electrode active material layer formed thereon. This was used as the positive electrode. The positive electrode active material layer was formed at 5.5 mg/cm² per unit area of the applied surface of the positive electrode current collector. The density of the positive electrode active material layer was 2.5 g/cm³.

98 parts by mass of spheroidal graphite serving as the negative electrode active material, and 1 part by mass of styrene-butadiene-rubber and 1 part by mass of carboxymethyl cellulose, which both served as the binding agent, were mixed. This mixture was dispersed in a proper amount of ion exchanged water to create a slurry. As the negative electrode current collector, a copper foil having a thickness of 10 μm was prepared. The slurry was applied in a film form on the surface of the copper foil by using a doctor blade. The copper foil on which the slurry was applied was dried to remove water. Then, the copper foil was pressed to obtain a joined object. The obtained joined object was heated and dried in a vacuum dryer for 6 hours at 100° C. to obtain a copper foil having a negative electrode active material layer formed thereon. This was used as the negative electrode. The negative electrode active material layer was formed at 3.9 mg/cm² per unit area on the applied surface of the negative electrode current collector. The density of the negative electrode active material layer was 1.2 g/cm³.

As the separator, a porous film made from polypropylene and having a thickness of 20 μm was prepared.

An electrode assembly was formed by sandwiching the separator between the positive electrode and the negative electrode. The electrode assembly was covered with a set of two sheets of a laminate film. The laminate film was formed into a bag-like shape by having three sides thereof sealed, and the electrolytic solution of Example 11-2 was poured into the laminate film. Four sides were sealed airtight by sealing the remaining one side to obtain a lithium ion secondary battery in which the electrode assembly and the electrolytic solution were sealed.

The following activation process was performed on the obtained lithium ion secondary battery.

Step (a-2)

With respect to the lithium ion secondary battery, charging was performed up to a second voltage 4.1 V at 1 C, and then the second voltage 4.10 V was kept for 1 hour at 25° C.

Step (b)

With respect to the lithium ion secondary battery having been subjected to step (a-2), discharging was performed down to 3 V at a third rate 1 C, and then, the voltage 3 V was kept for 1 hour at 25° C.

Step (c)

With respect to the lithium ion secondary battery having been subjected to step (b), charging and discharging was performed at a fourth rate 2 C at 60° C., between a third voltage 3.3 V and the second voltage 4.1 V. The lithium ion secondary battery for which the above charging and discharging had been repeated 29 times was used as the lithium ion secondary battery of Example XIX.

Example XX

A lithium ion secondary battery of Example XX was produced using a method similar to that in Example XIX except for setting the charging rate in step (a-2) to 5 C.

Example XXI

A lithium ion secondary battery of Example XXI was produced using a method similar to that in Example XIX except for setting the charging rate in step (a-2) to 10 C.

Example XXII

A lithium ion secondary battery of Example XXII was produced using a method similar to that in Example XIX except that the following step (a-1) was performed instead of step (a-2) and that the temperature in step (c) was set to 25° C.
Step (a-1)
With respect to the lithium ion secondary battery, charging was performed up to a first voltage 3.52 V at a first rate 0.1 C, and then charging was performed up to a second voltage 4.10 V at a second rate 0.8 C. Then, the second voltage 4.10 V was kept for 2.48 hours at 25° C.

Example XXIII

A lithium ion secondary battery of Example XXIII was produced using a method similar to that in Example XXII except that the temperature in step (a-1) was set to 60° C., the temperature in step (b) was set to 60° C., and the temperature in step (c) was set to 60° C.

Example XXIV

A lithium ion secondary battery of Example XXIV was produced using a method similar to that in Example XXII except for setting the temperature in step (c) to 60° C.

Example XXV

A lithium ion secondary battery of Example XXV was produced using a method similar to that in Example XXII except that the following step (d) was performed instead of step (b) and step (c).
Step (d)
The lithium ion secondary battery having been subjected to step (a-1) was stored at naturally occurring voltage for 20 hours for 60° C.

Example XXVI

A lithium ion secondary battery of Example XXVI was produced using a method similar to that in Example XX except that the following step (d) was performed instead of step (b) and step (c).
Step (d)
The lithium ion secondary battery having been subjected to step (a-2) was stored at naturally occurring voltage for 2 hours at 80° C.

Example XXVII

A lithium ion secondary battery of Example XXVII was produced using a method similar to that in Example XIX except that the following step (d) was performed after step (c).
Step (d)
With respect to the lithium ion secondary battery having been subjected to step (c), charging was performed up to 3.65 V at 25° C., and then, the lithium ion secondary battery was stored at naturally occurring voltage for 1 hour at 100° C.

Example XXVIII

A lithium ion secondary battery of Example XXVIII was produced using a method similar to that in Example XIX except that a general activation process 1 described below was performed as the activation process for the lithium ion secondary battery.
General Activation Process 1
With respect to the lithium ion secondary battery, charging was performed up to 4.10 V at 0.1 C, and then, the voltage was kept for 1 hour for 25° C. Then, discharging was performed down to 3 V at 0.1 C, and then, the voltage was kept for 1 hour at 25° C.

Example XXIX

A lithium ion secondary battery of Example XXIX was produced using a method similar to that in Example XIX except that a general activation process 2 described below was performed as the activation process for the lithium ion secondary battery.
General Activation Process 2
With respect to the lithium ion secondary battery, charging was performed up to 4.10 V at 0.1 mV/s, and then, the voltage was kept for 1 hour at 25° C. Then, discharging was performed down to 3 V at 0.1 mV/s, and then, the voltage was kept for 1 hour at 25° C.

Comparative Example XIV

A lithium ion secondary battery of Comparative Example XIV was produced using a method similar to that in Example XXVIII except for using the electrolytic solution of Comparative Example 10 as the electrolytic solution of the lithium ion secondary battery.

Comparative Example XV

A lithium ion secondary battery of Comparative Example XV was produced using a method similar to that in Example XIX except for using the electrolytic solution of Comparative Example 10 as the electrolytic solution of the lithium ion secondary battery.

Table 19 lists the lithium ion secondary batteries of Examples XIX to XXIX and the lithium ion secondary batteries of Comparative Examples XIV to XV.

TABLE 19

| | Electrolytic solution | Outline of activation process |
|---|---|---|
| Example XIX | Example 11-2 | (a-2) 1 C charging<br>(b) 1 C discharging<br>(c) 2 C charging and discharging, 29 cycles, 60° C. |
| Example XX | Example 11-2 | (a-2) 5 C charging<br>(b) 1 C discharging<br>(c) 2 C charging and discharging, 29 cycles, 60° C. |
| Example XXI | Example 11-2 | (a-2) 10 C charging<br>(b) 1 C discharging<br>(c) 2 C charging and discharging, 29 cycles, 60° C. |
| Example XXII | Example 11-2 | (a-1) 0.1 C→0.8 C charging<br>(b) 1 C discharging<br>(c) 2 C charging and discharging, 29 cycles, 25° C. |
| Example XXIII | Example 11-2 | (a-1) 0.1 C→0.8 C charging, 60° C.<br>(b) 1 C discharging, 60° C.<br>(c) 2 C charging and discharging, 29 cycles, 60° C. |
| Example XXIV | Example 11-2 | (a-1) 0.1 C→0.8 C charging<br>(b) 1 C discharging<br>(c) 2 C charging and discharging, 29 cycles, 60° C. |
| Example XXV | Example 11-2 | (a-1) 0.1 C→0.8 C charging<br>(d) 60° C., 20 hours |
| Example XXVI | Example 11-2 | (a-2) 5 C charging<br>(d) 80° C., 2 hours |
| Example XXVII | Example 11-2 | (a-2) 1 C charging<br>(b) 1 C discharging<br>(c) 2 C charging and discharging, 29 cycles, 60° C.<br>(d) 100° C., 1 hour |
| Example XXVIII | Example 11-2 | 0.1 C charging, 0.1 C discharging |
| Example XXIX | Example 11-2 | 0.1 mV/s charging, 0.1 mV/s discharging |
| Comparative Example XIV | Comparative Example 10 | 0.1 C charging, 0.1 C discharging |
| Comparative Example XV | Comparative Example 10 | (a-2) 1 C charging<br>(b) 1 C discharging<br>(c) 2 C charging and discharging, 29 cycles, 60° C. |

Evaluation Example XI: Capacity Retention Rate
<7>

With respect to the lithium ion secondary batteries of Examples XIX to XXIX and Comparative Examples XIV to XV, the following test was performed to evaluate the capacity retention rate.

For each of the lithium ion secondary batteries, a 4.1 V-3.0 V charging and discharging cycle of, with a constant current at IC rate at a temperature of 60° C., charging up to 4.1 V and then discharging down to 3.0 V was performed by 200 cycles. The capacity retention rate (%) of each lithium ion secondary battery after 200 cycles was obtained by the following formula. Table 20 shows the results.

Capacity retention rate(%)=(B/A)×100

A: discharge capacity at first charging and discharging cycle

B: discharge capacity at 200-th cycle

TABLE 20

| | Capacity retention rate (%) |
|---|---|
| Example XIX | 91 |
| Example XX | 92 |
| Example XXI | 91 |
| Example XXII | 91 |
| Example XXIII | 91 |
| Example XXIV | 91 |
| Example XXV | 91 |
| Example XXVI | 91 |
| Example XXVII | 91 |
| Example XXVIII | 91 |
| Example XXIX | 91 |
| Comparative Example XIV | 86 |
| Comparative Example XV | 85 |

From the results shown in Table 20, the lithium ion secondary batteries provided with the electrolytic solutions of the present invention are considered to more suitably retain the capacity than the lithium ion secondary batteries provided with conventional electrolytic solutions, regardless of the activation process methods.

Evaluation Example XII: Analysis of Coating of Electrode

The lithium ion secondary batteries of Example XIX, Example XX, Example XXII, Example XXIV, and Comparative Example XIV were each discharged down to 3 V. Then, each secondary battery was disassembled, and the negative electrode was taken out. Each negative electrode was washed by performing operation of immersing the negative electrode in dimethyl carbonate for 10 minutes three times, then dried, and then used as the analysis target negative electrode. All steps from disassembling each lithium ion secondary battery to transporting each analysis target negative electrode to an analyzer were performed in an Ar gas atmosphere. Coating of each analysis target negative electrode surface was analyzed under the following condition by using an X-ray photoelectron spectroscopy.

Apparatus: ULVAC-PHI, Inc., PHI5000 VersaProbe II

X-ray source: monochromatic Al K-alpha radiation, voltage 15 kV, current 10 mA

Figure 11:
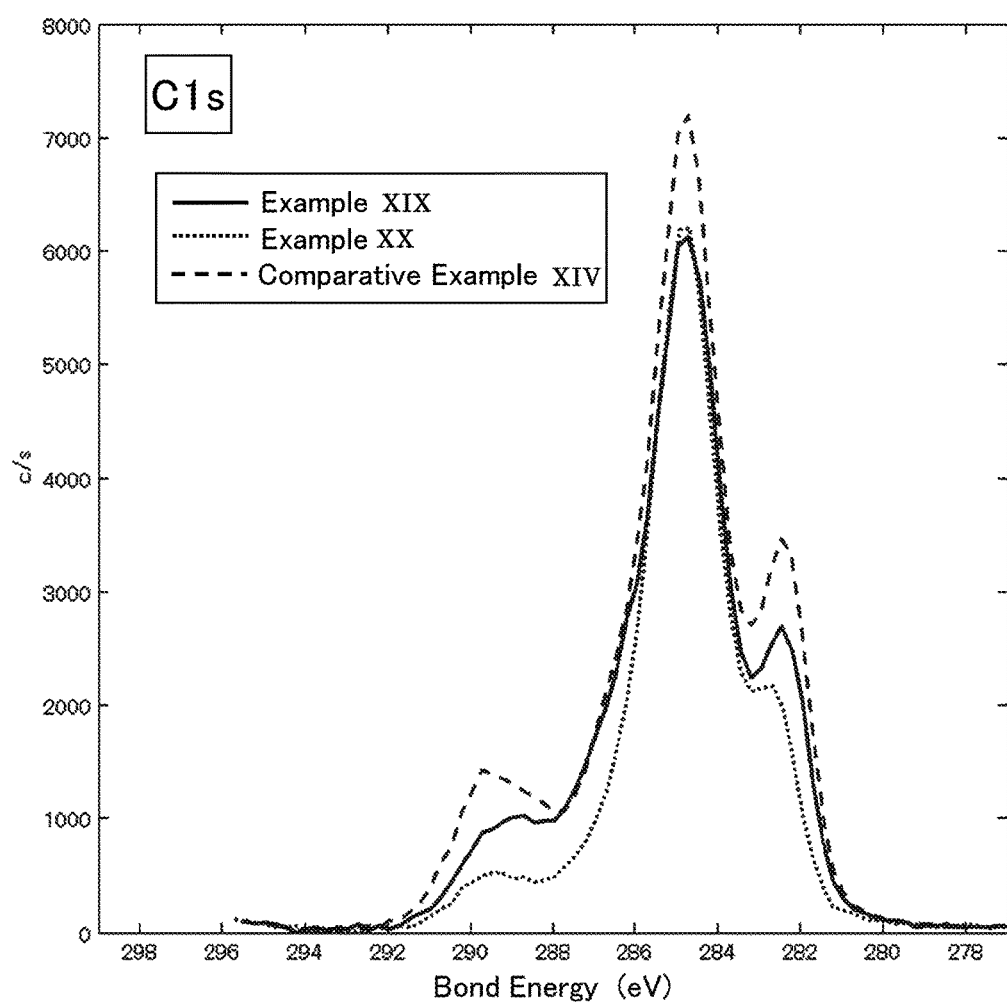
FIG. 11 is an X-ray photoelectron spectroscopy analysis chart regarding carbon element in lithium ion secondary batteries of Example XIX, Example XX, and Comparative Example XIV in Evaluation Example XII.
Figure 12:
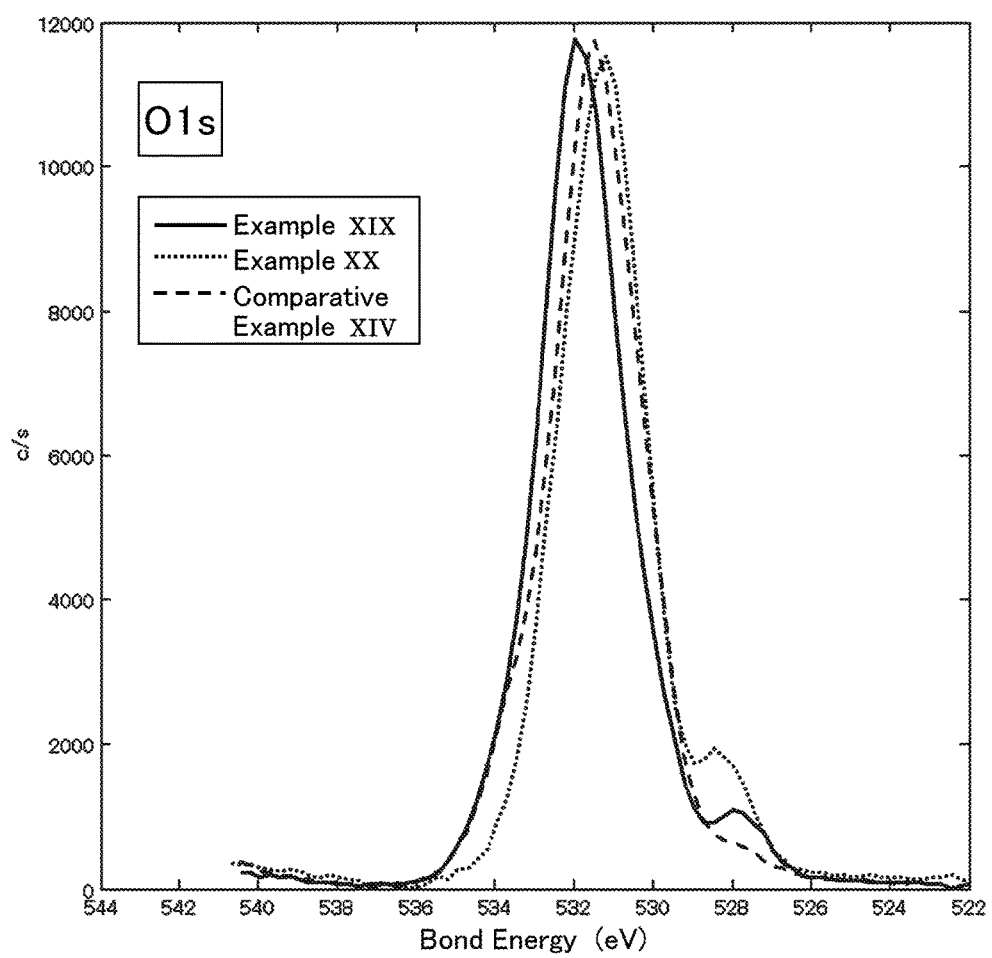
FIG. 12 is an X-ray photoelectron spectroscopy analysis chart regarding oxygen element in the lithium ion secondary batteries of Example XIX, Example XX, and Comparative Example XIV in Evaluation Example XII.
Figure 13:
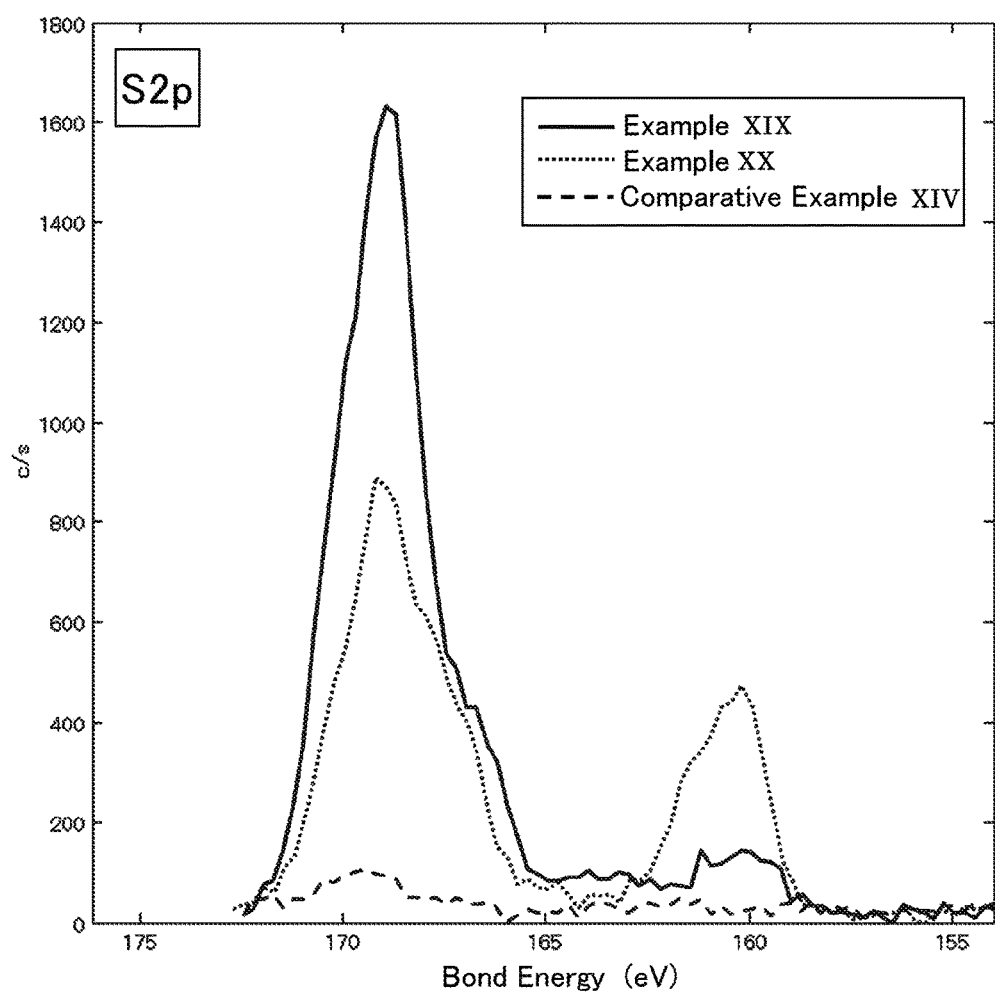
FIG. 13 is an X-ray photoelectron spectroscopy analysis chart regarding sulfur element in the lithium ion secondary batteries of Example XIX, Example XX, and Comparative Example XIV in Evaluation Example XII.

FIG. 11 shows an analysis chart regarding carbon element measured in the lithium ion secondary batteries of Example XIX, Example XX, and Comparative Example XIV, FIG. 12 shows an analysis chart regarding oxygen element measured therein, and FIG. 13 shows an analysis chart regarding sulfur element measured therein.

From the coatings of the lithium ion secondary batteries of Example XIX and Example XX, existence of the 169 eV peak and the 160 eV peak regarding S, the 532 eV peak and the 528 eV peak regarding O, and the 290 eV peak, the 285 eV peak, and the 283 eV peak regarding C was confirmed.

On the other hand, from the coating of the lithium ion secondary battery of Comparative Example XIV, existence of the 169 eV peak and the 160 eV peak regarding S was not confirmed.

Table 21 shows percentages of target elements Li, C, N, O, F, and S obtained through the above analysis with respect to the lithium ion secondary batteries of Example XXII and Example XXIV.

TABLE 21

|  | Li | C | N | O | F | S |
|---|---|---|---|---|---|---|
| Example XXII | 17.0% | 39.8% | 2.6% | 34.2% | 2.9% | 3.6% |
| Example XXIV | 20.8% | 35.4% | 2.5% | 35.4% | 2.7% | 3.2% |

Of the percentage 39.8% of C analyzed with respect to the lithium ion secondary battery of Example XXII, 7.1% was derived from the 283 eV peak. Of the percentage 35.4% of C analyzed with respect to the lithium ion secondary battery of Example XXIV, 3.3% was derived from the 283 eV peak.

Figure 14:
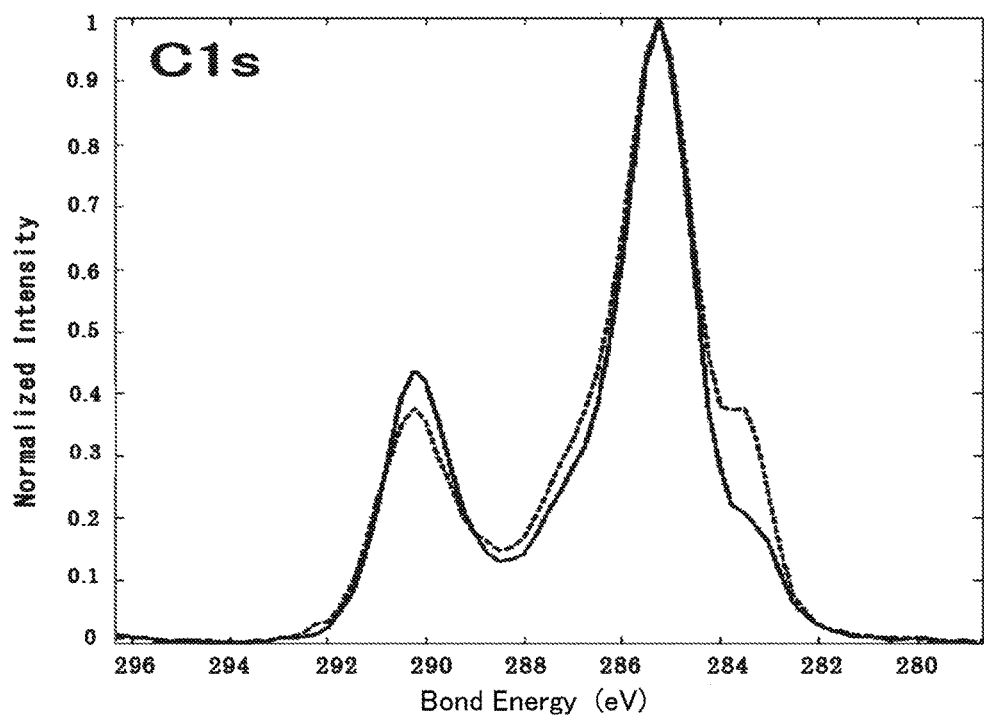
FIG. 14 is an X-ray photoelectron spectroscopy analysis chart regarding carbon element in lithium ion secondary batteries of Example XXII and Example XXIV in Evaluation Example XII.

FIG. 14 shows an analysis chart regarding carbon element measured in the lithium ion secondary batteries of Example XXII and Example XXIV. In FIG. 14, the dotted line shows the peak obtained from the negative electrode of the lithium ion secondary battery of Example XXII, and the solid line shows the peak obtained from the negative electrode of the lithium ion secondary battery of Example XXIV. With reference to FIG. 14, existence of the 290 eV peak, the 285 eV peak, and the 283 eV peak is confirmed. The peaks above are estimated to be derived from DMC and/or EMC contained in the electrolytic solution of Example 11-2.

With reference to FIG. 14, in the lithium ion secondary battery of Example XXII, when the measured intensity of the 285 eV peak is assumed to be 100, the intensity of the 283 eV peak is understood to be about 40. Similarly, in the lithium ion secondary battery of Example XXIV, the intensity of the 283 eV peak is understood to be about 20.

The invention claimed is:

1. An electrolytic solution containing
a heteroelement-containing organic solvent at a mole ratio of 3-5 relative to a metal salt,
the heteroelement-containing organic solvent containing a specific organic solvent having a relative permittivity of not greater than 10 and/or a dipole moment of not greater than 5D,
the metal salt being a metal salt whose cation is an alkali metal, an alkaline earth metal, or aluminum and whose anion has a chemical structure represented by formula (1) below:

$(R^1X^1)(R^2SO_2)N$      formula (1), wherein, in formula (1), $R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^aP$=O, $R^bP$=S, S=O, or Si=O, $R^a$ and $R^b$ are each independently selected from: hydrogen; halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring.

2. The electrolytic solution according to claim 1, wherein the heteroelement-containing organic solvent contains the specific organic solvent by not less than 80 vol % or not less than 80 mole %.

3. The electrolytic solution according to claim 1, wherein the specific organic solvent contains a carbonate in the chemical structure thereof.

4. The electrolytic solution according to claim 1, wherein the specific organic solvent is a linear carbonate represented by formula (2) below:

$R^{20}OCOOR^{21}$      formula (2), wherein, in formula (2), $R^{20}$ and $R^{21}$ are each independently selected from $C_nH_aF_bCl_cBr_dI_e$ that is a linear alkyl, or $C_mH_fF_gCl_hBr_iI_j$ that includes a cyclic alkyl in the chemical structure thereof, "n" is an integer not smaller than 1, "m" is an integer not smaller than 3, and "a", "b", "c", "d", "e", "f", "g", "h", "i", and "j" are each independently an integer not smaller than 0, and satisfy 2n+1=a+b+c+d+e and 2m−1=f+g+h+i+j.

5. An electrolytic solution containing
a heteroelement-containing organic solvent at a mole ratio of 3-5 relative to a metal salt,
the heteroelement-containing organic solvent containing a linear carbonate represented by the general formula (2) according to claim 4,
the metal salt being a metal salt whose cation is an alkali metal, an alkaline earth metal, or aluminum and whose anion has a chemical structure represented by said general formula (1).

6. The electrolytic solution according to claim 1, wherein the chemical structure of the anion of the metal salt is represented by formula (1-1) below:

$(R^3X^2)(R^4SO_2)N$      formula (1-1), wherein, in formula (1-1), $R^3$ and $R^4$ are each independently $C_nH_aF_bCl_cBr_dI_e(CN)_f(SCN)_g(OCN)_h$, "n", "a", "b", "c", "d", "e", "f", "g", and "h" are each independently an integer not smaller than 0, and satisfy $2n+1=a+b+c+d+e+f+g+h$, $R^3$ and $R^4$ optionally bind with each other to form a ring, and in that case, satisfy $2n=a+b+c+d+e+f+g+h$, $X^2$ is selected from $SO_2$, C=O, C=S, $R^cP$=O, $R^dP$=S, S=O, or Si=O, $R^c$ and $R^d$ are each independently selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^c$ and $R^d$ each optionally bind with $R^3$ or $R^4$ to form a ring.

7. The electrolytic solution according to claim 1, wherein the chemical structure of the anion of the metal salt is represented by formula (1-2) below:

$(R^5SO_2)(R^6SO_2)N$               formula (1-2), wherein, in formula (1-2), $R^5$ and $R^6$ are each independently $C_nH_aF_bCl_cBr_dI_e$, "n", "a", "b", "c", "d", and "e" are each independently an integer not smaller than 0, and satisfy $2n+1=a+b+c+d+e$, $R^5$ and $R^6$ optionally bind with each other to form a ring, and, in that case, satisfy $2n=a+b+c+d+e$.

8. The electrolytic solution according to claim 1, wherein the metal salt is $(CF_3SO_2)_2NLi$, $(FSO_2)_2NLi$, $(C_2F_5SO_2)_2NLi$, $FSO_2(CF_3SO_2)NLi$, $(SO_2CF_2CF_2SO_2)NLi$, or $(SO_2CF_2CF_2CF_2SO_2)NLi$.

9. The electrolytic solution according to claim 1, wherein the specific organic solvent or the linear carbonate is selected from dimethyl carbonate, ethyl methyl carbonate, or diethyl carbonate.

10. A secondary battery provided with the electrolytic solution according to claim 1.

11. The secondary battery according to claim 10 provided with a positive electrode current collector made from aluminum.

12. The secondary battery according to claim 10, wherein an S- and O-containing coating is formed on a surface of a positive electrode and/or a negative electrode.

13. The secondary battery according to claim 12, wherein the coating has S, O, and C.

14. The secondary battery according to claim 13, wherein a peak having a peak top at 290±2 eV is observed when the coating is measured by X-ray photoelectron spectroscopy.

15. The secondary battery according to claim 10, wherein the secondary battery is provided with a graphite having a BET specific surface area of 0.5 to 15 m²/g as a negative electrode active material.

16. The secondary battery according to claim 15, wherein the graphite has a mean particle diameter in a range of 2 to 30 μm.

17. The secondary battery according to claim 10, wherein the secondary battery is provided with a graphite having a BET specific surface area of 4 to 12 m²/g as a negative electrode active material.

18. The secondary battery according to claim 10, wherein the secondary battery is provided with a polymer having a hydrophilic group as a binding agent.

19. The electrolytic solution according to claim 1, wherein the metal salt is contained in the electrolytic solution in a concentration of 2.0 to 4.0 mol/L.

20. An electrolytic solution containing
a specific organic solvent at a mole ratio of 3-5 relative to a metal salt,
the specific organic solvent having a relative permittivity of not greater than 10 and/or a dipole moment of not greater than 5D,
the metal salt being a metal salt whose cation is an alkali metal, an alkaline earth metal, or aluminum and whose anion has a chemical structure represented by formula (1)

$(R^1X^1)(R^2SO_2)N$               formula (1), wherein, in formula (1), $R^1$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^2$ is selected from: hydrogen; a halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; CN; SCN; or OCN, $R^1$ and $R^2$ optionally bind with each other to form a ring, $X^1$ is selected from $SO_2$, C=O, C=S, $R^aP$=O, $R^bP$=S, S=O, or Si=O, $R^a$ and $R^b$ are each independently selected from: hydrogen; halogen; an alkyl group optionally substituted with a substituent group; a cycloalkyl group optionally substituted with a substituent group; an unsaturated alkyl group optionally substituted with a substituent group; an unsaturated cycloalkyl group optionally substituted with a substituent group; an aromatic group optionally substituted with a substituent group; a heterocyclic group optionally substituted with a substituent group; an alkoxy group optionally substituted with a substituent group; an unsaturated alkoxy group optionally substituted with a substituent group; a thioalkoxy group optionally substituted with a substituent group; an unsaturated thioalkoxy group optionally substituted with a substituent group; OH; SH; CN; SCN; or OCN, $R^a$ and $R^b$ each optionally bind with $R^1$ or $R^2$ to form a ring, wherein the metal salt is contained in the electrolytic solution in a concentration of 2.0 to 4.0 mol/L.

* * * * *